(12) United States Patent
Cirik et al.

(10) Patent No.: US 12,199,728 B2
(45) Date of Patent: Jan. 14, 2025

(54) RESOURCE MANAGEMENT FOR BEAM FAILURE RECOVERY PROCEDURES

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Hua Zhou, Vienna, VA (US); Hyoungsuk Jeon, Centreville, VA (US); Alireza Babaei, Fairfax, VA (US); Kyungmin Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/440,612

(22) Filed: Feb. 13, 2024

(65) Prior Publication Data

US 2024/0187073 A1     Jun. 6, 2024

Related U.S. Application Data

(63) Continuation of application No. 17/231,862, filed on Apr. 15, 2021, now Pat. No. 11,936,459, which is a
(Continued)

(51) Int. Cl.
*H04B 7/06* (2006.01)
*H04L 1/00* (2006.01)
(Continued)

(52) U.S. Cl.
CPC ......... *H04B 7/0695* (2013.01); *H04L 1/0026* (2013.01); *H04L 5/0051* (2013.01);
(Continued)

(58) Field of Classification Search
None
See application file for complete search history.

(56) References Cited

U.S. PATENT DOCUMENTS 9,125,218 B2    9/2015   Chang
9,736,795 B2    8/2017   Dinan
(Continued)

FOREIGN PATENT DOCUMENTS

CN    108809580 A    11/2018
EP      3397015 A1    10/2018
(Continued)

OTHER PUBLICATIONS

R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
(Continued)

*Primary Examiner* — Anh Ngoc M Nguyen
(74) *Attorney, Agent, or Firm* — Banner & Witcoff, Ltd.

(57) ABSTRACT

Wireless communications are described. A wireless device and/or a base station may provide improved resource management. A base station may configure and/or transmit a beam failure recovery medium access control control element (BFR MAC CE) to a wireless device to activate one or more beam failure reference signal resources for beam failure of a downlink bandwidth part (BWP) of a cell. The wireless device may assess, based on receiving the BFR MAC CE, a radio link quality of one or more reference signals for beam failure detection of the downlink BWP of the cell.

20 Claims, 40 Drawing Sheets

Related U.S. Application Data continuation of application No. 16/537,027, filed on Aug. 9, 2019, now Pat. No. 11,012,137.

(60) Provisional application No. 62/716,817, filed on Aug. 9, 2018.

(51) Int. Cl.
*H04L 5/00* (2006.01)
*H04W 74/0833* (2024.01)
*H04W 80/02* (2009.01)

(52) U.S. Cl.
CPC ....... *H04L 5/0094* (2013.01); *H04W 74/0833* (2013.01); *H04W 80/02* (2013.01)

(56) References Cited

U.S. PATENT DOCUMENTS

| | | | |
|---|---|---|---|
| 9,949,298 B1 | 4/2018 | Akoum et al. | |
| 11,026,109 B2* | 6/2021 | Wei | H04B 7/0695 |
| 2010/0279700 A1 | 11/2010 | Kim et al. | |
| 2012/0300715 A1 | 11/2012 | Pelletier et al. | |
| 2013/0039345 A1 | 2/2013 | Kim et al. | |
| 2013/0188580 A1 | 7/2013 | Dinan | |
| 2013/0250828 A1 | 9/2013 | Chou et al. | |
| 2015/0189574 A1 | 7/2015 | Ng et al. | |
| 2015/0208462 A1 | 7/2015 | Lee et al. | |
| 2015/0365921 A1 | 12/2015 | Wu | |
| 2017/0195998 A1 | 7/2017 | Zhang et al. | |
| 2017/0207843 A1 | 7/2017 | Jung et al. | |
| 2017/0332406 A1 | 11/2017 | Islam et al. | |
| 2017/0339662 A1 | 11/2017 | Lin et al. | |
| 2017/0373731 A1 | 12/2017 | Guo et al. | |
| 2018/0006770 A1 | 1/2018 | Guo et al. | |
| 2018/0054348 A1 | 2/2018 | Luo et al. | |
| 2018/0054382 A1 | 2/2018 | Luo et al. | |
| 2018/0054783 A1 | 2/2018 | Luo et al. | |
| 2018/0054811 A1 | 2/2018 | Luo et al. | |
| 2018/0054812 A1 | 2/2018 | Luo et al. | |
| 2018/0054832 A1 | 2/2018 | Luo et al. | |
| 2018/0083753 A1 | 3/2018 | Nagaraja et al. | |
| 2018/0098334 A1 | 4/2018 | Tie et al. | |
| 2018/0110066 A1 | 4/2018 | Luo et al. | |
| 2018/0115940 A1 | 4/2018 | Abedini et al. | |
| 2018/0115990 A1 | 4/2018 | Abedini et al. | |
| 2018/0124687 A1 | 5/2018 | Park et al. | |
| 2018/0132266 A1 | 5/2018 | Chen et al. | |
| 2018/0138962 A1 | 5/2018 | Islam et al. | |
| 2018/0176958 A1 | 6/2018 | Islam et al. | |
| 2018/0191422 A1 | 7/2018 | Xia et al. | |
| 2018/0219604 A1 | 8/2018 | Lu et al. | |
| 2018/0220448 A1 | 8/2018 | Akkarakaran et al. | |
| 2018/0227899 A1 | 8/2018 | Yu et al. | |
| 2018/0234960 A1 | 8/2018 | Nagaraja et al. | |
| 2018/0241452 A1 | 8/2018 | Akkarakaran et al. | |
| 2018/0249453 A1 | 8/2018 | Nagaraja et al. | |
| 2018/0270698 A1 | 9/2018 | Babaei et al. | |
| 2018/0270699 A1 | 9/2018 | Babaei et al. | |
| 2018/0270700 A1 | 9/2018 | Babaei et al. | |
| 2018/0278310 A1 | 9/2018 | Lee et al. | |
| 2018/0279150 A1 | 9/2018 | He et al. | |
| 2018/0279193 A1 | 9/2018 | Park et al. | |
| 2018/0279218 A1 | 9/2018 | Park et al. | |
| 2018/0279229 A1 | 9/2018 | Dinan et al. | |
| 2018/0288756 A1 | 10/2018 | Xia et al. | |
| 2018/0302889 A1 | 10/2018 | Guo et al. | |
| 2018/0310321 A1 | 10/2018 | Basu Mallick et al. | |
| 2018/0317123 A1 | 11/2018 | Chen et al. | |
| 2018/0323856 A1 | 11/2018 | Xiong et al. | |
| 2018/0324723 A1 | 11/2018 | Akkarakaran et al. | |
| 2018/0324867 A1 | 11/2018 | Basu Mallick et al. | |
| 2018/0343653 A1 | 11/2018 | Guo | |
| 2018/0351611 A1 | 12/2018 | Nagaraja et al. | |
| 2018/0367374 A1 | 12/2018 | Liu et al. | |
| 2018/0368126 A1 | 12/2018 | Islam et al. | |
| 2018/0368142 A1 | 12/2018 | Liou | |
| 2019/0028174 A1 | 1/2019 | Chakraborty et al. | |
| 2019/0037423 A1 | 1/2019 | Yu et al. | |
| 2019/0037498 A1 | 1/2019 | Tseng et al. | |
| 2019/0037604 A1 | 1/2019 | Akkarakaran et al. | |
| 2019/0059129 A1 | 2/2019 | Luo et al. | |
| 2019/0074882 A1 | 3/2019 | Zhou et al. | |
| 2019/0074891 A1 | 3/2019 | Kwon et al. | |
| 2019/0098655 A1* | 3/2019 | Shih | H04B 7/0695 |
| 2019/0173740 A1 | 6/2019 | Zhang et al. | |
| 2019/0268893 A1 | 8/2019 | Tsai et al. | |
| 2020/0169310 A1 | 5/2020 | Kwon et al. | |
| 2020/0403761 A1 | 12/2020 | Nguyen | |
| 2021/0058998 A1 | 2/2021 | Yuan et al. | |

FOREIGN PATENT DOCUMENTS

| | | |
|---|---|---|
| EP | 3424152 A1 | 1/2019 |
| WO | 2013025142 A1 | 2/2013 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |
| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R2-1811325 3GPP TSG-RAN WG2 Meeting #103, Gothenburg, Sweden, Aug. 20-24, 2018, Source: Samsung Electronics, Title: Handling Beam Failure Recovery Configuration Update.

(56) References Cited

OTHER PUBLICATIONS

3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, Apr. 16-20, 2018, Source: Nokia, Nokia Shanghai Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, 2018, Source: ASUSTek, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804407 3GPP TSg-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.

(56) References Cited

OTHER PUBLICATIONS

R2-1805905 3GPP TSG-RAN WG2 Meeting #101, Sanya, China, Apr. 16-20, 2018, Source: Huawei, HiSilicon, Title: Discussions on RA for SCells BFR.
R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR AH#2, Qingdao, China, Jun. 27-30, 2017, Source: CATT, Title: RACH power control and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 mailing date Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101bis, Sanya, China, Apr. 16-20, 2018, Source: Spreadtrum Communications, Title: Beam Failure recovery on SCell.
May 14, 2019—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0. 1.0 (Qingdao, China, Jun. 27-30, 2017).
R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.
R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
PRACH—Preamble Detection and Timing Advance Estimation for multi-UE in 3GPP LTE, 3GPP LTE Solutions, from www.mymowireless.com.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.213 V15.1.0 (Mar. 2018); Technical Specification; 3rd Generation Partnership Project; Technical Specification Group Radio Access Network; NR; Physical layer procedures for control (Release 15).

(56) References Cited

OTHER PUBLICATIONS

3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-1803362 3GPP TSG RAN WG1 Meeting #92, Athens, Greece, Feb. 26-Mar. 2, 2018, Source: MediaTek, Inc., Title: Summary on remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R1-1704478 3GPP TSG RAN WG1 Meeting #88bis, Spokane, USA, Apr. 3-7, 2017, Source: Fujitsu, Title: Discussion on beam failure recovery procedure.
R1-1704723 3GPP TSG RAN WG1 Meeting #88bis, Spokane, USA, Apr. 3-7, 2017, Source: Intel Corporation, Title: Details for UL Beam Management.
R1-1704725 3GPP TSG RAN WG1 Meeting #88bis, Spokane, USA, Apr. 3-7, 2017, Source: Intel Corporation, Title: On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussion on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.
R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title: Beam Failure recovery.
R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated, Title: Beam recovery procedure.
R1-1716500 3GPP TSG RAN WG1 Meeting NR#3, Nagoya, Japan, 18-21, Sep. 2017, Source: Nokia, Nokia Shanghai Bell, Title Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.

(56) References Cited

OTHER PUBLICATIONS

R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT DOCOMO, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.
R2-1802554 3GPP TSG-RAN WG2 #101, Athens, Greece, February 26-Mar. 2, 2018, Source: ASUSTek, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101bis, Sanya, China, Apr. 16-20, 2018, Source: MediaTek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: Link recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTek, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).

(56) References Cited

OTHER PUBLICATIONS

R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5QIs for URLLC.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.

R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, Catt, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTek, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.

(56) References Cited

OTHER PUBLICATIONS

R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807481 3GPP TSG RAN WG2 Meeting #102, Busan, Korea, May 21-25, 2018, Source: Huawei, HiSilicon, Title: Remaining issues of temporary CQI reporting.
R2-1807584 3GPP TSG-RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG-RAN WG2 Meeting #102, Busan, Korea, May 21-25, 2018, Source: Ericsson, Title: CR on Dormat SCell state transition Mac Ce.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.

(56) References Cited

OTHER PUBLICATIONS

R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R1-1807210 3GPP TSG RAN WG1 Meeting #93, Busan, Korea, May 21-25, 2018, Source: ASUSTek, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for AI 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAN WG2 #99, Berlin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTek, Title: Discussion on Beam Recover Request in NR.
R2-1800042 3GPP TSG-RAN WG2 AH, Vancouver, Canada, Jan. 22-26, 2018, Source: ASUSTek, Title: Discussion on Beam Failure Recovery Request in NR.
R2-1800049 3GPP TSG-RAN WG2 AH, Vancouver, Canada, Jan. 22-26, 2018, Source: ASUSTek, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 Ah, Vancouver, Canada, Jan. 22-26, 2018, Source: ASUSTek, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.

(56) References Cited

OTHER PUBLICATIONS

R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.

\* cited by examiner

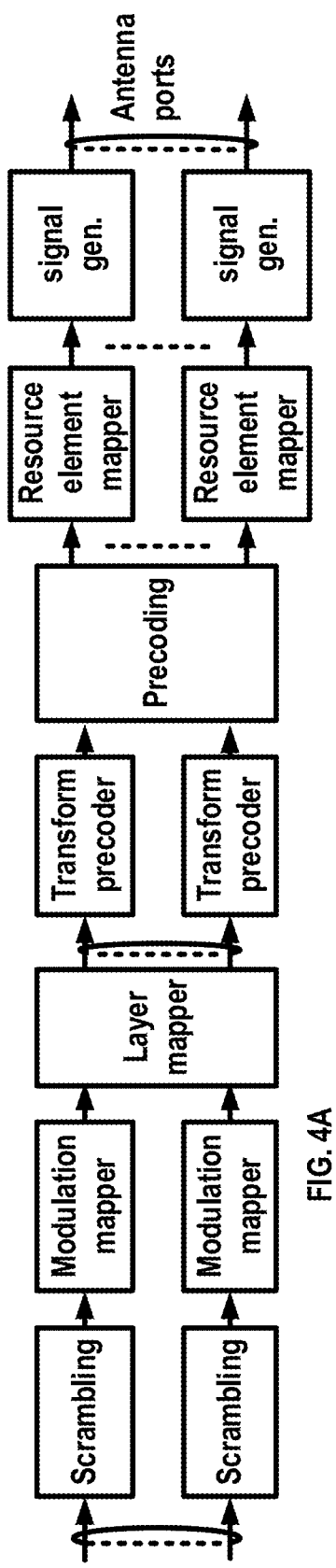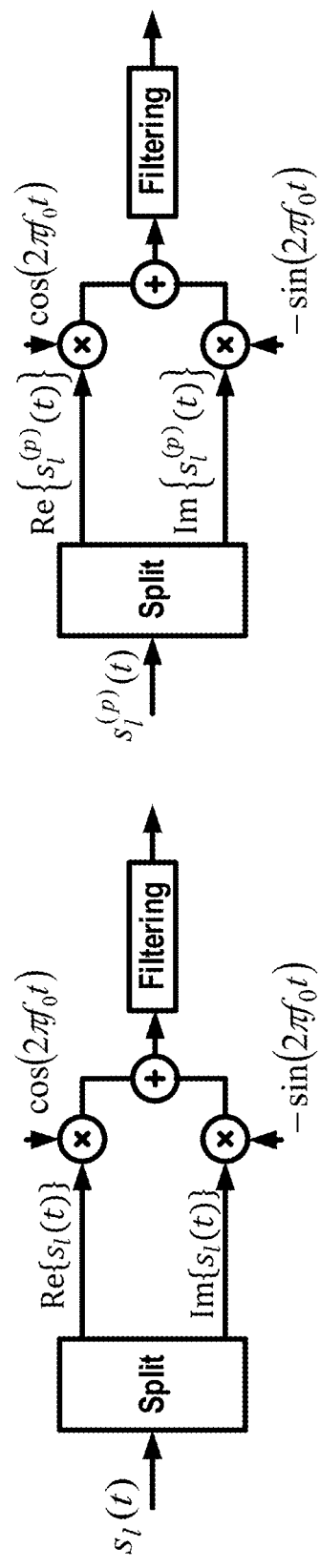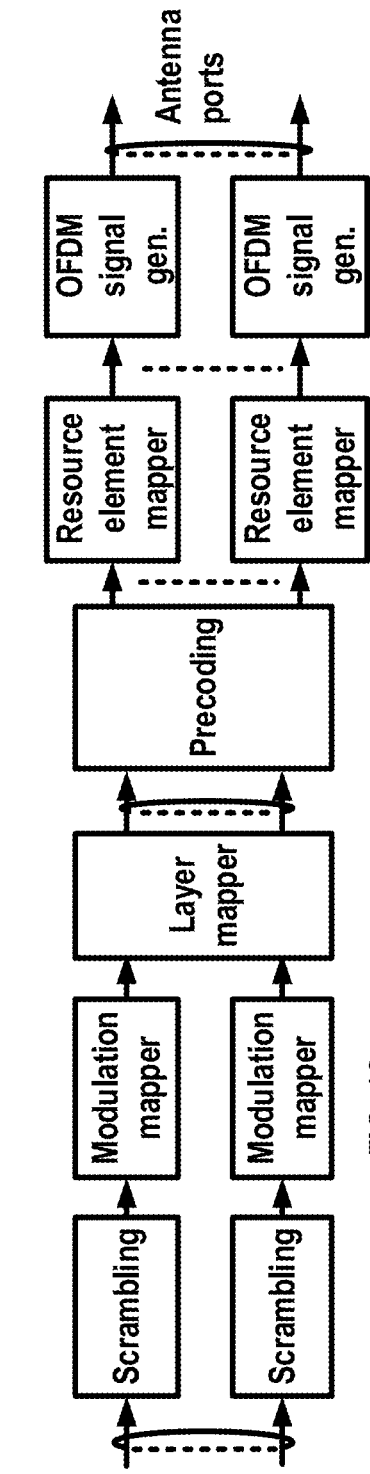
FIG. 4A
FIG. 4B
FIG. 4C
FIG. 4D

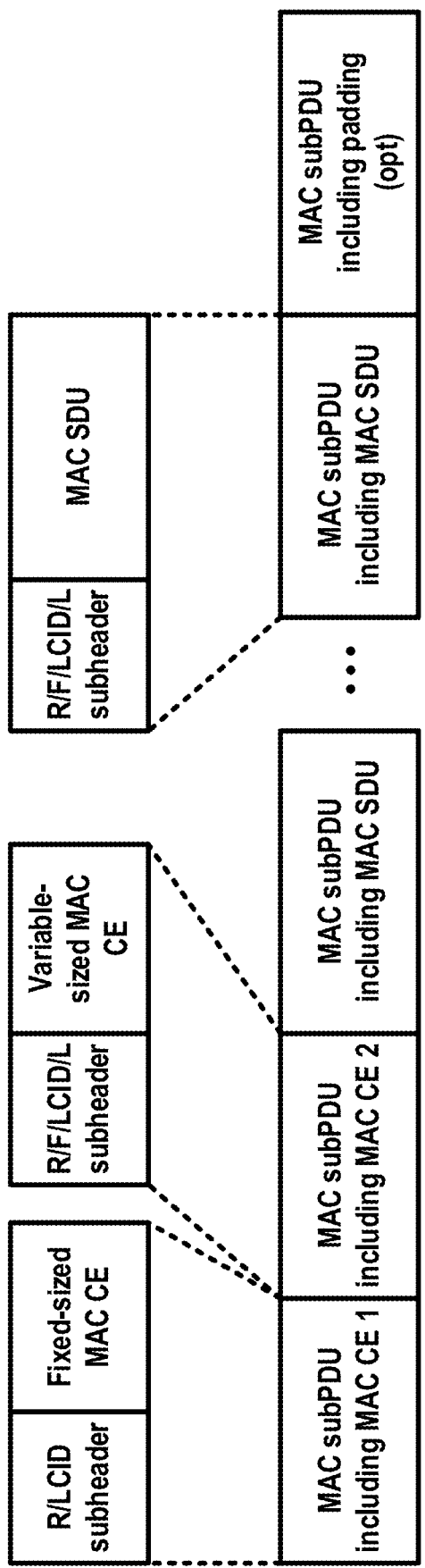
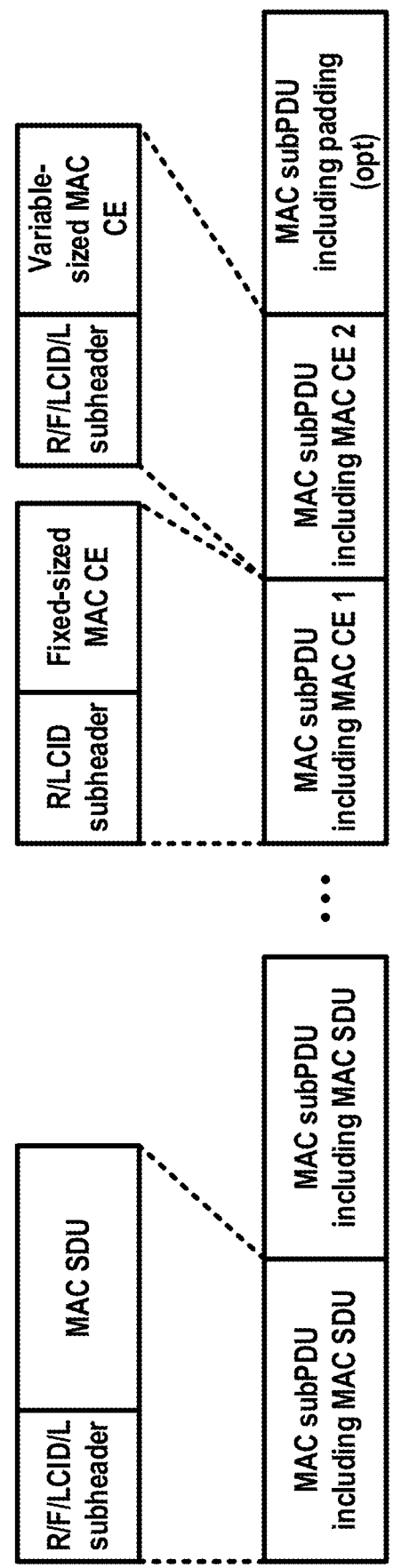
FIG. 17A
FIG. 17B

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

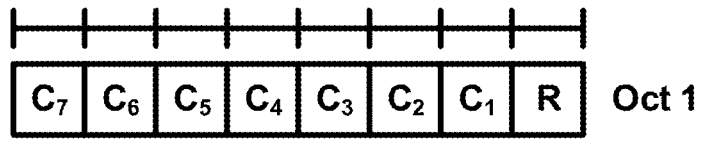
FIG. 21A
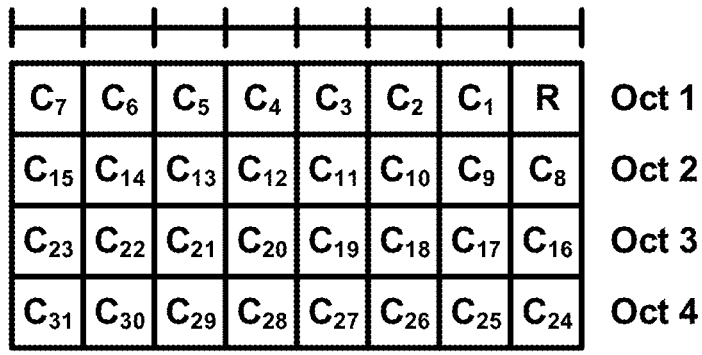
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

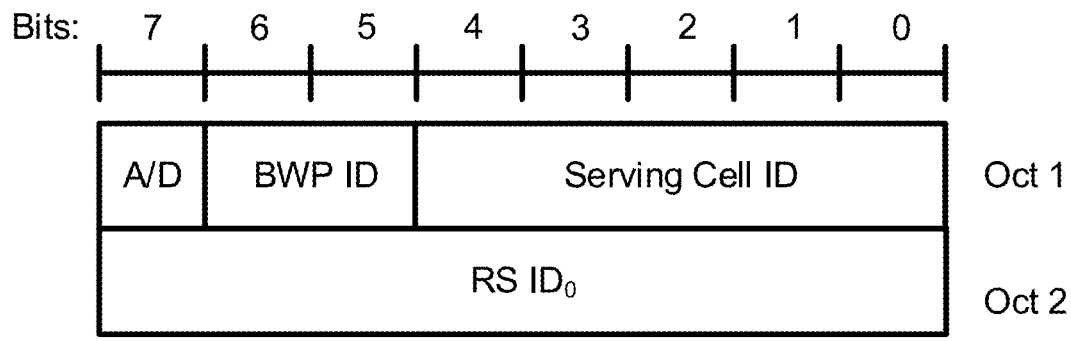
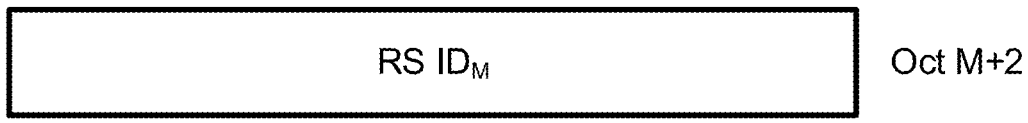
FIG. 29A
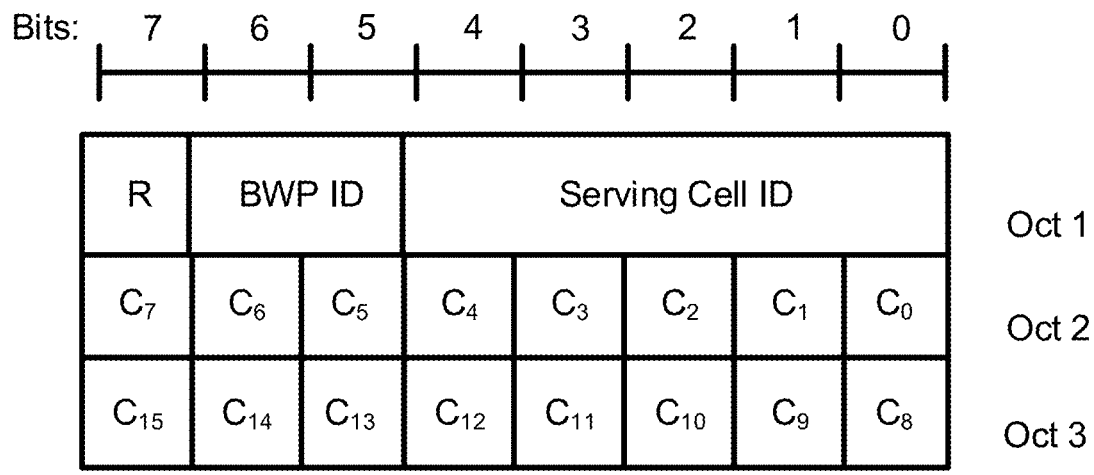
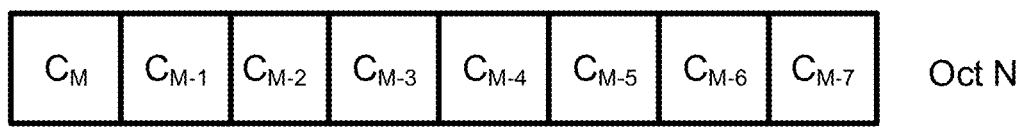
FIG. 29B

RESOURCE MANAGEMENT FOR BEAM FAILURE RECOVERY PROCEDURES

CROSS-REFERENCE TO RELATED APPLICATIONS

This application is a continuation of and claims priority to U.S. patent application Ser. No. 17/231,862 filed on Apr. 15, 2021, which is a continuation of U.S. patent application Ser. No. 16/537,027 filed on Aug. 9, 2019 (now U.S. Pat. No. 11,012,137), which claims the benefit of U.S. Provisional Application No. 62/716,817 filed on Aug. 9, 2018, each of which is hereby incorporated by reference in its entirety.

BACKGROUND

Wireless communications may use bandwidth parts (BWPs) and/or other wireless resources. Random access procedures may be performed, for example, between a base station and a wireless device. Beamforming may be used to establish beams for directional signal transmission and/or reception in wireless communications.

SUMMARY

The following summary presents a simplified summary of certain features. The summary is not an extensive overview and is not intended to identify key or critical elements.

Wireless communications may use random access procedures and beamforming to increase overall network communications data throughput and reduce communications channel interference. A device (e.g., a wireless device and/or a base station) may perform beamforming to focus communications in a cell. Beamforming may be performed based on configuration parameters sent from a base station to a wireless device. If a beam fails, a beam failure recovery (BFR) procedure may be performed to determine a new set of orthogonal beamforming parameter specifications and form a new beam between the wireless device and a base station. The number/quantity of supported independent beams and the quantity of supported beamforming parameter specifications may impact the resource requirements and/or resource management of beam failure recovery procedures. A BFR medium access control control element (MAC CE) may be sent by a base station to a wireless device that may include at least one BFR request resource. The wireless device may use the received at least one beam failure recovery request resource to determine to perform and/or initiate a random access procedure for performing beam failure recovery based on detecting a beam failure. The BFR MAC CE may allocate beam failure recovery resources to particular cells to achieve orthogonality of resource allocation, for example, by specifying particular combinations of random access preambles and time-frequency resource allocations of beams to be used by particular cells, BWPs, and/or other wireless resources. The base station may assign the BFR resources to be used by particular cells according to the BFR MAC CE which may prevent conflicts. Fewer unique BFR resources may be used by a group of cells, and orthogonality between beams assigned to the cells may be achieved, by using the BFR MAC CE to uniquely assign the BFR resources from shared resources to particular cells. Fewer unique BFR resources allocated may reduce computational complexity, reduce power consumption, improve system efficiency, and/or improve device performance.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 17A and FIG. 17B show examples of MAC PDUs.

FIG. 18 shows an example of LCIDs for DL-SCH.

FIG. 19 shows an example of LCIDs for UL-SCH.

FIG. 21A shows an example of an SCell hibernation MAC control element (CE).

FIG. 21B shows an example of an SCell hibernation MAC CE.

FIG. 21C shows an example of MAC CEs for SCell state transitions.

FIG. 29A and FIG. 29B show example MAC CE designs for downlink beam failure recovery procedures.

DETAILED DESCRIPTION

Figure 1:
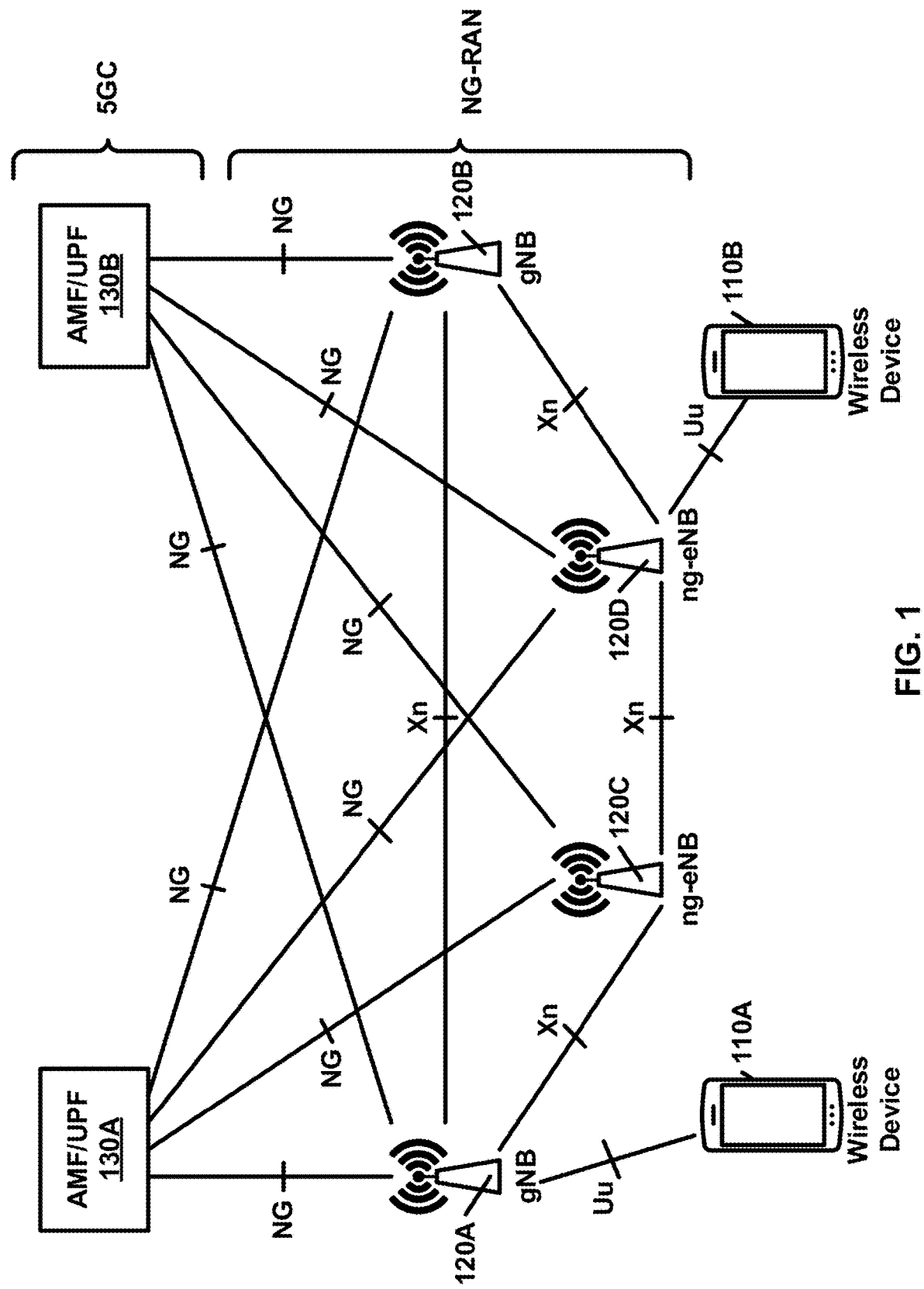
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to resource management for beam failure recovery procedures for wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRI CSI-RS resource indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node j
NACK Negative Acknowledgement
NAS Non-Access Stratum
NG CP Next Generation Control Plane
NGC Next Generation Core
NG-C NG-Control plane ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QOS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving Gate Way
SI System Information
SIB System Information Block
SINR Signal-to-Interference-plus-Noise Ratio
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
STAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QOS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QOS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
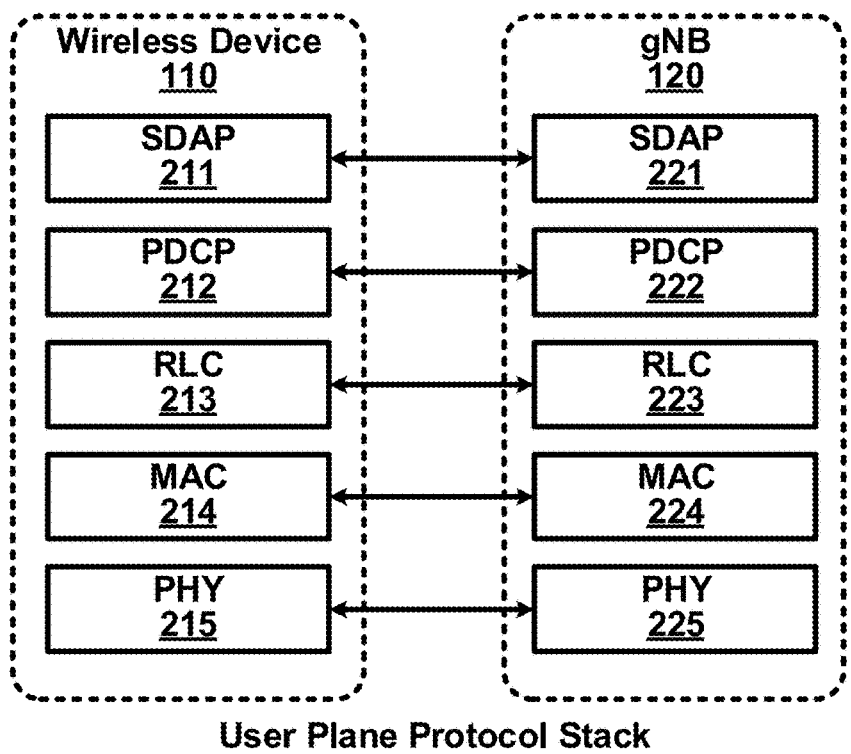
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A wireless device (e.g., a MAC entity of the wireless device) may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
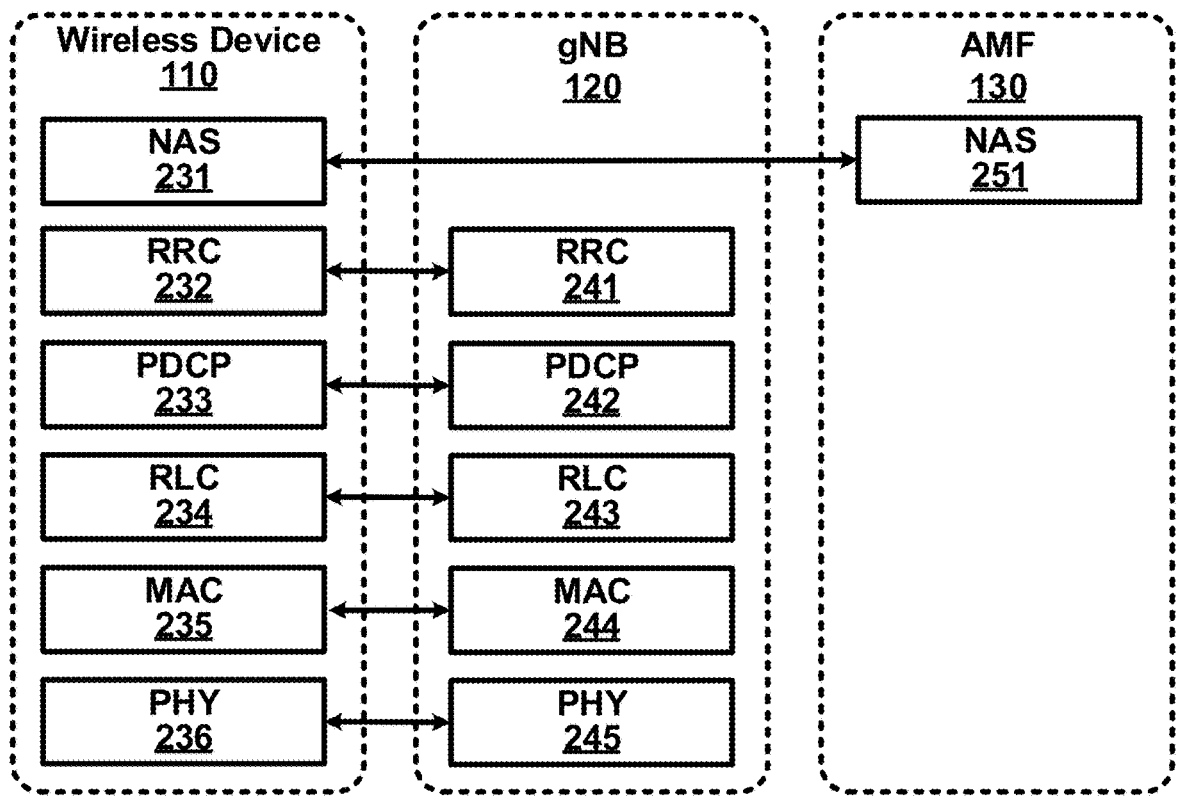
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QOS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
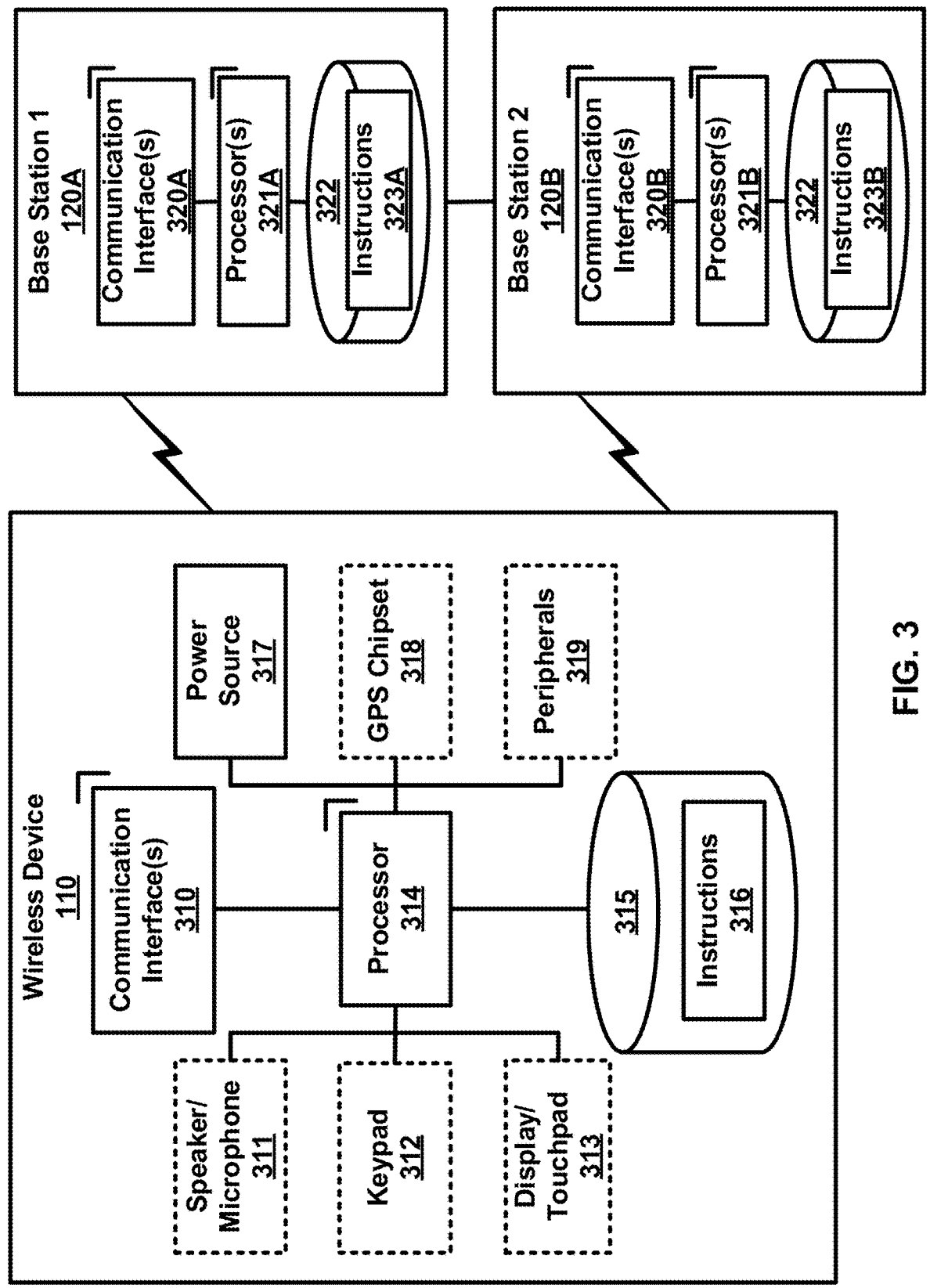
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
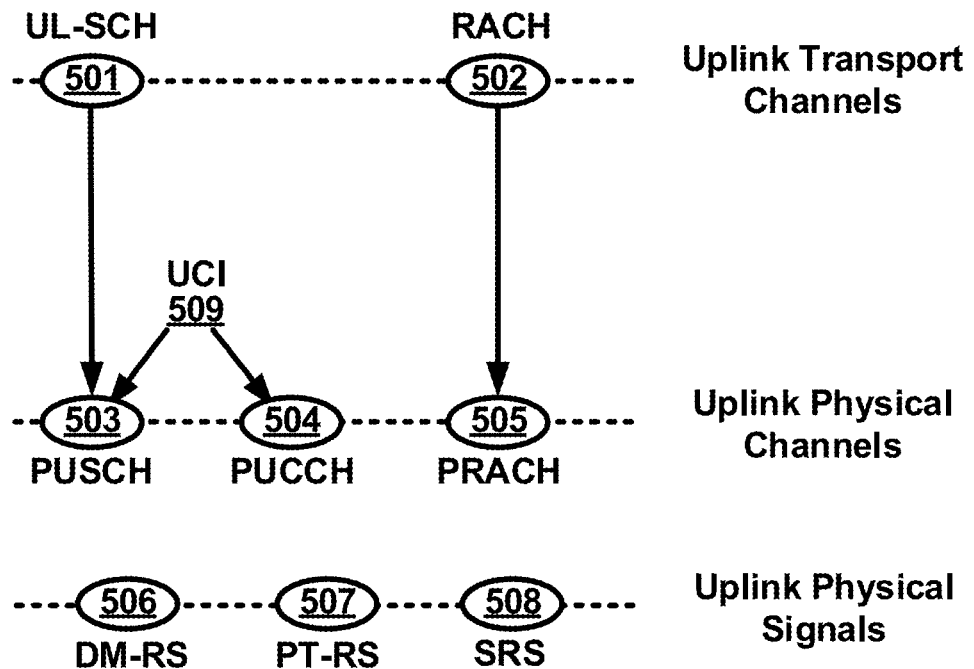
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
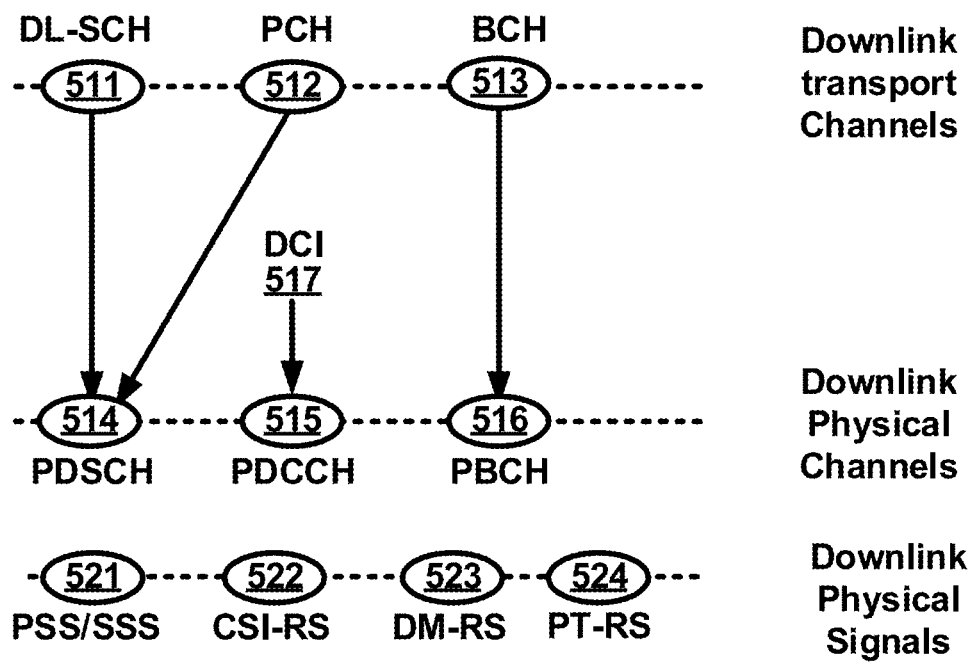
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
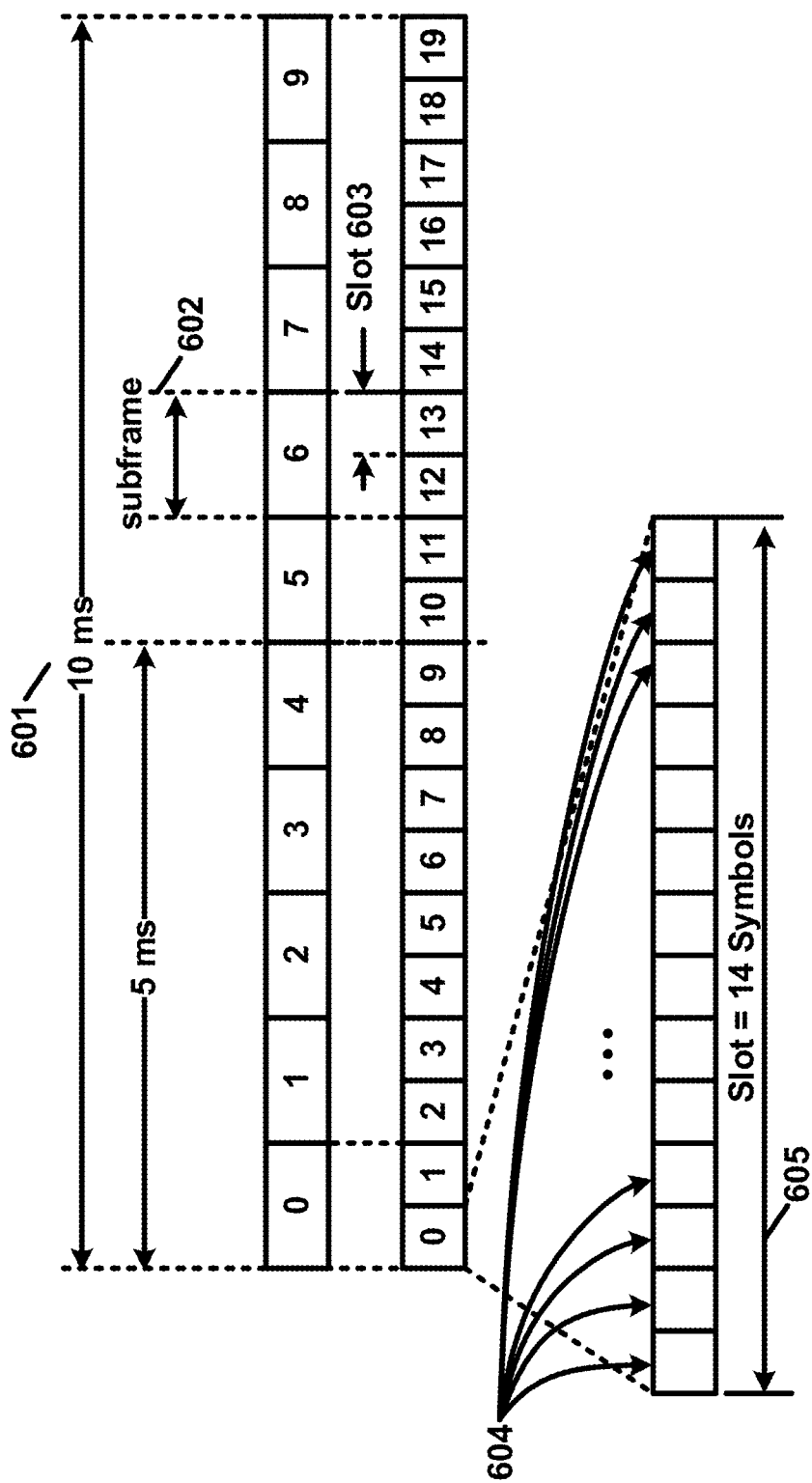
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
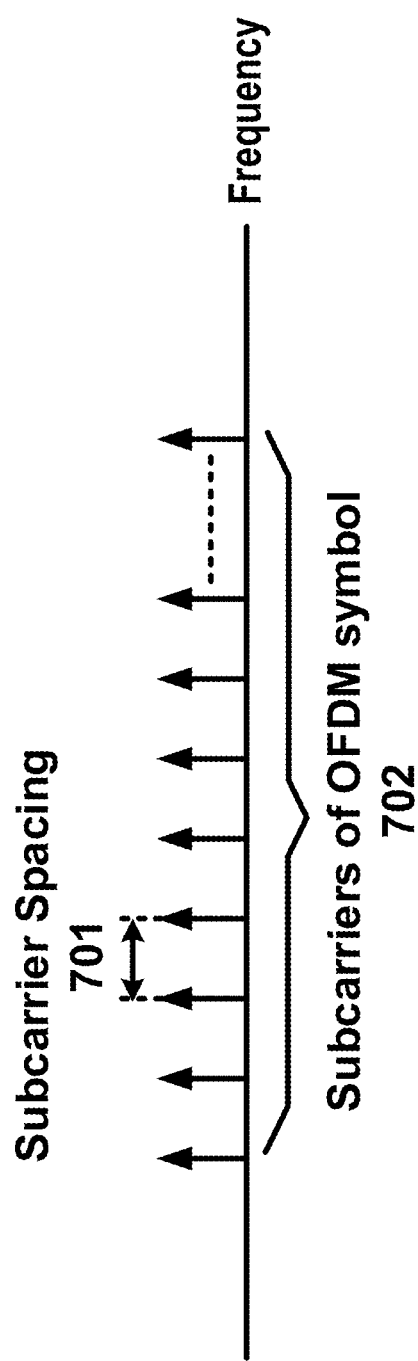
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
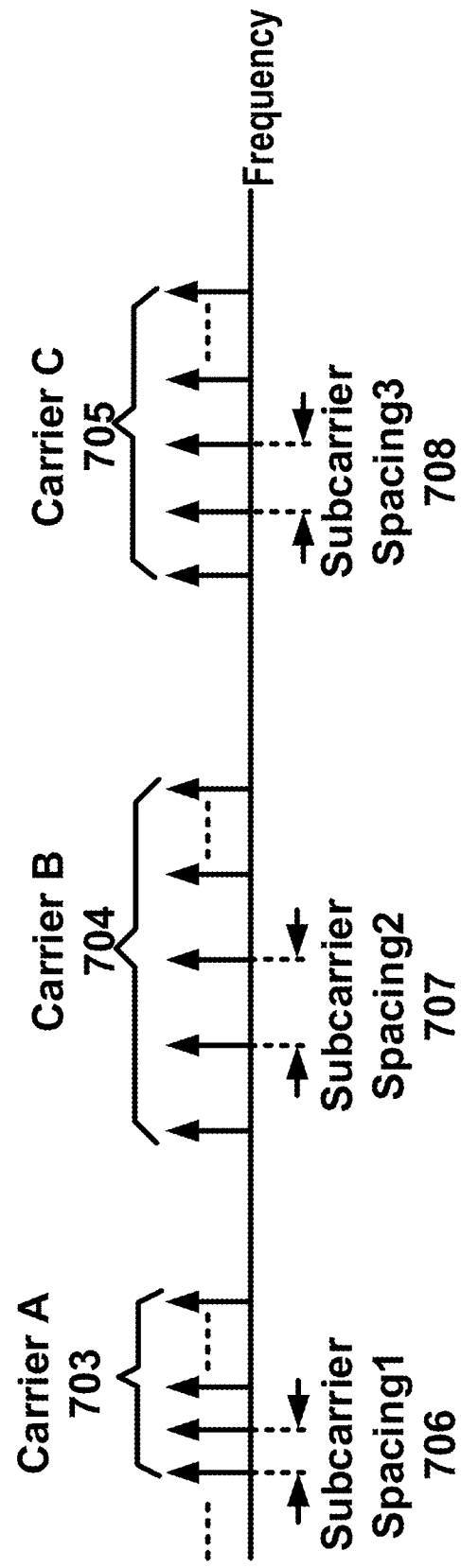

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
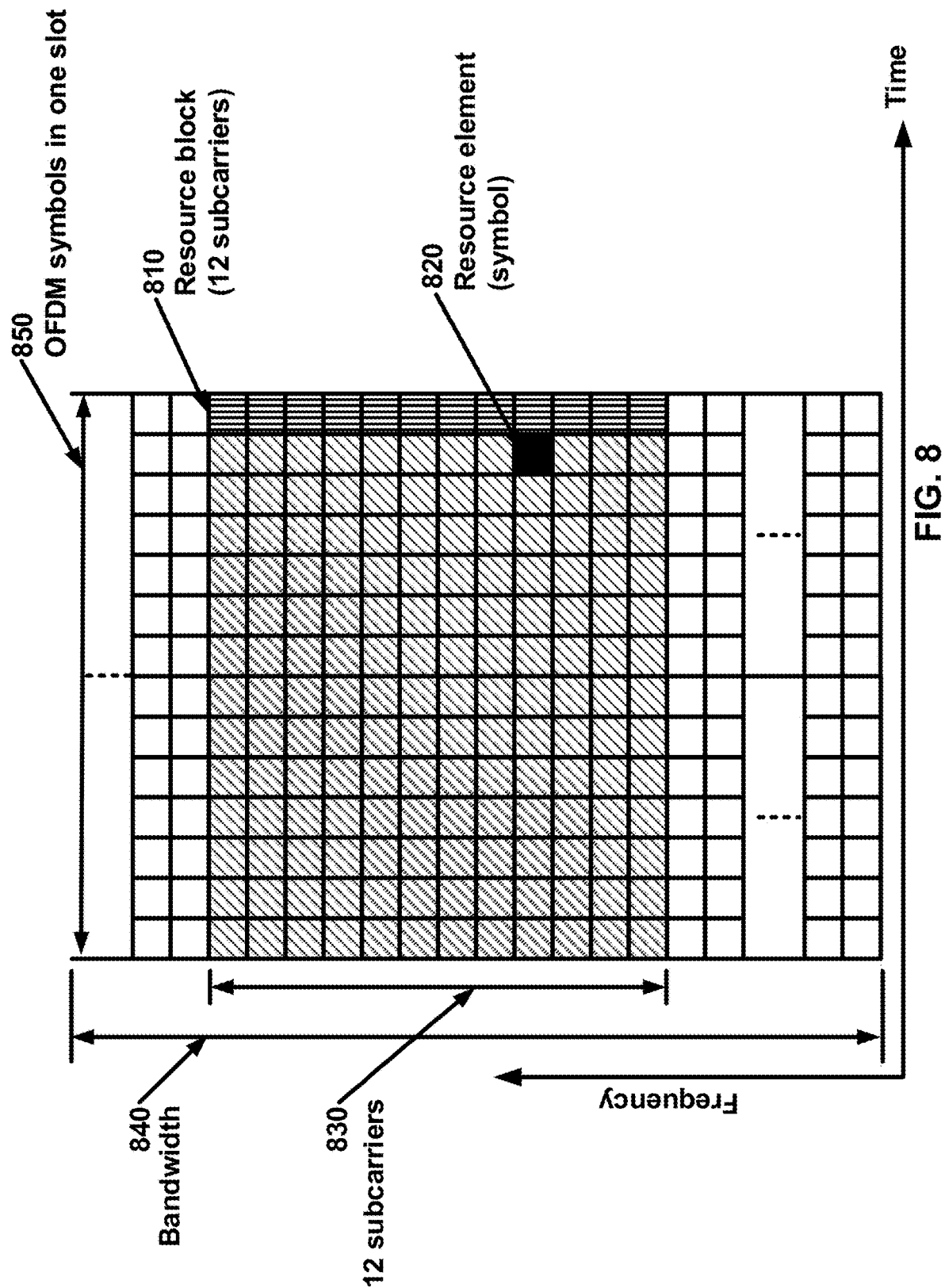
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figures 9A, 9B:
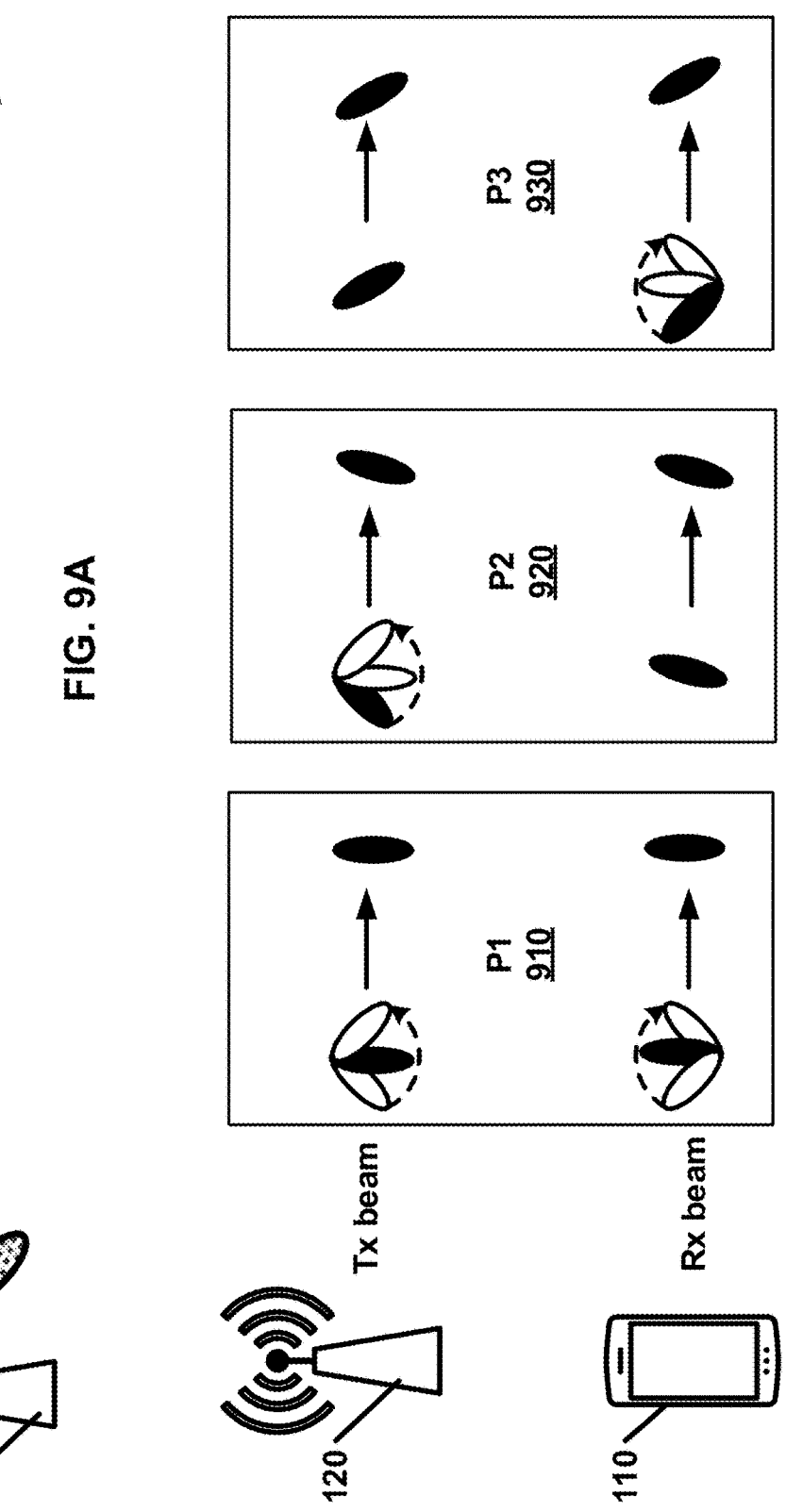
FIG. 9A shows an example channel state information reference signal (CSI-RS) and/or synchronization signal (SS) block transmission in a multi-beam system.
FIG. 9B shows an example downlink beam management procedure.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A PI procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a PI procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
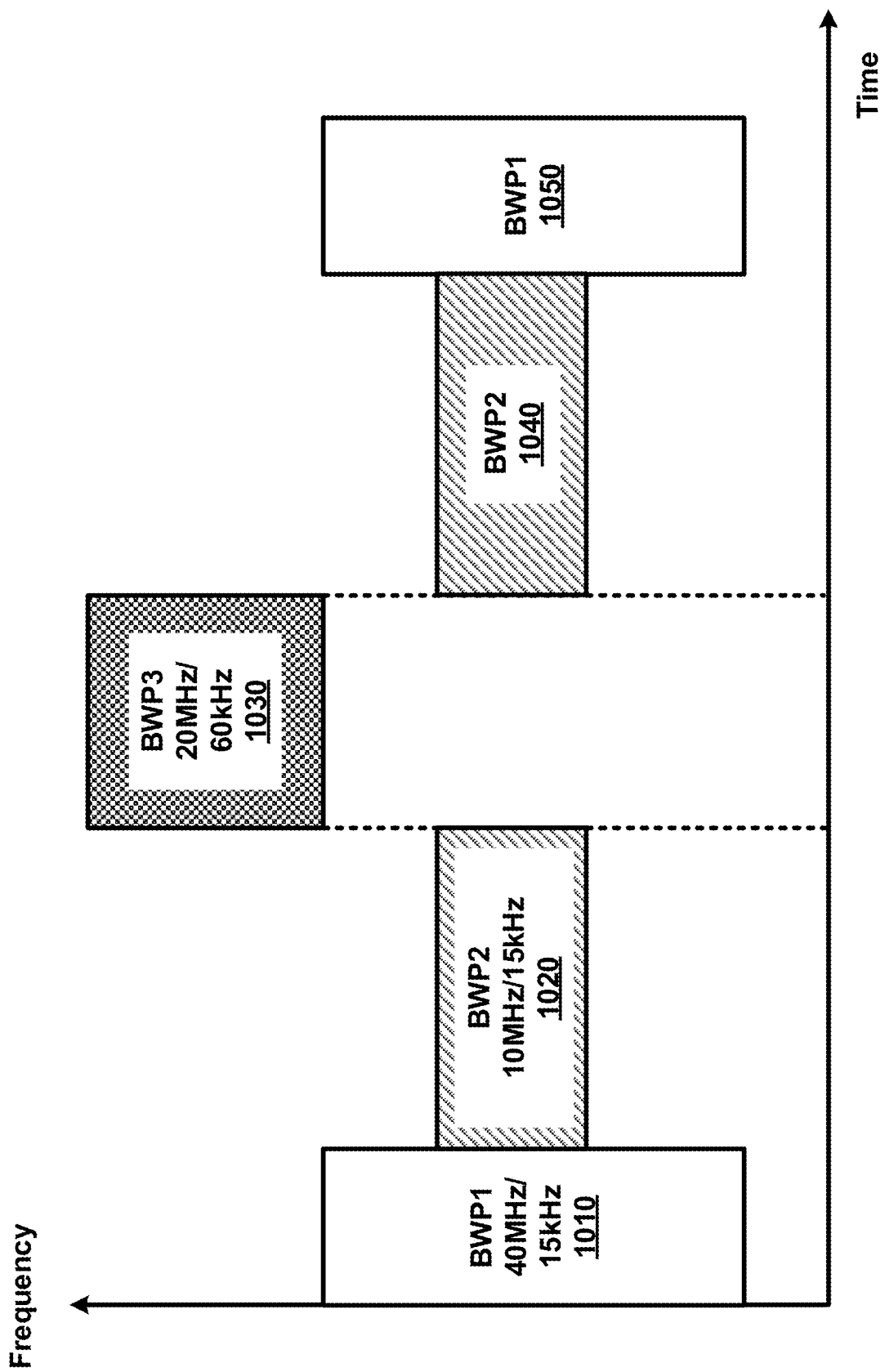
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may refrain from configuring a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
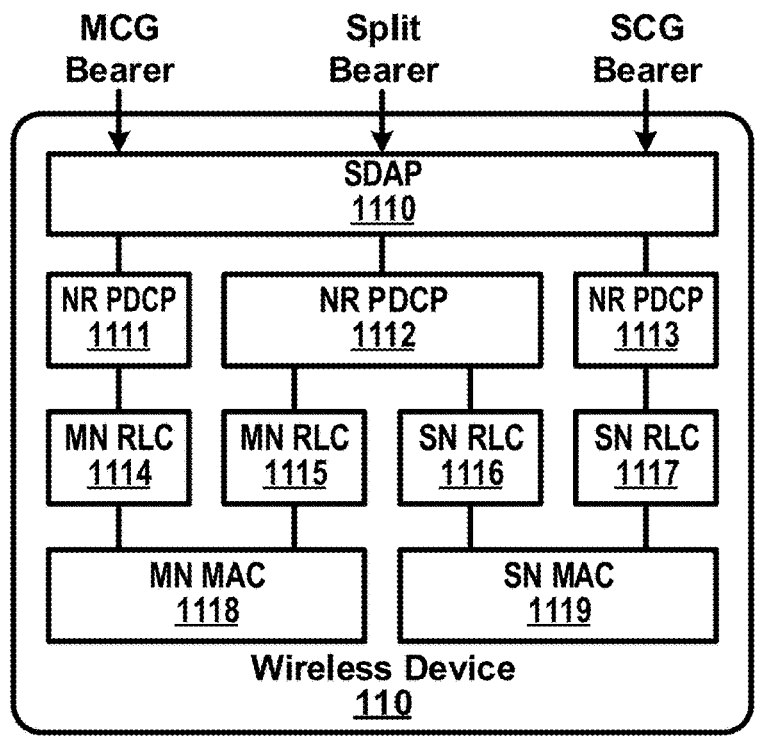
FIG. 11A and FIG. 11B show examples of multi connectivity.
Figure 11B:
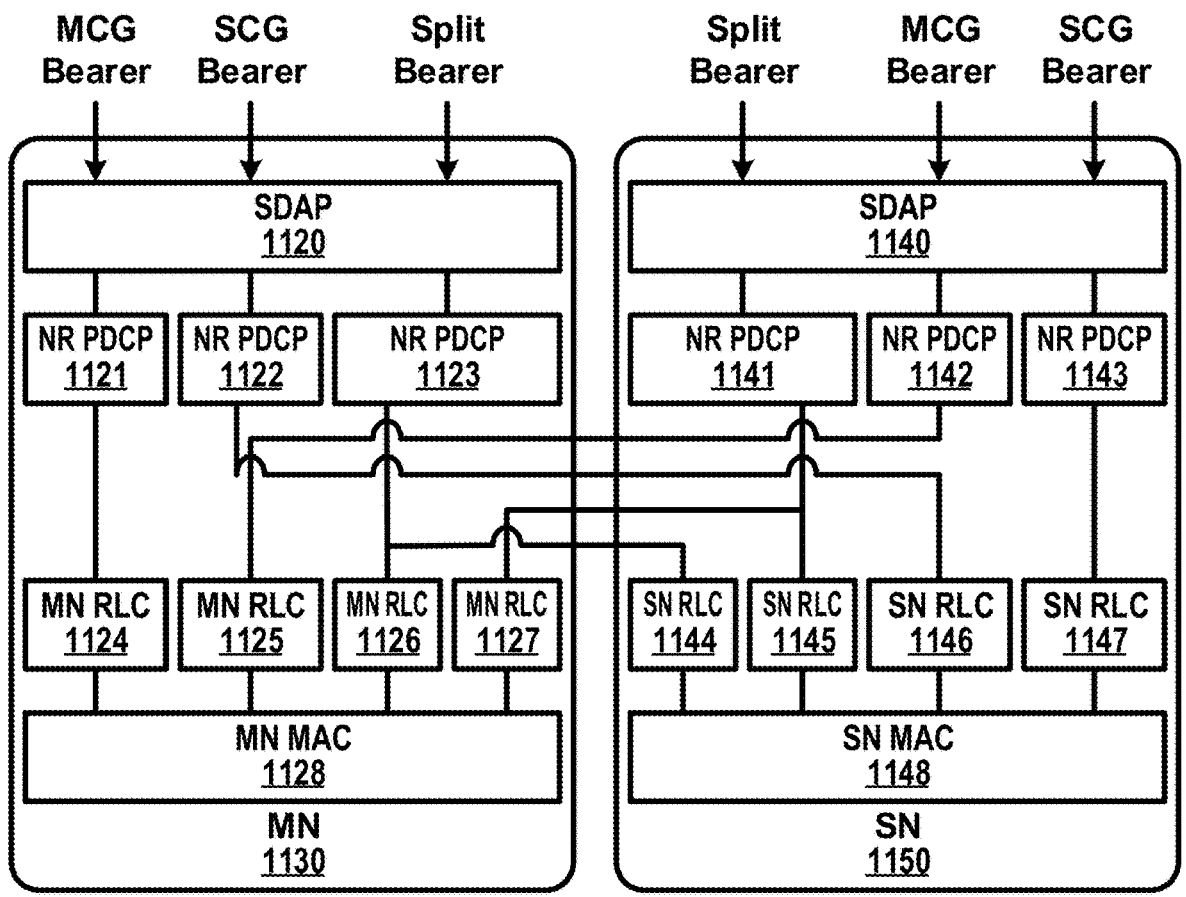

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
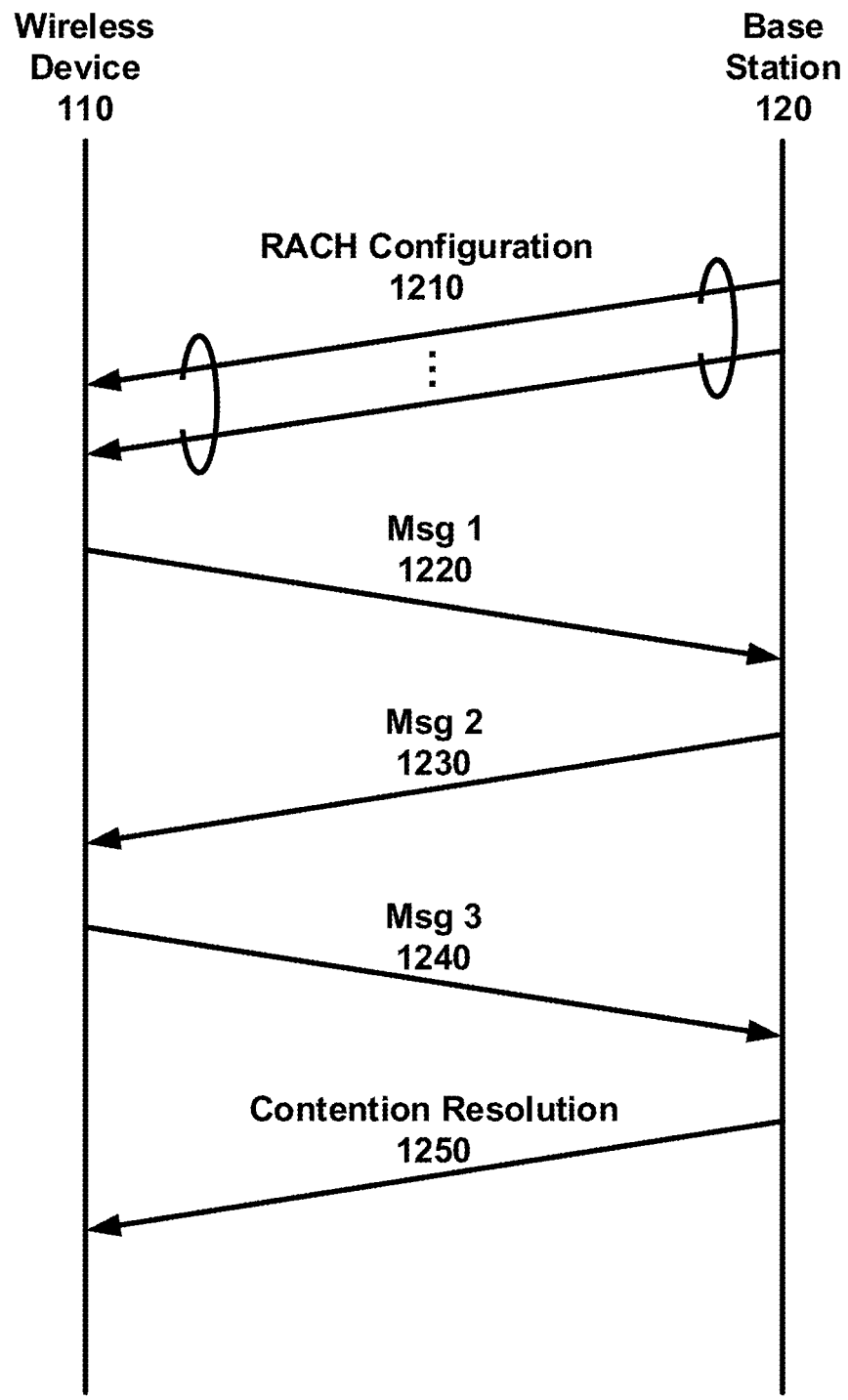
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSRP threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-Response Window) to monitor a random access response. For a beam failure recovery procedure, the base station may configure the wireless device with a different time window (e.g., bfr-Response Window) to monitor response to on a beam failure recovery request. The wireless device may start a time window (e.g., ra-ResponseWindow or bfr-Response Window) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
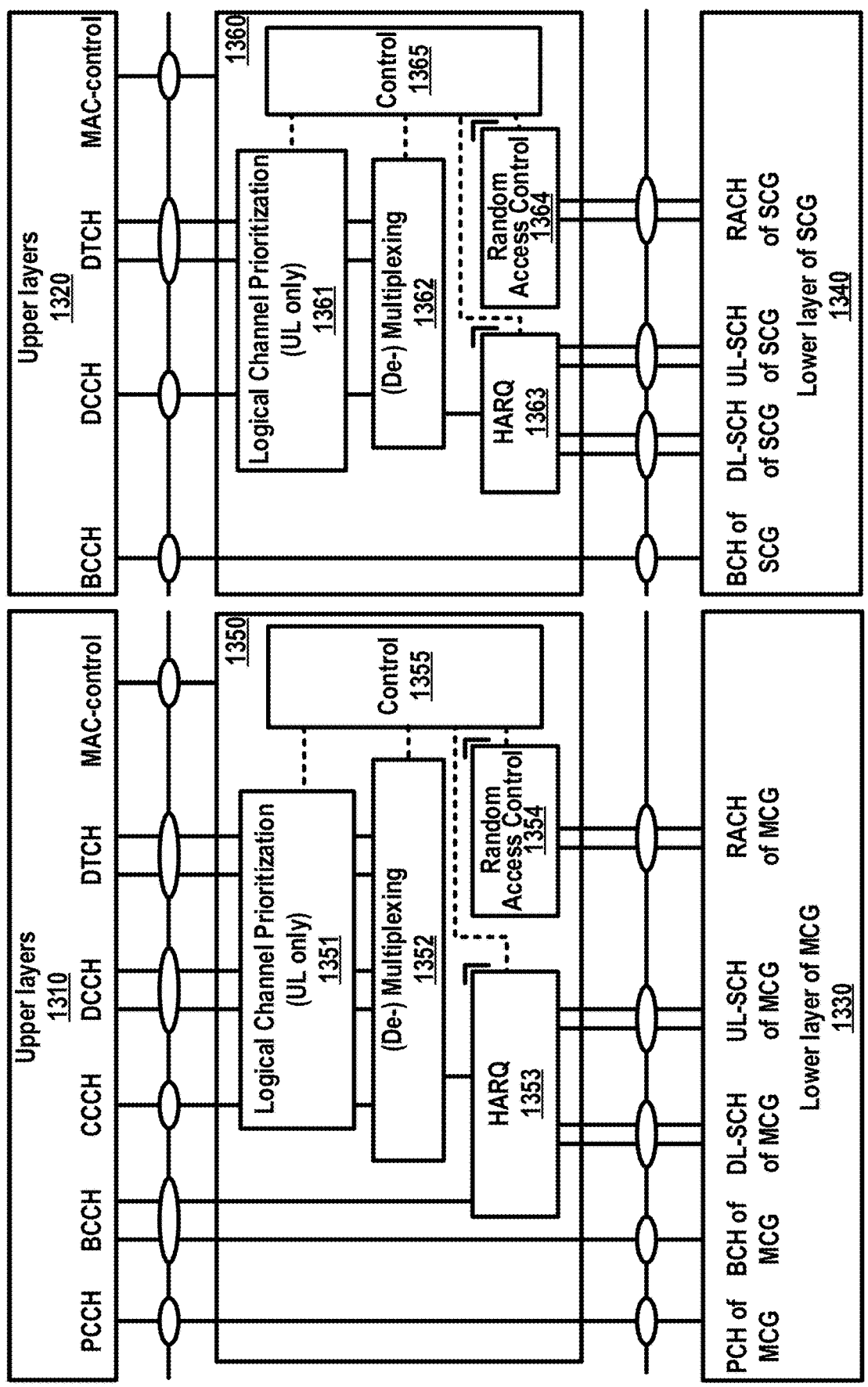
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A wireless device (e.g., a MAC entity of the wireless device) may handle a random access process (e.g., Random Access Control 1354 and/or Random Access Control 1364).

Figure 14:
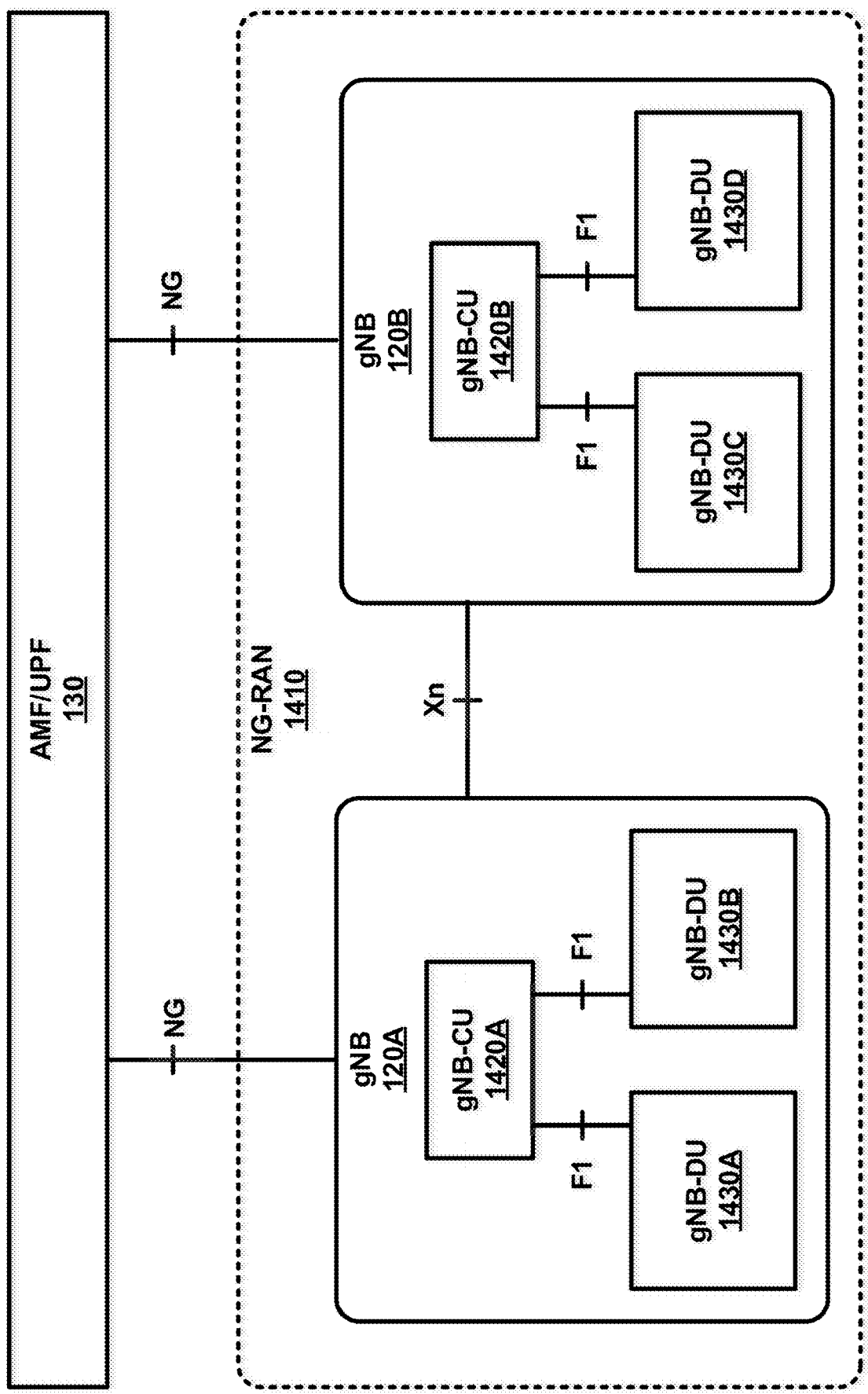
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
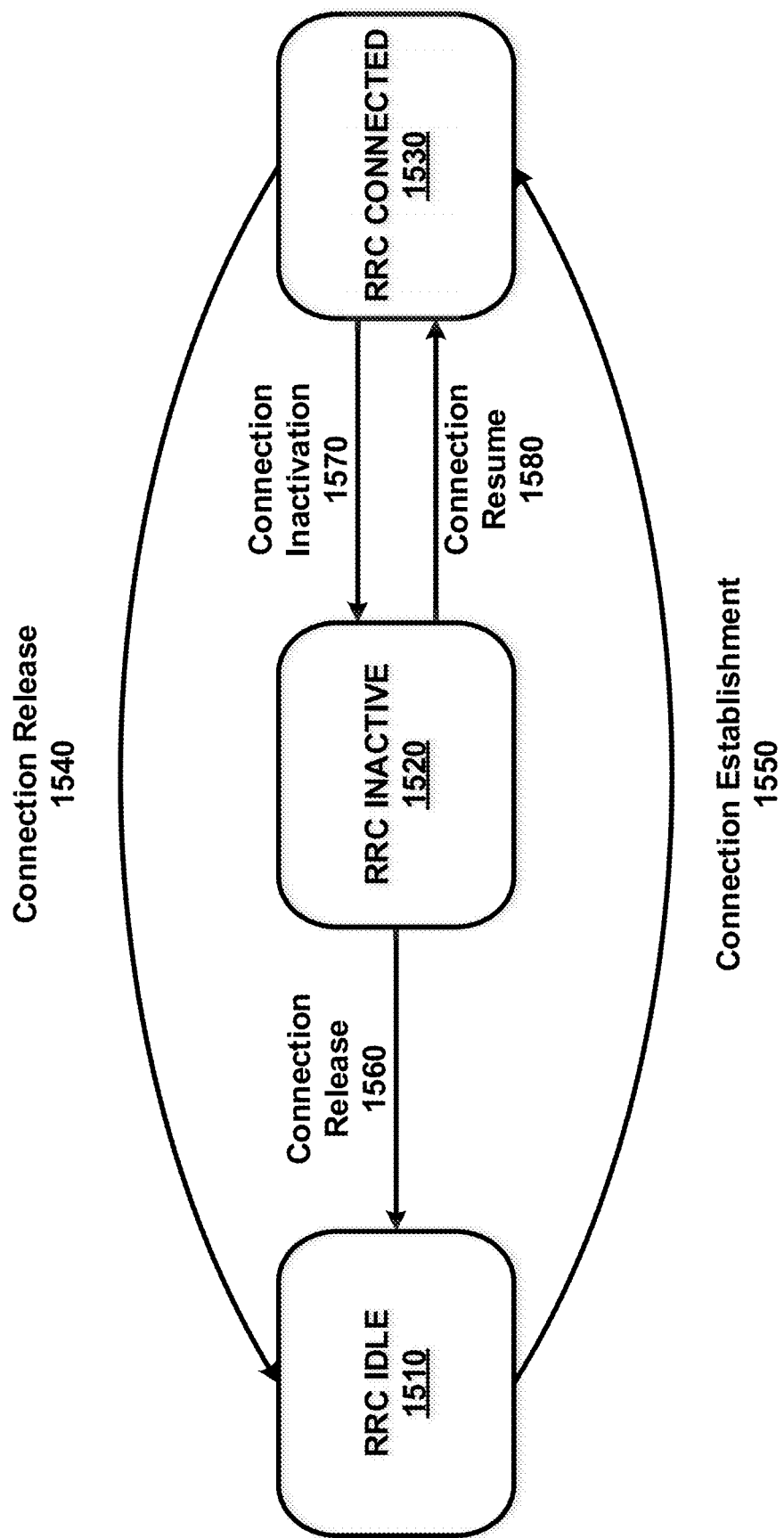
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A wireless device (e.g., a MAC entity of the wireless device) may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
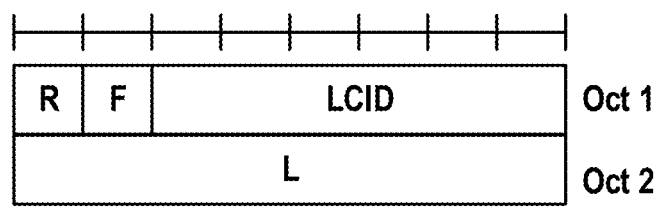
FIG. 16A, FIG. 16B and FIG. 16C show examples of MAC subheaders.

FIG. 16A shows an example of a MAC subheader comprising an eight-bit L field. The LCID field may have six bits in length. The L field may have eight bits in length.

Figure 16B:
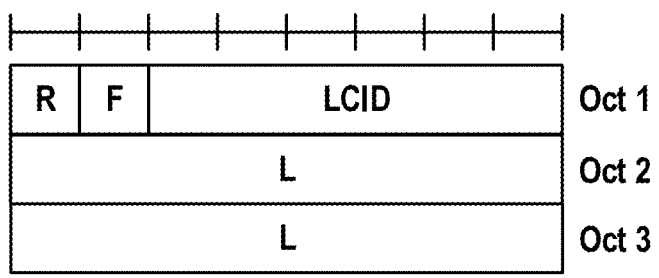

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
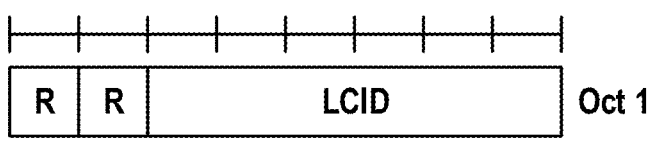

FIG. 16C shows an example of the MAC subheader. The LCID field may comprise six bits in length, and the R field may comprise two bits in length.

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18 shows first examples of LCIDs. FIG. 19 shows second examples of LCIDs. In each of FIG. 18 and FIG. 19, the left columns comprise indices, and the right columns comprises corresponding LCID values for each index.

FIG. 18 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

FIG. 19 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivation Timer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 20A:
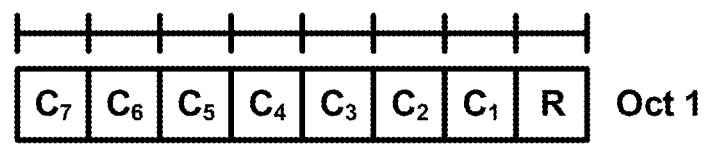
FIG. 20A and FIG. 20B show examples of secondary cell (SCell) Activation/Deactivation MAC CE.

FIG. 20A shows an example of an SCell activation/deactivation MAC CE that may comprise one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 20B:
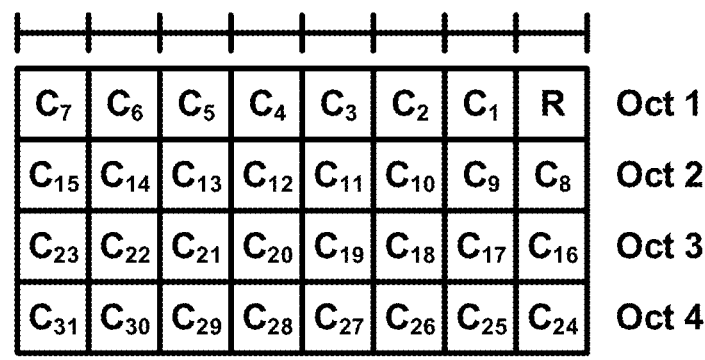

FIG. 20B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station and/or a wireless device may use a power saving mechanism (e.g., hibernation mechanism) of an SCell, for example, if CA is configured. A power saving mechanism may improve battery performance (e.g., runtimes), reduce power consumption of the wireless device, and/or expedite SCell activation and/or SCell addition. The SCell may be transitioned (e.g., switched and/or adjusted) to dormant state if the wireless device initiates a power saving state for (e.g., hibernates) the SCell. The wireless device may, for example, if the SCell is transitioned to dormant state: stop transmitting SRS on the SCell, report CQI/PMI/RI/PTI/CRI for the SCell according to or based on a periodicity configured for the SCell in dormant state, not transmit on an UL-SCH on the SCell, not transmit on a RACH on the SCell, not monitor the PDCCH on the SCell, not monitor the PDCCH for the SCell, and/or not transmit PUCCH on the SCell. Not transmitting, not monitoring, not receiving, and/or not performing an action may comprise, for example, refraining from transmitting, refraining from monitoring, refraining from receiving, and/or refraining from performing an action, respectively. Reporting CSI for an SCell, that has been transitioned to a dormant state, and not monitoring the PDCCH on/for the SCell, may provide the base station an "always-updated" CSI for the SCell. The base station may use a quick and/or accurate channel adaptive scheduling on the SCell, based on the always-updated CSI, if the SCell is transitioned back to active state. Using the always-updated CSI may speed up an activation procedure of the SCell. Reporting CSI for the SCell and not monitoring the PDCCH on and/or for the SCell (e.g., that may have been transitioned to a dormant state), may provide advantages such as increased battery efficiency, reduced power consumption of the wireless device, and/or increased timeliness and/or accuracy of channel feedback information feedback. A PCell/PSCell and/or a PUCCH SCell, for example, may not be configured or transitioned to a dormant state.

A base station may activate, hibernate, or deactivate at least one of one or more configured SCells. A base station may send (e.g., transmit) to a wireless device, for example, one or more messages comprising parameters indicating at least one SCell being set to an active state, a dormant state, or an inactive state. A base station may transmit, for example, one or more RRC messages comprising parameters indicating at least one SCell being set to an active state, a dormant state, or an inactive state. A base station may transmit, for example, one or more MAC control elements (CEs) comprising parameters indicating at least one SCell being set to an active state, a dormant state, or an inactive state.

The wireless device may perform (e.g., if the SCell is in an active state): SRS transmissions on the SCell, CQI/PMI/RI/CRI reporting for the SCell, PDCCH monitoring on the SCell, PDCCH monitoring for the SCell, and/or PUCCH/SPUCCH transmissions on the SCell. The wireless device may (e.g., if the SCell is in an inactive state): not transmit SRS on the SCell, not report CQI/PMI/RI/CRI for the SCell, not transmit on an UL-SCH on the SCell, not transmit on a RACH on the SCell, not monitor PDCCH on the SCell, not monitor a PDCCH for the SCell; and/or not transmit a PUCCH/SPUCCH on the SCell. The wireless device may (e.g., if the SCell is in dormant state): not transmit SRS on the SCell, report CQI/PMI/RI/CRI for the SCell, not transmit on a UL-SCH on the SCell, not transmit on a RACH on the SCell, not monitor a PDCCH on the SCell, not monitor a PDCCH for the SCell, and/or not transmit a PUCCH/SPUCCH on the SCell.

A base station may send (e.g., transmit), for example, a first MAC CE (e.g., an activation/deactivation MAC CE). The first MAC CE may indicate, to a wireless device, activation or deactivation of at least one SCell. A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. A wireless device receiving a MAC CE may ignore the $C_i$ field, for example, if there is no SCell configured with SCell index i. An R field may indicate a reserved bit. The R field may be set to zero.

A base station may transmit a MAC CE (e.g., a hibernation MAC CE) that may generally be referred to herein as a second MAC CE. The second MAC CE may be the same as or different from other MAC CEs described herein, but is generally referred to herein as the second MAC CE. The second MAC CE may indicate activation and/or hibernation of at least one SCell to a wireless device. The second MAC CE may be associated with, for example, a second LCID different from a first LCID of the first MAC CE (e.g., the activation/deactivation MAC CE). The second MAC CE may have a fixed size. The second MAC CE may comprise a single octet comprising seven C-fields and one R-field.

FIG. 21A shows an example of a MAC CE (e.g., the second MAC CE referenced above) comprising a single octet. The second MAC CE may comprise four octets comprising 31 C-fields and one R-field. FIG. 21B shows an example of the second MAC CE comprising four octets. A second MAC CE (e.g., comprising four octets) may be associated with a third LCID. The third LCID may be different from the second LCID for the second MAC CE and/or the first LCID for activation/deactivation MAC CE. The second MAC CE (e.g., comprising one octet) may be used, for example, if there is no SCell with a serving cell index greater than a value (e.g., 7 or any other value). The second MAC CE (e.g., comprising four octets) may be used, for example, if there is an SCell with a serving cell index greater than a value (e.g., 7 or any other value). A second MAC CE may indicate a dormant/activated status of an SCell, for example, if a second MAC CE is received and a first MAC CE is not received. The $C_i$ field of the second MAC CE may indicate a dormant/activated status of an SCell with SCell index i if there is an SCell configured with SCell index i, otherwise the wireless device (e.g., a MAC entity of the wireless device) may ignore the $C_i$ field. A wireless device may transition an SCell associated with SCell index i into dormant state, for example, if $C_i$ of the second MAC CE is set to "1". The wireless device may activate an SCell associated with SCell index i, for example, if $C_i$ of the second MAC CE is set to "0". The wireless device may activate the SCell with SCell index i, for example, if $C_i$ of the second MAC CE is set to "0" and the SCell with SCell index i is in dormant state. The wireless device may ignore the $C_i$ field of the second MAC CE, for example, if the $C_i$ field is set to "0" and the SCell with SCell index i is not in dormant state.

FIG. 21C shows example configurations of a field of the first MAC CE. The field may comprise, for example, a $C_i$ field of the first MAC CE (e.g., an activation/deactivation MAC CE), a $C_i$ field of the second MAC CE (e.g., a hibernation MAC CE), and corresponding resulting SCell status (e.g., activated/deactivated/dormant). The wireless device may deactivate an SCell associated with SCell index i, for example, if $C_i$ of hibernation MAC CE is set to 0, and $C_i$ of the activation/deactivation MAC CE is set to 0. The wireless device may activate an SCell associated with SCell index i, for example, if $C_i$ of hibernation MAC CE is set to 0, and $C_i$ of the activation/deactivation MAC CE is set to 1. The wireless device may ignore the hibernation MAC CE and the activation/deactivation MAC CE, for example, if $C_i$ of hibernation MAC CE is set to 1, and $C_i$ of the activation/deactivation MAC CE is set to 0. The wireless device may transition an SCell associated with SCell index I to a dormant state, for example, if $C_i$ of hibernation MAC CE is set to 1, and $C_i$ of the activation/deactivation MAC CE is set to 1.

Figure 22:
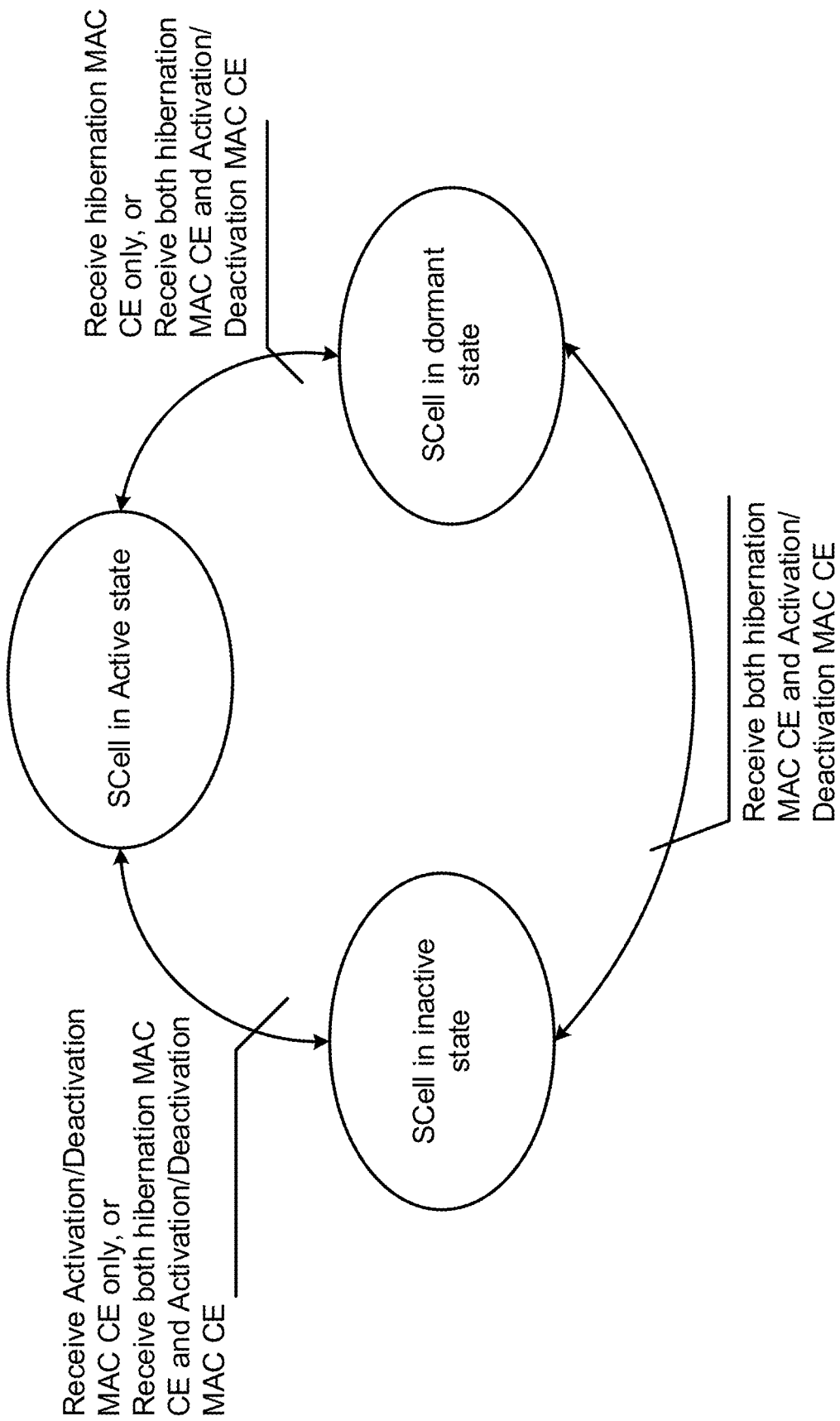
FIG. 22 shows an example of SCell state transition.

FIG. 22 shows an example of SCell state transitions. The SCell state transitions may be based on an activation/deactivation MAC CE and/or a hibernation MAC CE. A first MAC CE (e.g., activation/deactivation MAC CE) and a second MAC CE (e.g., hibernation MAC CE) may indicate possible state transitions of the SCell with SCell index i if there is an SCell configured with SCell index i, and if both the first MAC CE and the second MAC CE are received, otherwise the wireless device (e.g., a MAC entity of the wireless device) may ignore the $C_i$ fields. The $C_i$ fields of the two MAC CEs may be interpreted according to FIG. 21C. A first MAC CE (e.g., activation/deactivation MAC CE) or a second MAC CE (e.g., hibernation MAC CE) may indicate possible state transitions of the SCell with SCell index i, for example, if there is an SCell configured with SCell index i, and if one of the first MAC CE and the second MAC CE is received. A MAC entity of a wireless device may, for example, deactivate an SCell, for example, if the MAC entity receives a MAC CE(s) (e.g., activation/deactivation MAC CE) indicating deactivation of an SCell. The MAC entity may, based on the MAC CE(s): deactivate the SCell, stop an SCell deactivation timer associated with the SCell, and/or flush all HARQ buffers associated with the SCell.

A base station may activate, hibernate, and/or deactivate at least one of one or more SCells, for example, if the base station is configured with the one or more SCells. A MAC entity of a base station and/or a wireless device may maintain an SCell deactivation timer (e.g., sCellDeactivationTimer), for example, per a configured SCell and/or except for an SCell configured with PUCCH/SPUCCH, if any. The MAC entity of the base station and/or the wireless device may deactivate an associated SCell, for example, if an SCell deactivation timer expires. A MAC entity of a base station and/or a wireless device may maintain dormant SCell deactivation timer (e.g., dormantSCellDeactivationTimer), for example, per a configured SCell and/or except for an SCell configured with PUCCH/SPUCCH, if any. The MAC entity of the base station and/or the wireless device may deactivate an associated SCell, for example, if the dormant SCell deactivation timer expires (e.g., if the SCell is in dormant state).

A MAC entity of a base station and/or a wireless device may, for example, maintain an SCell hibernation timer (e.g., sCellHibernationTimer), for example, per a configured SCell and/or except for an SCell configured with PUCCH/SPUCCH, if any. The MAC entity of the base station and/or the wireless device may hibernate an associated SCell, for example, if the SCell hibernation timer expires (e.g., if the SCell is in active state). The SCell hibernation timer may take priority over the SCell deactivation timer, for example, if both the SCell deactivation timer and the SCell hibernation timer are configured. A base station and/or a wireless device may ignore the SCell deactivation timer regardless of the SCell deactivation timer expiry, for example, if both the SCell deactivation timer and the SCell hibernation timer are configured.

Figure 23:
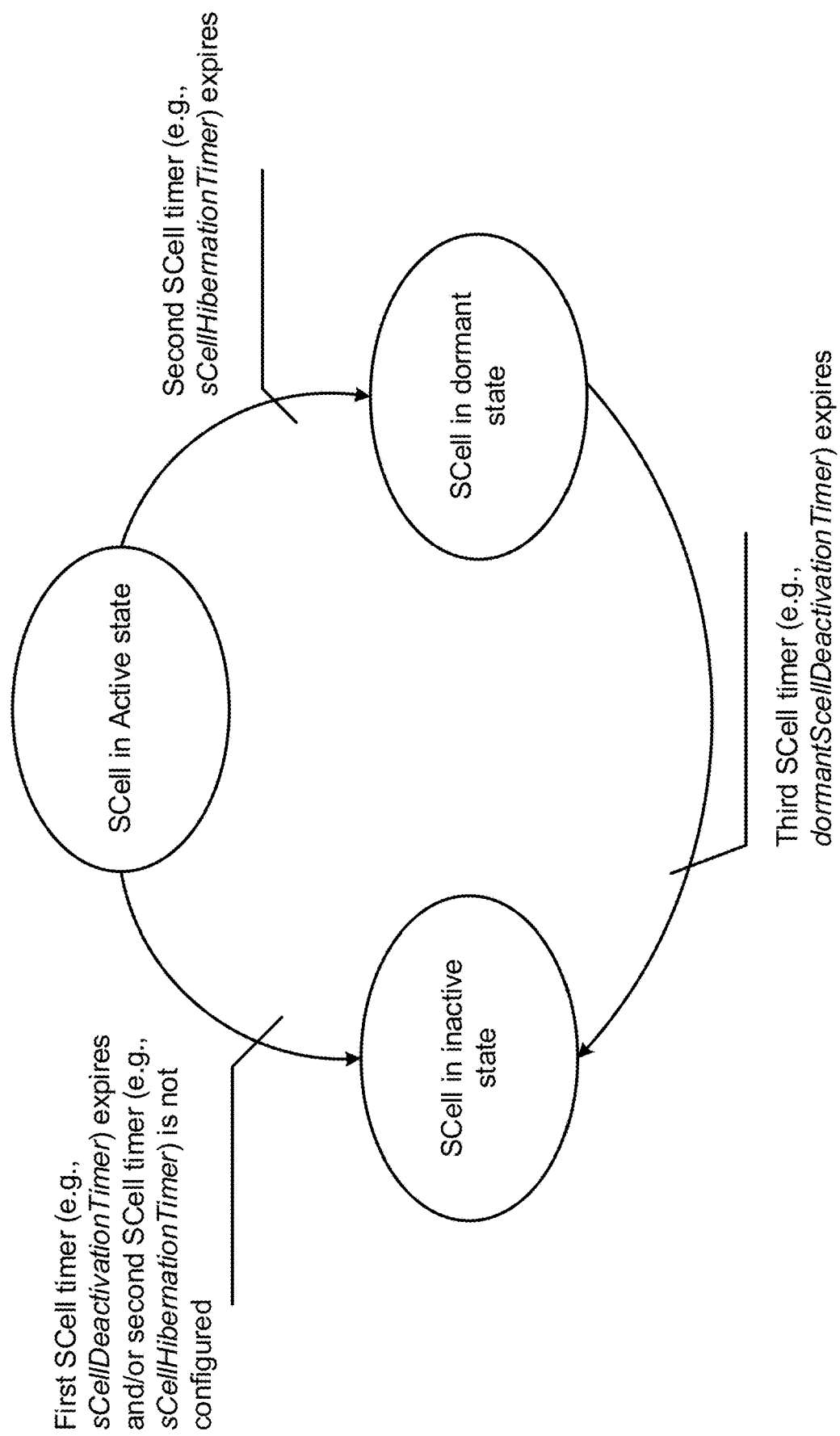
FIG. 23 shows an example of SCell state transition.

FIG. 23 shows an example of SCell states (e.g., state transitions, state switching, etc.). The SCell state transitions may be based on, for example, a first SCell timer (e.g., an SCell deactivation timer or sCellDeactivationTimer), a second SCell timer (e.g., an SCell hibernation timer or sCellHibernationTimer), and/or a third SCell timer (e.g., a dormant SCell deactivation timer or dormantSCellDeactivationTimer). A base station (e.g., a MAC entity of a base station) and/or a wireless device (e.g., a MAC entity of a wireless device) may, for example, implement the SCell state transitions based on expiration of the first SCell timer, the second SCell timer, and/or the third SCell. The base station and/or the wireless device may, for example, implement the SCell state transitions based on whether or not a timer (e.g., the second SCell timer) is configured. A base station (e.g., a MAC entity of a base station) and/or a wireless device (e.g., a MAC entity of a wireless device) may (e.g., if an SCell deactivation timer expires and an SCell hibernation timer is not configured): deactivate an SCell, stop the SCell deactivation timer associated with the SCell, and/or flush all HARQ buffers associated with the SCell.

A wireless device (e.g., MAC entity of a wireless device) may activate an SCell, for example, if the MAC entity is configured with an activated SCell at SCell configuration. A wireless device (e.g., MAC entity of a wireless device) may activate an SCell, for example, if the wireless device receives a MAC CE(s) activating the SCell. The wireless device (e.g., MAC entity of a wireless device) may start or restart an SCell deactivation timer associated with an SCell, for example, based on or in response to activating the SCell. The wireless device (e.g., MAC entity of a wireless device) may start or restart an SCell hibernation timer (e.g., if configured) associated with an SCell, for example, based on or in response to activating the SCell. A wireless device (e.g., MAC entity of a wireless device) may trigger a PHR procedure, for example, based on or in response to activating an SCell.

A wireless device (e.g., MAC entity of a wireless device) and/or a base station (e.g., a MAC entity of a base station) may (e.g., if a first PDCCH on an SCell indicates an uplink grant or downlink assignment, or a second PDCCH on a serving cell scheduling the SCell indicates an uplink grant or a downlink assignment for the SCell, or a MAC PDU is transmitted in a configured uplink grant or received in a configured downlink assignment) restart an SCell deactivation timer associated with an activated SCell and/or restart an SCell hibernation timer (e.g., if configured) associated with the SCell. An ongoing random access (RA) procedure on an SCell may be aborted, for example, if, the SCell is deactivated.

A wireless device (e.g., MAC entity of a wireless device) and/or a base station (e.g., a MAC entity of a base station) may (e.g., if configured with an SCell associated with an SCell state set to dormant state upon the SCell configuration, or if receiving MAC CE(s) for transitioning the SCell to dormant state): set (e.g., transition) the SCell to dormant state, stop an SCell deactivation timer associated with the SCell, stop an SCell hibernation timer (e.g., if configured) associated with the SCell, start or restart a dormant SCell deactivation timer associated with the SCell, and/or flush all HARQ buffers associated with the SCell. The wireless device (e.g., MAC entity of a wireless device) and/or a base station (e.g., a MAC entity of a base station) may (e.g., if the SCell hibernation timer associated with the activated SCell expires): hibernate the SCell, stop the SCell deactivation timer associated with the SCell, stop the SCell hibernation timer associated with the SCell, and/or flush all HARQ buffers associated with the SCell. The wireless device (e.g., MAC entity of a wireless device) and/or a base station (e.g., a MAC entity of a base station) may (e.g., if a dormant SCell deactivation timer associated with a dormant SCell expires): deactivate the SCell and/or stop the dormant SCell deactivation timer associated with the SCell. Ongoing RA procedure on an SCell may be aborted, for example, if the SCell is in dormant state.

A base station (e.g., a gNB) may configure a wireless device (e.g., a UE) with UL BWPs and DL BWPs to enable BA on a PCell. The base station may further configure the wireless device with at least DL BWP(s) (e.g., there may be no UL BWPs in the UL) to enable BA on an SCell, if CA is configured. An initial active BWP may be a first BWP used for initial access, for example, for the PCell. A first active BWP may be a second BWP configured for the wireless device to operate on the SCell, upon the SCell being activated. A base station and/or a wireless device may independently switch a DL BWP and an UL BWP, for example, if operating in a paired spectrum (e.g., FDD). A base station and/or a wireless device may simultaneously switch a DL BWP and an UL BWP, for example, if operating in an unpaired spectrum (e.g., TDD).

A base station and/or a wireless device may switch a BWP between configured BWPs, for example, based on a DCI or a BWP inactivity timer. A base station and/or a wireless device may switch an active BWP to a default BWP, for example, based on or in response to an expiry of a BWP inactivity timer, if configured, associated with a serving cell. The default BWP may be configured by the network.

One UL BWP for each uplink carrier and one DL BWP, for example, may be active at a time in an active serving cell, for example, for FDD systems that are configured with BA. One DL/UL BWP pair, for example, may be active at a time in an active serving cell, for example, for TDD systems. Operating on the one UL BWP and the one DL BWP (or the one DL/UL BWP pair) may, for example, improve wireless device battery consumption. BWPs other than the one active UL BWP and the one active DL BWP that the wireless device may work on may be deactivated. On deactivated BWPs, the wireless device may: not monitor PDCCH and/or not transmit on a PUCCH, PRACH, and/or UL-SCH.

A serving cell may be configured with any number of BWPs (e.g., up to four, or up to any other number of BWPs). There may be, for example, one or any other number of active BWPs at any point in time for an activated serving cell.

BWP switching for a serving cell may be used, for example, to activate an inactive BWP and/or deactivate an active BWP (e.g., at a time t). The BWP switching may be controlled, for example, by a PDCCH indicating a downlink assignment and/or an uplink grant. The BWP switching may be controlled, for example, by a BWP inactivity timer (e.g., bwp-InactivityTimer). The BWP switching may be controlled, for example, by a MAC entity based on or in response to initiating an RA procedure. One or more BWPs may be initially active, without receiving a PDCCH indicating a downlink assignment or an uplink grant, for example, if an SpCell is added or an SCell is activated. The active BWP for a serving cell may be indicated by RRC message and/or PDCCH. A DL BWP may be paired with an UL BWP, and BWP switching may be common for both UL and DL, for example, for unpaired spectrum.

A base station may configure a wireless device with one or more TCI-States using and/or via higher layer signaling. A number (e.g., quantity, plurality, etc.) of the one or more TCI-States may depend on a capability of the wireless device. The wireless device may use the one or more TCI-States to decode a PDSCH based on a detected PDCCH. Each of the one or more TCI-States state may include one RS set TCI-RS-SetConfig. The one RS set TCI-RS-SetConfig may contain one or more parameters. The one or more parameters may be used, for example, to configure quasi co-location relationship between one or more reference signals in the RS set and the DM-RS port group of the PDSCH. The one RS set may contain a reference to either one or two DL RSs and an associated quasi co-location type (QCL-Type) for each one as configured by the higher layer parameter QCL-Type. QCL-Types associated with two DL RSs may not necessarily be the same, for example, if the one RS set contains a reference to the two DL RSs. The references of the two DL RSs may be, for example, to a same DL RS or to different DL RSs. The QCL-Types indicated to the wireless device may be based on a higher layer parameter QCL-Type. The higher layer parameter QCL-Type may take one or a combination of the following types: QCL-TypeA': {Doppler shift, Doppler spread, average delay, delay spread}, QCL-TypeB': {Doppler shift, Doppler spread}, QCL-TypeC': {average delay, Doppler shift} and QCL-TypeD': {Spatial Rx parameter}.

A wireless device may receive an activation command. The activation command may be used to map one or more TCI states to one or more codepoints of a TCI field in DCI. The wireless device may assume that one or more antenna ports of one DM-RS port group of a PDSCH of a serving cell are spatially quasi co-located with an SSB, for example, (i) before the wireless device receives the activation command and/or (ii) after the wireless device receives a higher layer configuration of TCI-States. The SSB may be determined in an initial access procedure with respect to one or more of a Doppler shift, a Doppler spread, an average delay, a delay spread, and spatial Rx parameters, where applicable.

A wireless device may be configured by a base station, with a higher layer parameter TCI-PresentInDCI. If the higher layer parameter TCI-PresentInDCI is set as 'Enabled' for a CORESET scheduling a PDSCH, the wireless device may assume that a TCI field is present in a DL DCI of a PDCCH transmitted on the CORESET. If the higher layer parameter TCI-PresentInDCI is set as 'Disabled' for a CORESET scheduling a PDSCH or if the PDSCH is scheduled by a DCI format 1_0 the wireless device may assume, for determining PDSCH antenna port quasi co-location, that a TCI state for the PDSCH is identical to the TCI state applied for the CORESET used for the PDCCH transmission.

The wireless device may use one or more TCI-States according to a value of a TCI field in a detected PDCCH with DCI for determining PDSCH antenna port quasi co-location if the higher layer parameter TCI-PresentInDCI is set as 'Enabled'. The wireless device may assume that antenna ports of one DM-RS port group of a PDSCH of a serving cell are quasi co-located with one or more RS(s) in an RS set with respect to QCL type parameter(s) given by the indicated TCI state if a time offset between the reception of the DL DCI and the corresponding PDSCH is equal to or greater than a threshold Threshold-Sched-Offset. The threshold may be based on, for example, wireless device capability. The wireless device may assume that antenna ports of one DM-RS port group of a PDSCH of a serving cell are quasi co-located based on a TCI state used for PDCCH quasi co-location indication of the lowest CORESET-ID in the latest slot in which one or more CORESETs are configured for the wireless device, if (i) the offset between reception of the DL DCI and the corresponding PDSCH is less than a threshold Threshold-Sched-Offset and/or if (ii) the higher layer parameter TCI-PresentInDCI='Enabled' or the higher layer parameter TCI-PresentInDCI='Disabled'. The wireless device may obtain the other QCL assumptions from the indicated TCI states for its scheduled PDSCH, irrespective of a time offset between the reception of the DL DCI and the corresponding PDSCH, if all configured TCI states do not contain QCL-TypeD'.

A base station and/or a wireless device may have multiple antennas, for example, to support a transmission with high data rate (such as in an NR system). A wireless device may perform one or more beam management procedures, as shown in FIG. 9B, for example, if configured with multiple antennas.

A wireless device may perform a downlink beam management based on one or more CSI-RSs and/or one or more SS blocks. In a beam management procedure, a wireless device may measure a channel quality of a beam pair link. The beam pair link may comprise a transmitting beam from a base station and a receiving beam at the wireless device. A wireless device may measure the multiple beam pair links between the base station and the wireless device, for example, if the wireless device is configured with multiple beams associated with multiple CSI-RSs and/or SS blocks.

A wireless device may send (e.g., transmit) one or more beam management reports to a base station. The wireless device may indicate one or more beam pair quality parameters, for example, in a beam management report. The one or more beam pair quality parameters may comprise at least one or more beam identifications; RSRP; and/or PMI, CQI, and/or RI of at least a subset of configured multiple beams.

A base station and/or a wireless device may perform a downlink beam management procedure on one or multiple Transmission and Receiving Point (TRPs), such as shown in FIG. 9B. Based on a wireless device's beam management report, a base station may send (e.g., transmit), to the wireless device, a signal indicating that a new beam pair link is a serving beam. The base station may transmit PDCCH and/or PDSCH to the wireless device using the serving beam.

A wireless device and/or a base station may trigger a beam failure recovery mechanism. A wireless device may trigger a beam failure recovery (BFR) procedure, for example, if at least a beam failure occurs. A beam failure may occur if a quality of beam pair link(s) of at least one PDCCH falls below a threshold. The threshold comprise be an RSRP value (e.g., −140 dbm, −110 dbm, or any other value) and/or a SINR value (e.g., −3 dB, −1 dB, or any other value), which may be configured in a RRC message.

Figure 24A:
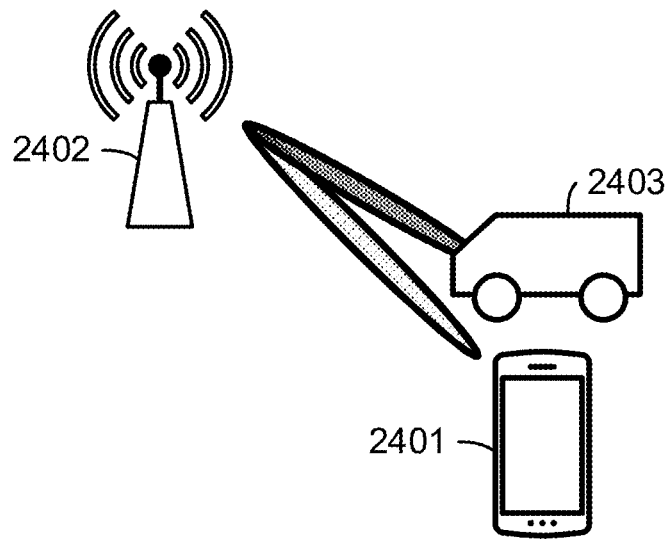
FIG. 24A and FIG. 24B show examples of beam failure scenarios.

FIG. 24A shows an example of a first beam failure event. A base station 2402 may send (e.g., transmit) a PDCCH from a transmission (Tx) beam to a receiving (Rx) beam of a wireless device 2401 from a TRP. The base station 2402 and the wireless device 2401 may start a beam failure recovery procedure on the TRP, for example, if the PDCCH on the beam pair link (e.g., between the Tx beam of the base station 2402 and the Rx beam of the wireless device 2401) have a lower-than-threshold RSRP and/or SINR value due to the beam pair link being blocked (e.g., by a moving vehicle 2403, a building, or any other obstruction).

Figure 24B:
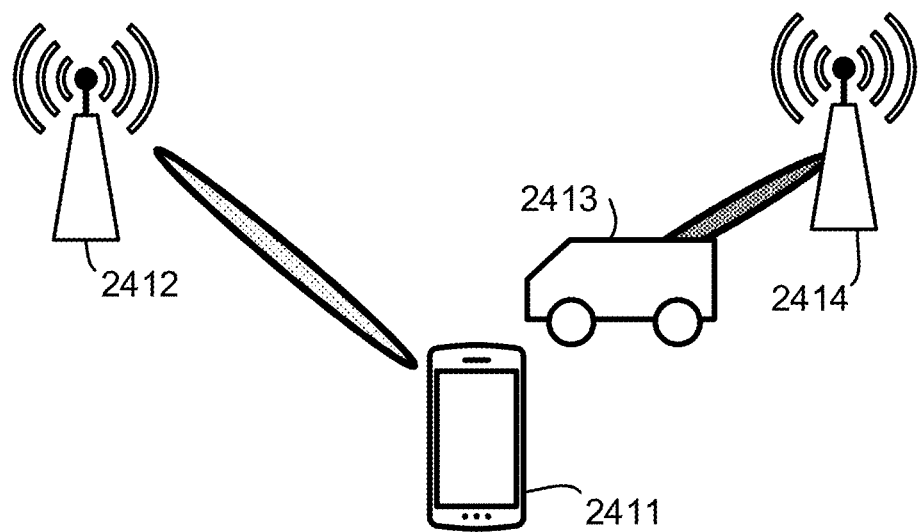

FIG. 24B shows an example of a second beam failure event. A base station may send (e.g., transmit) a PDCCH from a beam to a wireless device 2411 from a first TRP 2414. The base station and the wireless device 2411 may start a beam failure recovery procedure on a new beam on a second TRP 2412, for example, if the PDCCH on the beam is blocked (e.g., by a moving vehicle 2413, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if Doppler shift and/or Doppler shift of the channel from a transmission on an RS to a wireless device, and that from a transmission on a PDCCH to the wireless device, are the same.

A wireless device may monitor a PDCCH on M beams (e.g. 2, 4, 8) pair links simultaneously, where M≥1 and the value of M may depend at least on capability of the wireless device. Monitoring a PDCCH may comprise detecting DCI via the PDCCH transmitted on common search spaces and/or wireless device specific search spaces. Monitoring multiple beam pair links may increase robustness against beam pair link blocking. A base station may send (e.g., transmit) one or more messages comprising parameters indicating a wireless device to monitor PDCCH on different beam pair link(s) in different OFDM symbols.

A base station may send (e.g., transmit) one or more RRC messages and/or MAC CEs comprising parameters indicating Rx beam setting of a wireless device for monitoring PDCCH on multiple beam pair links. A base station may send (e.g., transmit) an indication of a spatial QCL between DL RS antenna port(s) and DL RS antenna port(s) for demodulation of DL control channel. The indication may comprise a parameter in a MAC CE, an RRC message, DCI, and/or any combinations of these signaling.

A base station may indicate spatial QCL parameters between DL RS antenna port(s) and DM-RS antenna port(s) of DL data channel, for example, for reception of data packet on a PDSCH. A base station may send (e.g., transmit) DCI comprising parameters indicating the RS antenna port(s) are QCLed with DM-RS antenna port(s).

A wireless device may measure a beam pair link quality based on CSI-RSs QCLed with DM-RS for PDCCH, for example, if a base station sends (e.g., transmits) a signal indicating QCL parameters between CSI-RS and DM-RS for PDCCH. The wireless device may start a BFR procedure, for example, if multiple contiguous beam failures occur.

A wireless device may send (e.g., transmit) a BFR signal on an uplink physical channel to a base station, for example, if starting a BFR procedure. The base station may send (e.g., transmit) DCI via a PDCCH in a CORESET, for example, after or in response to receiving the BFR signal on the uplink physical channel. The wireless may determine that the BFR procedure is successfully completed, for example, after or in response to receiving the DCI via the PDCCH in the CORESET.

A base station may send (e.g., transmit) one or more messages comprising configuration parameters of an uplink physical channel, or signal, for transmitting a beam failure recovery request. The uplink physical channel or signal may be based on one of: a contention-free PRACH (BFR-PRACH), which may be a resource orthogonal to resources of other PRACH transmissions; a PUCCH (e.g., BFR-PUCCH); and/or a contention-based PRACH resource (e.g., CF-PRACH). Combinations of these candidate signals and/or channels may be configured by the base station. A wireless device may autonomously select a first resource for transmitting the BFR signal, for example, if the wireless device is configured with multiple resources for a BFR signal. The wireless device may select a BFR-PRACH resource for transmitting a BFR signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFR signal, for example, if the wireless device is configured with a BFR-PRACH resource, a BFR-PUCCH resource, and/or a CF-PRACH resource.

A base station may send (e.g., transmit) a response to a wireless device, for example, after receiving one or more BFR signals. The response may comprise the CRI associated with the candidate beam that the wireless device may indicate in the one or multiple BFR signals.

A base station and/or a wireless device may perform one or more beam management procedures, for example, if the base station and/or the wireless device are configured with multiple beams (e.g., in system such as in an NR system). The wireless device may perform a BFR procedure (e.g., send one or more BFR signals), for example, if one or more beam pair links between the base station and the wireless device fail.

A wireless device may receive one or more RRC messages that comprise BFR parameters. The one or more RRC messages may comprise one or more of an RRC connection reconfiguration message, an RRC connection reestablishment message, and/or an RRC connection setup message. The wireless device may detect at least one beam failure according to at least one of BFR parameters and trigger a BFR procedure. The wireless device may start a first timer, if configured, in response to detecting the at least one beam failure. The wireless device may select a beam (e.g., a selected beam) in response to detecting the at least one beam failure. The selected beam may be a beam with good channel quality (e.g., determined based on RSRP, SINR, or BLER, etc.) from a set of candidate beams. The set of candidate beams may be identified by a set of reference signals (e.g., SSBs, or CSI-RSs). The wireless device may transmit at least a first BFR signal to a base station in response to selecting the selected beam. The at least first BFR signal may be associated with the selected beam. The at least first BFR signal may be, for example, a preamble transmitted on a PRACH resource, or a beam failure request (e.g., which may be similar to an SR) signal transmitted on a PUCCH resource, or a beam indication transmitted on a PUCCH/PUSCH resource. The wireless device may transmit the at least first BFR signal with a transmission beam corresponding to a receiving beam associated with the selected beam. The wireless device, may, for example, determine transmission beam by using the RF and/or digital beamforming parameters corresponding to the receiving beam. The wireless device may start a response window in response to transmitting the at least first BFR signal. The response window may be tracked using, for example, a timer with a value configured by the base station. The wireless device may monitor a PDCCH in a first CORESET while the response window is running. The first CORESET may be associated with the BFR procedure. The wireless device may monitor the PDCCH in the first CORESET in condition of transmitting the at least first BFR signal. The wireless device may receive a first DCI via the PDCCH in the first CORESET while the response window is running. The wireless device may consider the BFR procedure successfully completed if the wireless device receives the first DCI via the PDCCH in the first CORESET before the response window expires. The wireless device may stop the first timer, if configured, if the BFR procedure is successfully completed.

Figure 25:
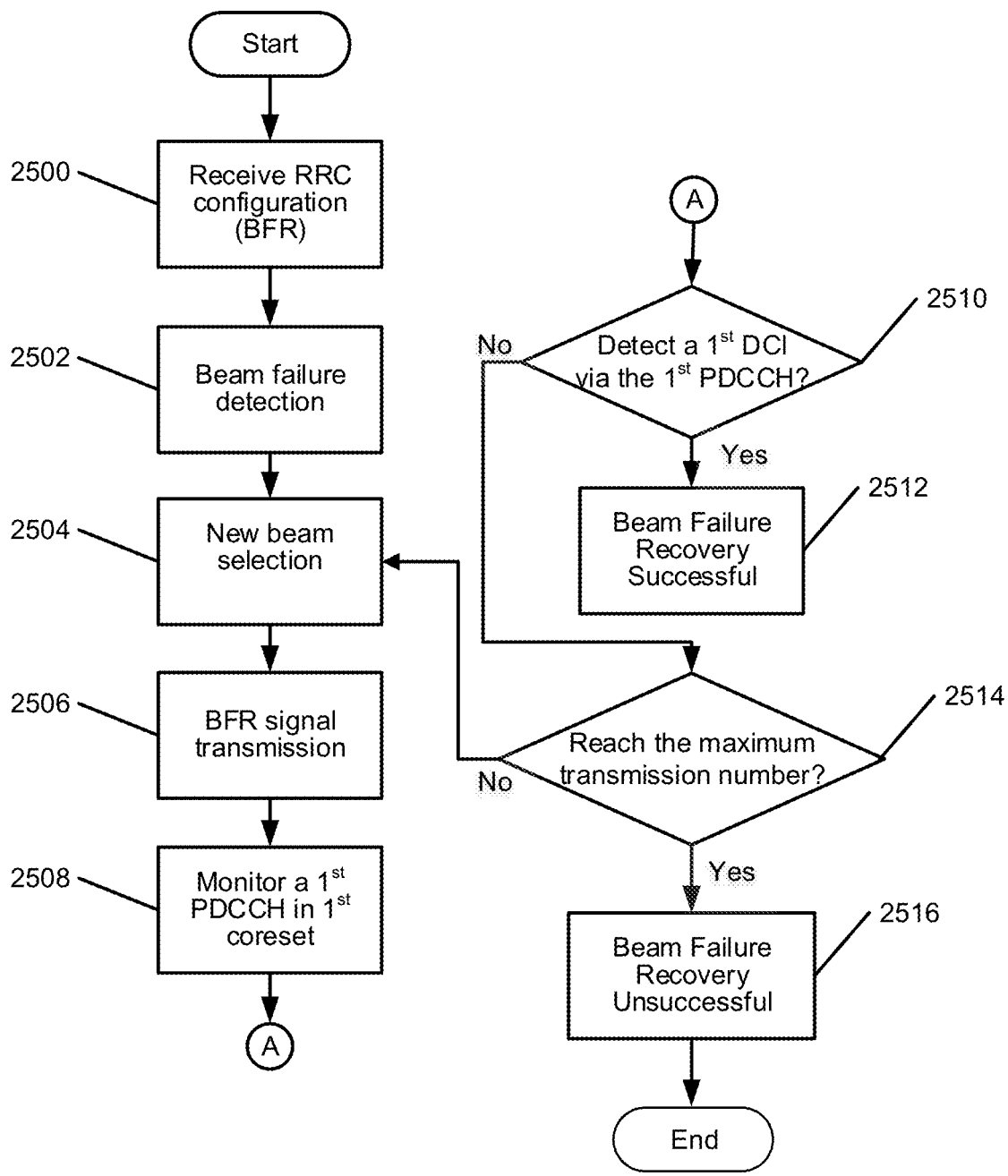
FIG. 25 shows an example of a beam failure recovery (BFR) procedure.

FIG. 25 shows an example of a BFR procedure. In some communication systems, a wireless device may stop a BWP inactivity timer if a random access procedure is initiated, and/or the wireless device may restart the BWP inactivity timer if the random access procedure is successfully completed (e.g., based on or in response to receiving DCI addressed to a C-RNTI of the wireless device). At step 2500, a wireless device may receive one or more RRC messages comprising BFR parameters. At step 2502, the wireless device may detect at least one beam failure according to at least one BFR parameter. The wireless device may start a first timer, if configured, based on detecting the at least one beam failure. At step 2504, the wireless device may select a beam (e.g., a selected beam) based on detecting the at least one beam failure. The selected beam may be a beam with good channel quality (e.g., based on RSRP, SINR, and/or BLER) that may be selected from a set of candidate beams. The candidate beams may be indicated by a set of reference signals (e.g., SSBs, or CSI-RSs). At step 2506, the wireless device may send (e.g., transmit) at least a first BFR signal to a base station, for example, based on selecting the beam (e.g., selected beam). The at least first BFR signal may be associated with the selected beam. The wireless device may send (e.g., transmit) the at least first BFR signal with a transmission beam corresponding to a receiving beam associated with the selected beam. The at least first BFR signal may be a preamble sent (e.g., transmitted) via a PRACH resource, an SR signal sent (e.g., transmitted) via a PUCCH resource, a beam failure recovery signal sent (e.g., transmitted) via a PUCCH resource, and/or a beam report sent (e.g., transmitted) via a PUCCH and/or PUSCH resource. At step 2508, the wireless device may start a response window, for example, based on sending (e.g., transmitting) the at least first BFR signal. The response window may be associated with a timer with a value configured by the base station. The wireless device may monitor a PDCCH in a first CORESET, for example, if the response window is running. The first CORESET may be configured by the BFR parameters (e.g., RRC). The first CORESET may be associated with the BFR procedure. The wireless device may monitor the PDCCH in the first CORESET in condition of transmitting the at least first BFR signal.

At step 2510, the wireless device may detect (e.g., receive) a first DCI via the PDCCH in the first CORESET, for example, if the response window is running. At step 2512, the wireless device may determine that the BFR procedure has successfully completed, for example, if the wireless device receives the first DCI via the PDCCH in the first CORESET before the response window expires. The wireless device may stop the first timer, if configured, based on the BFR procedure successfully being completed. The wireless device may stop the response window, for example, based on the BFR procedure successfully being completed. If the response window expires, and the wireless device does not receive the DCI (e.g., at step 2510), the wireless device may, at step 2514, increment a transmission number. The transmission number may be initialized to a first number (e.g., 0) before the BFR procedure is triggered. At step 2514, if the transmission number indicates a number less than the configured maximum transmission number, the wireless device may repeat one or more actions (e.g., at step 2504). The one or more actions to be repeated may comprise at least one of a BFR signal transmission, starting the response window, monitoring the PDCCH, and/or incrementing the transmission number, for example, if no response received during the response window is running. At step 2516, if the transmission number indicates a number equal or greater than the configured maximum transmission number, the wireless device may declare the BFR procedure is unsuccessfully completed.

A MAC entity of a wireless device may be configured by an RRC message, for example, for a beam failure recovery procedure. The beam failure recovery procedure may be used for indicating to a serving base station of a new (e.g., candidate) synchronization signal block (SSB) and/or CSI-RS, for example, if a beam failure is detected. The beam failure may be detected on one or more serving SSB(s) and/or CSI-RS(s) of the serving base station. The beam failure may be detected by counting a beam failure instance indication from a lower layer of the wireless device (e.g., PHY layer) to the MAC entity.

An RRC message may configure a wireless device with one or more parameters (e.g., in BeamFailureRecoveryConfig) for a beam failure detection and recovery procedure. The one or more parameters may comprise one or more of: for a beam failure detection, beamFailureInstanceMaxCount beamFailureDetection Timer for the beam failure detection, beamFailureRecoveryTimer for a beam failure recovery procedure, rsrp-ThresholdSSB, an RSRP threshold for a beam failure recovery, PowerRampingStep for the beam failure recovery, preambleReceivedTargetPower for the beam failure recovery, preambleTxMax for the beam failure recovery, and/or ra-Response Window. The ra-Response Window may be a time window to monitor one or more responses for the beam failure recovery using a contention-free RA preamble.

Figure 26:
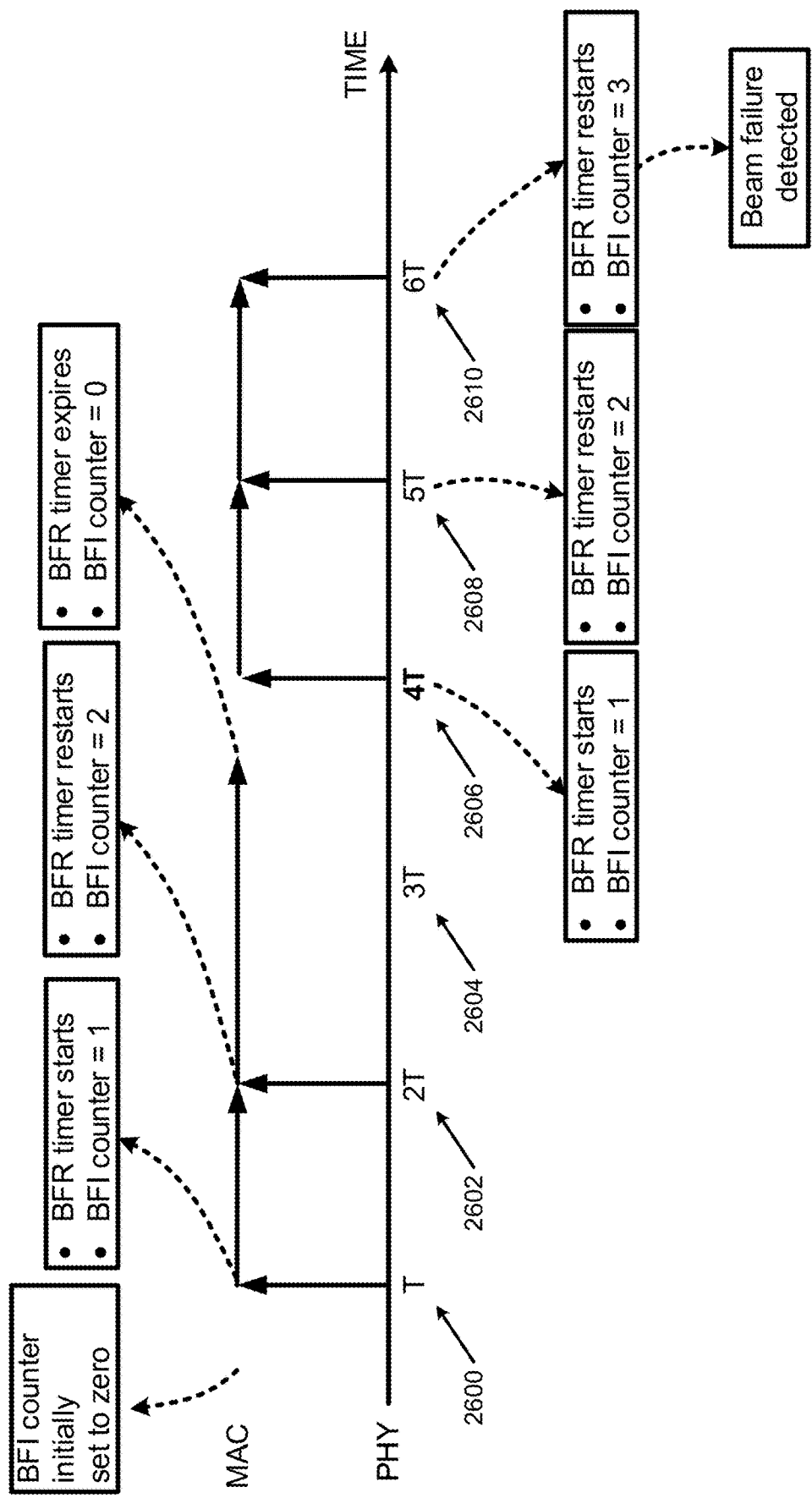
FIG. 26 shows an example of downlink beam failure instance indication.

FIG. 26 shows an example of beam failure instance (BFI) indication. A wireless device may use at least one wireless device variable for a beam failure detection. A BFI counter (e.g., BFI_COUNTER) may be one of the at least one wireless device variable. The BFI counter may be a counter for a beam failure instance indication. The BFI counter may be initially set to zero before time T 2600. The wireless device may start or restart a beam failure detection timer (e.g., beamFailureDetectionTimer) at time T 2600 and increment the BFI counter, for example, based on a MAC entity of a wireless device receiving a beam failure instance indication from a lower layer (e.g., PHY) of the wireless device. The wireless device may increment the BFI counter, for example, in addition to starting or restarting the beam failure detection timer (e.g., BFR timer in FIG. 26 at time T 2600, 2T 2602, 4T 2606, 5T 2608, 6T 2610, etc.). The wireless device may initiate a random access procedure such as for a beam failure recovery (e.g., on an SpCell, and/or if configured with BeamFailureRecoveryConfig) based on the BFI counter being greater than or equal to a value such as beamFailureInstanceMaxCount (e.g., at time T 2600, 2T 2602, 5T 2608 in FIG. 26). The wireless device may start a beam failure recovery timer (e.g., beamFailureRecoveryTimer, if configured), for example, based on the wireless device being configured with a beam failure recovery configuration (e.g., BeamFailureRecoveryConfig). The wireless device may start the beam failure recovery timer, for example, based on or in response to a BFI counter (e.g., BFI_COUNTER) being equal to or greater than a value such as beamFailureInstanceMaxCount. The wireless device may use the one or more parameters in the beam failure recover configuration (e.g., powerRampingStep, preambleReceivedTargetPower, and/or preambleTransMax), for example, based on or in response to the initiating the random access procedure. The wireless device may set the BFI counter to zero, for example, based on the beam failure detection timer expiring. The wireless device may determine that the beam failure recovery procedure has successfully completed, for example, based on the random access procedure being successfully completed. The random access procedure may be a contention-free random access procedure.

A wireless device may initiate a random access procedure (e.g., on an SpCell) for a beam failure recovery, for example, based on or in response to a BFI counter (e.g., BFI_COUNTER) being greater than or equal to a value such as beamFailureInstanceMaxCount. The random access procedure may be a contention-based random access procedure.

A wireless device may initiate a random access procedure at time 6T 2610, for example, a based on a first number (e.g., 3) is reached. The wireless device may set the BFI counter to zero (e.g., in FIG. 26, between time 3T 2604 and 4T 2606), for example, based on the beam failure detection timer expiring. The wireless device may determine that the beam failure recovery procedure has successfully completed, for example, based on the random access procedure (e.g., a contention-free random access or a contention-based random access) being successfully completed. The wireless device may stop the beam failure recovery timer (if configured), for example, based on the random access procedure (e.g., a contention-free random access) is successfully completed.

A wireless device (e.g., a MAC entity of the wireless device) may start ra-Response Window at a first PDCCH occasion from the end of the transmitting the contention-free random access preamble, for example, if a MAC entity of a wireless device sends (e.g., transmits) a contention-free random access preamble for a BFR procedure. The ra-Response Window may be configured in BeamFailureRecoveryConfig. The wireless device may monitor at least one PDCCH (e.g., of an SpCell) for a response to the beam failure recovery request, for example, if the ra-ResponseWindow is running. The beam failure recovery request may be identified by a C-RNTI. The wireless device may determine that a random access procedure has successfully completed, for example, if a MAC entity of a wireless device receives, from a lower layer of the wireless device, a notification of a reception of at least one PDCCH transmission, and if the at least one PDCCH transmission is addressed to a C-RNTI, and/or if a contention-free random access preamble for a beam failure recovery request is transmitted by the MAC entity.

A wireless device may initiate a contention-based random access preamble for a beam failure recovery request. A MAC entity of the wireless device may start ra-ContentionResolutionTimer, for example, if the wireless device transmits Msg3. The ra-ContentionResolutionTimer may be configured by RRC. Based on the starting the ra-ContentionResolutionTimer, the wireless device may monitor at least one PDCCH if the ra-ContentionResolutionTimer is running. The wireless device may consider the random access procedure successfully completed, for example, if the MAC entity receives, from a lower layer of the wireless device, a notification of a reception of the at least one PDCCH transmission, if a C-RNTI MAC CE is included in the Msg3, if a random access procedure is initiated for a beam failure recovery, and/or the at least one PDCCH transmission is addressed to a C-RNTI of the wireless device. The wireless device may stop the ra-ContentionResolutionTimer, for example, based on the random access procedure being successfully completed. The wireless device may determine that the beam failure recovery has successfully completed, for example, if a random access procedure of a beam failure recovery is successfully completed.

A wireless device may be configured (e.g., for a serving cell) with a first set of periodic CSI-RS resource configuration indexes by a higher layer parameter (e.g., Beam-Failure-Detection-RS-ResourceConfig, failureDetectionResources, etc.). The wireless device may be configured with a second set of CSI-RS resource configuration indexes and/or SS/PBCH block indexes by a higher layer parameter (e.g., Candidate-Beam-RS-List, candidateBeamRSList, etc.). The first set of CSI-RS resource configuration indexes and/or SS/PBCH block indexes and/or the second set of CSI-RS resource configuration indexes and/or SS/PBCH block indexes may be used for radio link quality measurements on the serving cell. The wireless device may determine a first set to include SS/PBCH block indexes and periodic CSI-RS resource configuration indexes, for example, if a wireless device is not provided with higher layer parameter Beam-Failure-Detection-RS-ResourceConfig. The SS/PBCH block indexes and the periodic CSI-RS resource configuration indexes may comprise the same values as one or more RS indexes in one or more RS sets. The one or more RS indexes in the one or more RS sets may be indicated by one or more TCI states. The one or more TCI states may be used for respective control resource sets for which the wireless device may be configured to monitor a PDCCH. The wireless device may expect a single port RS in the first set.

A wireless device may expect a first set of periodic CSI-RS resource configurations to include, for example, up to two RS indexes. The first set of periodic CSI-RS resource configurations may include one or more RS indexes with QCL-TypeD configuration, for example, based on the first set of periodic CSI-RS resource configurations includes two RS indexes. A wireless device may expect a single port RS in the first set of periodic CSI-RS resource configurations.

A first threshold (e.g., $Q_{out,LR}$) may correspond to a first default value of a first higher layer parameter (e.g., RLM-IS-OOS-thresholdConfig, rlmInSyncOutOfSyncThreshold, etc.). A second threshold (e.g., $Q_{in,LR}$) may correspond to a second default value of a higher layer parameter (e.g., Beam-failure-candidate-beam-threshold, rsrp-Threshold-SSB, etc.). A physical layer in the wireless device may compare a first radio link quality according to the first set of periodic CSI-RS resource configurations with the first threshold. For the first set, the wireless device may assess the first radio link quality based on periodic CSI-RS resource configurations or SS/PBCH blocks. The periodic CSI-RS resource configurations and/or the SS/PBCH blocks may be associated (e.g., quasi co-located) with at least one DM-RS of a PDCCH that may be monitored by the wireless device. The wireless device may apply the second threshold to a first L1-RSRP measurement that may be obtained from one or more SS/PBCH blocks. The wireless device may apply the second threshold to a second L1-RSRP measurement that may be obtained from one or more periodic CSI-RS resources, for example after scaling a respective CSI-RS reception power with a value provided by a higher layer parameter (e.g., Pc_SS, powerControlOffsetSS, etc.).

A wireless device may assess the first radio link quality of the first set. A physical layer in the wireless device may provide an indication to higher layers (e.g., MAC), for example, if the first radio link quality for all corresponding resource configurations in the first set is less than the first threshold. The wireless device may use the corresponding resource configurations in the first set to assess the first radio link quality. The physical layer may inform the higher layers (e.g., MAC, RRC), for example, if the first radio link quality is less than the first threshold with a first periodicity. The first periodicity may be determined by the maximum of the shortest periodicity of periodic CSI-RS configurations or SS/PBCH blocks in the first set and a time value (e.g., 2 ms or any other duration). The wireless device may access the periodic CSI-RS configurations or the SS/PBCH blocks for the first radio link quality. Based on a request from higher layers (e.g., MAC layer), a wireless device may provide to higher layers the periodic CSI-RS configuration indexes and/or the SS/PBCH block indexes from the second set. The wireless device may provide, to higher layers, corresponding L1-RSRP measurements that may be greater than or equal to the second threshold.

A wireless device may be configured with one CORESET, for example, by a higher layer parameter (e.g., Beam-failure-Recovery-Response-CORESET) and/or via a link to a search space set. The wireless device may be configured with an associated search space that may be provided by a higher layer parameter (e.g., search-space-config, recovery-SearchSpaceId, etc.). The search space may be used for monitoring a PDCCH in the control resource set. The wireless device may not expect to be provided with a second search space set for monitoring the CORESET, for example, if the wireless device is provided by a higher layer parameter (e.g., recoverySearchSpaceId). The CORESET may be associated with the search space set provided by a higher layer parameter (e.g., recoverySearchSpaceId). The wireless device may receive from higher layers (e.g., MAC layer), by a parameter (e.g., PRACH-ResourceDedicatedBFR), a configuration for a PRACH transmission. For the PRACH transmission in slot n and based on antenna port quasi co-location parameters associated with periodic CSI-RS configuration or SS/PBCH block with a first RS index, the wireless device may monitor the PDCCH in a search space set (e.g., which may be provided by a higher layer parameter such as recoverySearchSpaceId) for detection of a DCI format starting from a slot (e.g., slot n+4) within a window. The window may be configured by a higher layer parameter (e.g., Beam-failure-recovery-request-window, BeamFailureRecoveryConfig, etc.). The DCI format may be CRC scrambled by a C-RNTI. The first RS index may be provided by the higher layers. For a PDCCH monitoring and for a corresponding PDSCH reception, the wireless device may use the same antenna port quasi-collocation parameters with the first RS index (e.g., as for monitoring the PDCCH) until the wireless device receives, by higher layers, an activation for a TCI state or a parameter (e.g., TCI-StatesPDCCH, ToAddlist, TCI-StatesPDCCH-ToReleaseList).

A wireless device may monitor PDCCH candidates in a search space set. The wireless device may monitor the PDCCH candidates in the search space set, for example, at least until the wireless device receives a MAC CE activation command for a TCI state or a higher layer parameter (e.g., TCI-StatesPDCCH-ToAddlist and/or TCI-StatesPDCCH-ToReleaseList), for example, after the wireless device detects the DCI format with CRC scrambled by the C-RNTI in the search space set (e.g., which may be by the higher layer parameter recoverySearchSpaceId). The wireless device may not expect to receive a PDCCH order triggering a PRACH transmission, for example, based on the wireless device not being provided with a coreset for a search space set (e.g., provided by a higher layer parameter recoverySearchSpaceId). The wireless device may initiate a contention-based random access procedure for a beam failure recovery, for example, based on or in response to not being provided with the coreset. The wireless device may not expect to receive a PDCCH order triggering a PRACH transmission, for example, based on the wireless device not being provided with a higher layer parameter (e.g., recoverySearchSpaceId). A wireless device may initiate a contention-based random access procedure for a beam failure recovery, for example, based on or in response to not being provided with the higher layer parameter (e.g., recoverySearchSpaceId).

A base station may configure a wireless device with uplink (UL) bandwidth parts (BWPs) and downlink (DL) BWPs, for example, to enable bandwidth adaptation (BA) for a PCell. The base station may configure the wireless device with at least DL BWP(s) (e.g., an SCell may not have UL BWPS) to enable BA for an SCell, for example, if CA is configured. For the PCell, a first initial BWP may be a first BWP used for initial access. For the SCell, a second initial BWP may be a second BWP configured for the wireless device to first operate on the SCell if the SCell is activated.

A wireless device may switch a first (e.g., active) DL BWP and a first (e.g., active) UL BWP independently, for example, in paired spectrum (e.g., FDD). A wireless device may switch a second (e.g., active) DL BWP and a second (e.g., active) UL BWP simultaneously, for example, in unpaired spectrum (e.g., TDD). Switching between configured BWPs may be based on DCI and/or an inactivity timer. An expiry of the inactivity timer associated with a cell may switch an active BWP to a default BWP, for example, if the inactivity timer is configured for a serving cell. The default BWP may be configured by the network.

One UL BWP for each uplink carrier and one DL BWP may be active at a time in an active serving cell, for example, in FDD systems configured with BA. One DL/UL BWP pair may be active at a time in an active serving cell, for example, in TDD systems. Operating on the one UL BWP and the one DL BWP (and/or the one DL/UL pair) may enable a wireless device to use a reasonable amount of power (e.g., reasonable battery consumption). BWPs other than the one UL BWP and the one DL BWP that the wireless device may be configured with may be deactivated. The wireless device may refrain from monitoring a PDCCH, and/or may refrain from transmitting via a PUCCH, PRACH and/or UL-SCH, for example, on deactivated BWPs.

A serving cell may be configured with a first number (e.g., four) of BWPs. A wireless device and/or a base station may have one active BWP at any point in time, for example, for an activated serving cell (e.g., PCell, SCell). A BWP switching for a serving cell may be used to activate an inactive BWP and/or deactivate an active BWP. The BWP switching may be controlled by a PDCCH indicating a downlink assignment or an uplink grant. The BWP switching may be controlled by an inactivity timer (e.g., bwpInactivityTimer). The BWP switching may be controlled by an RRC signaling. The BWP switching may be controlled by a MAC entity, for example, based on initiating a random access procedure. A DL BWP (e.g., indicated by first ActiveDownlinkBWP-ID which may be included in RRC signaling) and/or an UL BWP (e.g., indicated by firstActiveDuplinkBWP-ID which may be included in RRC signaling) may be initially active without receiving a PDCCH indicating a downlink assignment or an uplink grant, for example, based on an addition of an SpCell or an activation of an SCell. The active BWP for a serving cell may be indicated by an RRC message and/or a PDCCH message (e.g., PDCCH order). A DL BWP may be paired with an UL BWP, and/or BWP switching may be common for both UL and DL, for example, for unpaired spectrum (e.g., TDD).

A MAC entity, for an activated serving cell (e.g., PCell, SCell) configured with one or more BWPs and/or based on the BWP being activated, may perform at least one of: transmitting via an UL-SCH using the one or more BWPs; transmitting via a RACH using the one or more BWPs; monitoring a PDCCH using the one or more BWPs; transmitting an SRS using the one or more BWPs; transmitting via a PUCCH using the one or more BWPs; receiving via a DL-SCH using the one or more BWPs; initializing or reinitializing any suspended configured uplink grants of configured grant Type 1 using the one or more BWPs (e.g., based on a stored configuration, if any); and/or to start in a symbol (e.g., based on a procedure).

A wireless device (e.g., a MAC entity of a wireless device), for an activated serving cell (e.g., PCell, SCell) configured with one or more BWPs and/or based on the BWP being deactivated, may not transmit via a UL-SCH using the one or more BWPs; may not transmit via a RACH using the one or more BWPs; may not monitor a PDCCH using the one or more BWPs; may not report CSI for the one or more BWPs; may not transmit via a PUCCH using the one or more BWPs; may not transmit an SRS using the one or more BWPs, may not receive via a DL-SCH using the one or more BWPs; may clear any configured downlink assignment and configured uplink grant of configured grant Type 2 using the one or more BWPs; and/or may suspend any configured uplink grant of configured Type 1 using the one or more BWPs (e.g., inactive BWPs).

A base station and/or a wireless device (e.g., a MAC entity of a base station and/or a wireless device) may initiate a random access procedure (e.g., contention-based random access, contention-free random access) on a serving cell, for example, based on PRACH occasions being configured for an active UL BWP, of the serving cell, with an uplink BWP ID; the serving cell being an SpCell; and/or a downlink BWP ID of an active DL BWP of the serving cell not being the same as the uplink BWP ID. The base station and/or a wireless device (e.g., a MAC entity of a base station and/or a wireless device) may switch from the active DL BWP to a DL BWP with a second downlink BWP ID same as the uplink BWP ID, for example, based on the prior initiation. The base station and/or a wireless device (e.g., a MAC entity of a base station and/or a wireless device) may perform the random access procedure on the DL BWP of the serving cell (e.g., SpCell) and the active UL BWP of the serving cell, for example, based on or in response to the switching.

A base station and/or a wireless device (e.g., a MAC entity of a base station and/or a wireless device) may initiate a random access procedure (e.g., contention-based random access, contention-free random access) on a serving cell (e.g., SCell), for example, based on PRACH occasions being configured for an active UL BWP of the serving cell; and/or the serving cell not being an SpCell. The base station and/or a wireless device (e.g., a MAC entity of a base station and/or a wireless device) may perform the random access procedure on an active DL BWP of an SpCell and an active UL BWP of the serving cell, for example, based on the initiation.

A base station and/or a wireless device (e.g., a MAC entity of a base station and/or a wireless device) may initiate a random access procedure on a serving cell, for example, based on PRACH resources not being configured for an active UL BWP of the serving cell. The MAC entity may switch the active UL BWP to an uplink BWP (initial uplink BWP), for example, based on the initiation. The uplink BWP may be indicated by RRC signaling (e.g., initialULBWP). The base station and/or a wireless device (e.g., a MAC entity of a base station and/or a wireless device) may switch an active DL BWP to a downlink BWP (e.g., initial downlink BWP), for example, based on the serving cell being an SpCell. The downlink BWP may be indicated by RRC signaling (e.g., initialDLBWP). The base station and/or a wireless device (e.g., a MAC entity of a base station and/or a wireless device) may perform the random access procedure on the uplink BWP and the downlink BWP, for example, based on or in response to the switching.

A base station and/or a wireless device (e.g., a MAC entity of a base station and/or a wireless device) may initiate a random access procedure on a serving cell, for example, based on PRACH resources not being configured for an active UL BWP of the serving cell (e.g., SCell). The base station and/or a wireless device (e.g., a MAC entity of a base station and/or a wireless device) may switch the active UL BWP to an uplink BWP (initial uplink BWP), for example, based on the initiation. The uplink BWP may be indicated by RRC signaling (e.g., initialULBWP). The base station and/or a wireless device (e.g., a MAC entity of a base station and/or a wireless device) may perform the random access procedure on the uplink BWP and an active downlink BWP of an SpCell, for example, based on the serving cell is not an SpCell.

A wireless device may perform BWP switching to a BWP indicated by a PDCCH, for example, if a base station and/or a wireless device (e.g., a MAC entity of a base station and/or a wireless device) receives a PDCCH (e.g., a PDCCH order) for a BWP switching for a serving cell, for example, if a random access procedure associated with this serving cell is not ongoing. A wireless device may determine whether to switch a BWP or ignore the PDCCH for the BWP switching, for example, if a base station and/or a wireless device (e.g., a MAC entity of a base station and/or a wireless device) received a PDCCH for a BWP switching for a serving cell while a random access procedure is ongoing in the MAC entity. The wireless device may perform the BWP switching to a new BWP indicated by the PDCCH. The base station and/or a wireless device (e.g., a MAC entity of a base station and/or a wireless device) may stop the ongoing random access procedure and initiate a second random access procedure on a new BWP, for example, if the MAC entity decides to perform BWP switching to the new BWP (e.g., which may be indicated by the PDCCH), for example, based on or in response to receiving a PDCCH (e.g., other than successful contention resolution). The base station and/or a wireless device (e.g., a MAC entity of a base station and/or a wireless device) may continue with the ongoing random access procedure on an active BWP, for example if the MAC decides to ignore the PDCCH for the BWP switching.

The base station and/or a wireless device (e.g., a MAC entity of a base station and/or a wireless device) may start or restart a BWP inactivity timer associated with the active DL BWP for a variety of reasons. The MAC entity may start or restart a BWP inactivity timer (e.g., BWP-InactivityTimer) associated with the active DL BWP, for example, if one or more of the following occur: a BWP inactivity timer is configured (e.g., via RRC signaling including defaultDownlinkBWP parameter) for an activated serving sell, if a Default-DL-BWP is configured and an active DL BWP is not a BWP indicated by the Default-DL-BWP, if the Default-DL-BWP is not configured and the active DL BWP is not the initial DL BWP (e.g., via RRC signaling including initial-DownlinkBWPparameter); and/or if one or more of the following occur: if a PDCCH addressed to C-RNTI or CS-RNTI indicating downlink assignment or uplink grant is received on or for the active BWP, and/or if there is not an ongoing random access procedure associated with the activated serving cell.

The base station and/or a wireless device (e.g., a MAC entity of a base station and/or a wireless device) may start or restart the BWP inactivity timer (e.g., BWP-InactivityTimer) associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and an active DL BWP is not the initial DL BWP; and/or if one or more of the following occur: if a MAC-PDU is transmitted in a configured uplink grant or received in a configured downlink assignment, and/or if there is not an ongoing random access procedure associated with the activated serving cell.

The base station and/or a wireless device (e.g., a MAC entity of a base station and/or a wireless device) may start or restart the BWP inactivity timer (e.g., BWP-InactivityTimer) associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial DL BWP; and/or if one or more of the following occur: if a PDCCH addressed to C-RNTI or CS-RNTI indicating downlink assignment or uplink grant is received on or for the active BWP, if a MAC-PDU is transmitted in a configured uplink grant or received in a configured downlink assignment, and/or if an ongoing random access procedure associated with the activated Serving Cell is successfully completed in response to receiving a PDCCH addressed to a C-RNTI.

The base station and/or a wireless device (e.g., a MAC entity of a base station and/or a wireless device) may start or restart the BWP inactivity timer (e.g., BWP-Inactivity-Timer) associated with the active DL BWP based on switching the active BWP. For example, the MAC entity may start or restart the BWP-InactivityTimer associated with the active DL BWP if a PDCCH for BWP switching is received and the wireless device switches an active DL BWP to the DL BWP, and/or if one or more of the following occur: if a default downlink BWP is configured and the DL BWP is not the default downlink BWP, and/or if a default downlink BWP is not configured and the DL BWP is not the initial downlink BWP.

The base station and/or a wireless device (e.g., a MAC entity of a base station and/or a wireless device) may stop the BWP inactivity timer (e.g., BWP-InactivityTimer) associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated on the activated serving cell. The MAC entity may stop a second BWP inactivity timer (e.g., BWP-InactivityTimer) associated with a second active DL BWP of an SpCell, for example, if the activated Serving Cell is an SCell (other than a PSCell).

The base station and/or a wireless device (e.g., a MAC entity of a base station and/or a wireless device) may perform BWP switching to a BWP indicated by the Default-DL-BWP, for example, if one or more of the following occur: if a BWP inactivity timer (e.g., BWP-Inactivity-Timer) is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be configured for operation in BWPs of a serving cell. The wireless device may be configured by higher layers for the serving cell for a set of (e.g., four) bandwidth parts (BWPs) for receptions by the wireless device (e.g., DL BWP set) in a DL bandwidth by a parameter (e.g., DL-BWP). The wireless device may be configured with a set of (e.g., four) BWPs for transmissions by the wireless device (e.g., UL BWP set) in an UL bandwidth by a parameter (e.g., UL-BWP) for the serving cell. An initial active DL BWP may be determined, for example, by: a location and number of contiguous PRBs; a subcarrier spacing; and/or a cyclic prefix (e.g., for the control resource set for a Type0-PDCCH common search space). A wireless device may be provided (e.g., by a higher layer) a parameter (e.g., initial-UL-BWP) for an initial active UL BWP for a random access procedure, for example, for operation on a primary cell or on a secondary cell. The wireless device may be provided with an initial active UL BWP (e.g., by a higher layer) parameter (e.g., Active-BWP-DL-PCell, initialuplinkBWP, etc.) for first active DL BWP for receptions, for example, if a wireless device has a dedicated BWP configuration. The wireless device may be provided with an initial uplink BWP on a supplementary carrier by a second higher layer parameter (e.g., initialUplinkBWP in a supplementary uplink), for example, if the wireless device is configured with a supplementary carrier. The wireless device may be provided (e.g., by a higher layer) a parameter (e.g., Active-BWP-UL-PCell, firstActiveDownlinkBWP-Id, etc.) for a first active UL BWP for transmissions on a primary cell, for example, if a wireless device has a dedicated BWP configuration. The higher layer parameter may indicate a first active DL BWP for receptions. The wireless device may be provided by a second higher layer parameter (e.g., firstActiveUplinkBWP-Id), for example, if the wireless device has a dedicated BWP configuration. The higher layer parameter may indicate a first active UL BWP for transmissions on the primary cell.

In an example, for a DL BWP or an UL BWP in a first set of DL BWPs or a second set of UL BWPs, respectively, the UE may be configured with at least one of the following parameters for a serving cell: a subcarrier spacing provided by higher layer parameter subcarrierSpacing or UL-BWP-mu; a cyclic prefix provided by higher layer parameter cyclicPrefix; an index in the first set of DL BWPs or in the second set of UL BWPs by respective higher layer parameters bwp-Id (e.g., DL-BWP-ID, UL-BWP-ID); a third set of BWP-common and a fourth set of BWP-dedicated parameters by a higher layer parameter bwp-Common and a higher layer parameter bwp-Dedicated, respectively.

A DL BWP from a first set of configured DL BWPs (e.g., with a DL BWP index provided by higher layer parameter such as bwp-ID for the DL BWP) may be paired and/or linked with an UL BWP from a second set of configured UL BWPs (e.g., with an UL BWP index provided by higher layer parameter such as bwp-ID for the UL BWP). A DL BWP from a first set of configured DL BWPs may be paired with an UL BWP from a first set of configured UL BWPs, for example, if the DL BWP index and the UL BWP index are equal (e.g., for unpaired spectrum operation). A wireless device may not expect to receive a configuration where the center frequency for a DL BWP is different from the center frequency for an UL BWP, for example, if the DL-BWP-index of the DL BWP is equal to the UL-BWP-index of the UL BWP (e.g., for unpaired spectrum operation).

A wireless device may be configured with CORESETs for every type of common search space and/or for wireless device-specific search space, for example, for a DL BWP in a first set of DL BWPs on a primary cell. The wireless device may not expect to be configured without a common search space on the PCell, or on the PSCell, in the DL BWP (e.g., active DL BWP). The wireless device may be configured with control resource sets for PUCCH transmissions, for example, for an UL BWP in a second set of UL BWPs. A wireless device may receive a PDCCH message and/or a PDSCH message in a DL BWP, for example, according to a configured subcarrier spacing and/or a CP length for the DL BWP. A wireless device may transmit via a PUCCH and/or via a PUSCH in an UL BWP, for example, according to a configured subcarrier spacing and CP length for the UL BWP.

A BWP indicator field value may indicate an active DL BWP, from the first set of configured DL BWPs, for DL receptions, for example, if the BWP indicator field is configured in DCI format 1_1. The BWP indicator field value may indicate an active UL BWP, from the second set of configured UL BWPs, for UL transmissions.

The wireless device may set the active UL BWP to the UL BWP indicated by the bandwidth part indicator field in the DCI format 0_1, for example, based on a bandwidth part indicator field being configured in DCI format 0_1 and/or the bandwidth part indicator field value indicating an UL BWP different from an active UL BWP. The wireless device may set the active DL BWP to the DL BWP indicated by the bandwidth part indicator field in the DCI format 1_1, for example, based on a bandwidth part indicator field being configured in DCI format 1_1 and/or the bandwidth part indicator field value indicating a DL BWP different from an active DL BWP.

A wireless device may be provided (e.g., for the primary cell) with a higher layer parameter (e.g., Default-DL-BWP, defaultDownlinkBWP-Id, or any other a default DL BWP among the configured DL BWPs), for example, if a BWP indicator field is configured in DCI format 0_1. The higher layer parameter may indicate a default DL BWP among configured DL BWPs. The default BWP may be the initial active DL BWP, for example, if a wireless device is not provided a default DL BWP by a higher layer parameter (e.g., Default-DL-BWP, defaultDownlinkBWP-Id, etc.). A wireless device may detect a DCI format 0_1 indicating active UL BWP change, or a DCI format 1_1 indicating active DL BWP change, for example, if a corresponding PDCCH is received within first three symbols of a slot.

The wireless device procedures on the secondary cell may be same as on a primary cell. The wireless device procedures on the secondary cell may be the same as on a primary cell, for example, based on the wireless device being configured for a secondary cell with higher layer parameter (e.g., defaultDownlinkBWP-Id) indicating a default DL BWP among the configured DL BWPs and/or the wireless device being configured with higher layer parameter bwp-inactivitytimer indicating a timer value. An operation of the timer value for the secondary cell and the default DL BWP for the secondary cell may be similar to or the same as operations using a timer value for the primary cell and a default DL BWP for the primary cell.

A wireless device may be provided by a higher layer parameter (e.g., BWP-InactivityTimer). The higher layer parameter may indicate a timer with a timer value for a serving cell (e.g., primary cell, secondary cell). The wireless device may increment the timer every interval (e.g., every interval of 1 millisecond for frequency range 1, every 0.5 milliseconds for frequency range 2, or any other interval for any other frequency range), for example, based on the timer being configured, the timer running, and/or the wireless device not detecting a DCI format for PDSCH reception on the serving cell for paired spectrum operation. The wireless device may decrement the timer every interval (e.g., every interval of 1 millisecond for frequency range 1, every 0.5 milliseconds for frequency range 2, or any other interval for any other frequency range), for example, based on the timer being configured, the timer running, the wireless device not detecting a first DCI format for PDSCH reception and/or the wireless device not detecting a second DCI format for PUSCH transmission on the serving cell for unpaired spectrum operation during the interval.

A wireless device may be configured by a higher layer (e.g., the configuration including parameter firstActive-DownlinkBWP-Id and/or parameter firstActiveUplinkBWP-Id). The higher layer parameter (e.g., firstActiveDownlinkBWP-Id) may indicate a first active DL BWP on a serving cell (e.g., secondary cell) and/or on a supplementary carrier. The wireless device may use the first active DL BWP on the serving cell as the respective first active DL BWP. The higher layer parameter (e.g., firstActiveUplinkBWP-Id) may indicate a first active UL BWP on a serving cell (e.g., secondary cell) or on a supplementary carrier. The wireless device may use the first active UL BWP on the serving cell or on the supplementary carrier as the respective first active UL BWP.

A wireless device may not expect to transmit HARQ-ACK on a PUCCH resource indicated by a DCI format 1_0 or a DCI format 1_1, for example, based on paired spectrum operation, the wireless device changing its active UL BWP on a primary cell between a time of a detection of the DCI format 1_0 or the DCI format 1_1, and/or a time of a corresponding HARQ-ACK transmission on the PUCCH. A wireless device may not monitor PDCCH when the wireless device performs RRM measurements over a bandwidth that is not within the active DL BWP for the wireless device.

A DL BWP index (ID) may be an identifier for a DL BWP. One or more parameters in an RRC configuration may use the DL BWP-ID to associate the one or more parameters with the DL BWP. The DL BWP ID of 0 (e.g., DL BWP ID=0) may be associated with the initial DL BWP. An UL BWP index (ID) may be an identifier for an UL BWP. One or more parameters in an RRC configuration may use the UL BWP-ID to associate the one or more parameters with the UL BWP. The UL BWP ID of 0 (e.g., UL BWP ID=0) may be associated with the initial UL BWP.

A higher layer parameter (e.g., firstActiveDownlinkBWP-Id) may indicate an ID of a DL BWP to be activated upon performing the reconfiguration, for example, based on a higher layer parameter (e.g., firstActiveDownlinkBWP-Id) is configured for an SpCell. A higher layer parameter (e.g., firstActiveDownlinkBWP-Id) may indicate an ID of a DL BWP to be used upon MAC-activation of the SCell, for example, based on the higher layer parameter (e.g., firstActiveDownlinkBWP-Id) being configured for an SCell. A higher layer parameter (e.g., firstActiveUplinkBWP-Id) may indicate an ID of an UL BWP to be activated if performing the reconfiguration, for example, based on the higher layer parameter (e.g., firstActiveUplinkBWP-Id) being configured for an SpCell. A higher layer parameter (e.g., firstActiveUplinkBWP-Id) may indicate an ID of an UL BWP to be used if MAC-activation of the SCell occurs, for example, based on a higher layer parameter (e.g., firstActiveUplinkBWP-Id) being configured for an SCell.

A wireless device, to execute a reconfiguration with sync, may assume (e.g., consider) an uplink BWP indicated in a higher layer parameter (e.g., firstActiveUplinkBWP-Id) to be an active uplink BWP. A wireless device, to execute a reconfiguration with sync, may assume (e.g., consider) a downlink BWP indicated in a higher layer parameter (e.g., firstActiveDownlinkBWP-Id) to be an active downlink BWP.

A wireless device may be provided, for a cell (e.g., SCell, PCell, BWP), with a first set of reference signal (RS) resources (e.g., SSB, CSI-RS) by a first higher layer parameter (e.g., failureDetectionResources, RadioLinkMonitoringRS). The wireless device may be provided, for the cell, with a first threshold by a second higher layer parameter (e.g., rlmInSyncOutOfSyncThreshold). The wireless device may be provided, for the cell, with one or more parameters by a third higher layer parameter (e.g., BeamFailureRecoveryConfig). The third higher layer parameter may be for a beam failure detection and/or a beam failure recovery procedure of the cell. The one or more parameters may comprise at least: a beam failure counter (e.g., beamFailureInstanceMaxCount) for the beam failure detection, a beam failure detection timer (e.g., beamFailureDetectionTimer) for the beam failure detection, and/or a beam failure recovery timer (e.g., beamFailureRecoveryTimer) for the beam failure recovery procedure.

The wireless device (e.g., via the physical layer) may assess a first radio link quality (e.g., BLER, L1-RSRP) according to the first set of RS resources. The wireless device (e.g., via the physical layer) may compare the assessed quality with the first threshold. The wireless device (e.g., via the physical layer) may provide a beam failure instance (BFI) indication to a MAC entity of the wireless device, for example, if the first radio link quality is less (e.g., higher BLER, lower SINR, lower L1-RSRP, etc.) than the first threshold.

The wireless device (e.g., via the physical layer) may provide the BFI indication to the wireless device (e.g., a MAC entity of the wireless device) with a first periodicity. The first periodicity may be determined by a maximum of a period of an RS of the first set of RS resources and a second value (e.g., 2 msec or any other duration). The RS may have the shortest periodicity among the first set of RS resources. The second value may be configured by higher layers (e.g., RRC). The second value may be predefined and/or fixed. As shown in FIG. 26, for example, the periodicity may correspond with T.

The wireless device (e.g., a MAC entity of the wireless device) may increment a counter (e.g., BFI_COUNTER, BFI counter in FIG. 26, etc.) by one, for example, based on receiving the BFI indication via the physical layer. The BFI counter (e.g., BFI_COUNTER) may be a variable used by the wireless device. The BFI counter (e.g., BFI_COUNTER) may be a counter for a BFI indication. The BFI counter (e.g., BFI_COUNTER) may be initially set to zero.

The wireless device (e.g., a MAC entity of the wireless device) may start and/or restart a timer (e.g., the beamFailureDetectionTimer), for example, based on receiving the BFI indication via the physical layer. The timer (e.g., beamFailureDetectionTimer) may expire. The wireless device may set the BFI counter (e.g., BFI_COUNTER) to zero (or any other value) based on the timer (e.g., beamFailureDetectionTimer) expiring.

The wireless device may initiate a random access procedure for a beam failure recovery of the cell, for example, based on the BFI counter (e.g., BFI_COUNTER) being equal to or greater than a value (e.g., beamFailureInstanceMaxCount), and/or if the wireless device is configured with the third higher layer parameter. The wireless device may start the timer (e.g., beamFailureRecoveryTimer) (if configured) based on the random access procedure initiating (or based on the BFI counter being equal to or greater than the value (e.g., beamFailureInstanceMaxCount), for example, if the wireless device is configured with the third higher layer parameter. The random access procedure may be a contention-free random access procedure. The wireless device may initiate a random access procedure for a beam failure recovery based on the BFI counter (e.g., BFI_COUNTER) being equal to or greater than a value (e.g., beamFailureInstanceMaxCount), for example, if the wireless device is not configured with the third higher layer parameter. The random access procedure may be a contention-based random access procedure.

A wireless device may perform a BFR procedure on an SpCell (e.g., PCell or PSCell). A base station may send (e.g., transmit), to a wireless device, one or more messages comprising configuration parameters of one or more cells. The one or more cells may comprise at least one PCell/PSCell and one or more SCells. An SpCell (e.g., PCell or PSCell) and one or more SCells may operate on different frequencies and/or different bands.

An SCell of the one or more SCells may support a multi-beam operation. A wireless device may perform one or more beam management procedures (e.g., a BFR procedure) on and/or for the SCell, in the multi-beam operation. The wireless device may perform a BFR procedure for the SCell, for example, if at least one of one or more beam pair links between the SCell and the wireless device fails. Previously existing BFR procedures may result in inefficiencies if there is a beam failure for the SCell. Previously existing BFR procedures may be inefficient, time-consuming, and/or increase battery power consumption.

BFR procedures for wireless devices as disclosed herein may improve downlink radio efficiency and/or reduce uplink signaling overhead, for example, if there is a beam failure for one or more SCells. A BFR procedure for a wireless device may use first cell random access resources if a beam failure for an SCell of the one or more SCells occurs. A downlink signaling process for a wireless device may be used for recovery of a beam failure for an SCell. An uplink signaling process for a wireless device may be used for a BFR procedure of the SCell. Processes for a wireless device and a base station may include a BFR procedure for an SCell. Processes for a wireless device and a base station may reduce resources (e.g., random access resources, preambles, etc.) for the BFR procedure.

A base station may configure a wireless device with an SCell. The SCell may not have uplink resources. The SCell may comprise downlink-only resources (e.g., a downlink-only SCell). The wireless device may not transmit an uplink signal (e.g., preamble) on the downlink-only SCell for a BFR procedure of the SCell, based on the SCell not having uplink resources, for example, if the wireless device detects a beam failure on the SCell. The wireless device may not perform a BFR procedure on the downlink-only SCell, for example, if the BFR procedure requires an uplink channel. The base station may not be aware of the beam failure on the downlink-only SCell, for example, based on the wireless device not performing the BFR procedure on the SCell. BFR procedures as described herein for an SCell that comprises downlink-only resources may provide superior performance, for example, by being performed via another cell.

An SCell may operate at a high frequency (e.g., 23 GHz, 60 GHz, 70 GHZ, or any other frequency). An SpCell may operate at a low frequency (e.g., 2.4 GHz, 5 GHZ, or any other frequency). The channel condition of the SCell may be different from the channel condition of the SpCell. The wireless device may use uplink resources of the SpCell to transmit a preamble for a beam failure recovery request for the SCell, for example, to improve robustness of transmission of the preamble. BFR procedures as described herein may provide superior performance, for example, if an SCell operates in a different frequency than a PCell. BFR procedures as described herein may provide superior performance, for example, if a downlink-only SCell uses uplink resources (e.g., random access resources, uplink BWPs, etc.) of the PCell for a BFR procedure of the SCell.

At least some base stations (e.g., a base station compliant with 3GPP Release 15 or other technologies) may configure and activate one or more wireless resources such as BFR resources (e.g., preambles, random access occasions including time/frequency resources) via one or more RRC messages (e.g., BFRConfig, RadioLinkMonitoringConfig, etc.). A base station may configure a wireless device with one or more downlink BWPs of a cell and/or one or more candidate beams of the cell. A BFR procedure of the cell may specify that one or more PRACH resources (e.g., preamble, time, frequency) for each candidate beam of the one or more candidate beams of each downlink BWP of the one or more downlink BWPs of the wireless device may be orthogonal. The one or more PRACH resources may be configured via RRC messages. A wireless device may be configured with one or more secondary cells (e.g., SCells) at the same time (or at different times).

In at least some wireless communication systems, for a BFR procedure of a PCell, the base station may configure an alternate time/frequency resource and/or a random access preamble for each candidate beam of the PCell. The wireless device may send a random access preamble to the base station, and the base station may receive the random access preamble. The base station may become aware of the candidate beam that the wireless device has selected for the BFR procedure of the PCell. The base station may have an orthogonal resource allocation with orthogonal time/frequency resources and candidate beams. The base station may determine (e.g., based on this orthogonality) which candidate beam has been selected by the wireless device for the wireless device BFR procedure of the PCell. The base station may configure the wireless device by an RRC configuration to have orthogonal resource assignments. The base station may configure candidate beams for BFR that are associated with an orthogonal combination of time, frequency, and/or preamble values. Each candidate beam may be associated with a different combination of time/frequency resources and random access preambles. The base station may transmit over different beams to different wireless devices simultaneously, for example, without interference problems. Candidate beam 1 may be associated with time 1, frequency 1, and preamble 1. Candidate beam 2 may be associated with time 2, frequency 2, and preamble 2. If a wireless device executes a BFR and selects candidate beam 1, the wireless device may transmit preamble 1 with time resource 1 and frequency resource 1. The base station may determine that the wireless device has selected candidate beam 1 for BFR, for example, if the base station receives preamble 1 with time resource 1 and frequency resource 1.

A wireless device performing BFR procedures for an SCell in the same manner that legacy systems perform BFR procedures for a PCell may use far more resources than the BFR procedures described herein. A wireless device may support up to 32 SCells, for example, or up to any other number of cells that may be determined (e.g., 64 SCells, 128 SCells, 256 SCells, etc.). An orthogonal resource for each candidate beam of the 32 SCells (or other quantity of SCells) may greatly increase the resource requirements over legacy systems. For example, a system may use 64 candidate beams (or a greater quantity of beams), multiplied by four downlink BWPs (or a greater quantity of BWPs or other wireless resources), multiplied by 32 cells (or a greater quantity of cells). Approximately 8,192 orthogonal resources (or a greater quantity of orthogonal resources) may be required for some systems to support BFR of the 32 SCells (or a greater quantity of SCells). The more orthogonal resources that are available for candidate beams, the more resources and overhead that may be required for the BFR procedure in such systems. If the wireless communication system has a shortage of dedicated resources, the resource requirements for candidate beams for BFR procedures with SCells may be a problem.

To avoid a shortage of dedicated resources for BFR and/or improve speed and/or efficiency of the BFR operations, multiple SCells may be configured to share resources (e.g., the same time/frequency resources and the same random access preambles). To facilitate this sharing of resources, a new MAC CE is introduced herein that assigns particular resources from a pool of shared resources to particular SCells, so that a particular SCell may be authorized to access the assigned resources from the pool of shared resources and not other resources. The MAC CE may provide dynamic orthogonality between the BFR resources. Random access resources to be used for a cell in a beam failure recovery procedure may be configured via RRC signaling and activated via a MAC CE. Because not all of the SCells may be active at the same time, using the MAC CE described herein is beneficial to avoid dedicating resources to SCells that are not active. Eight of the SCells may be active at a time, for example, or any quantity less than the maximum quantity of SCells (e.g., less than 32 SCells) may be active at a time. If an SCell is active, a base station may transmit a MAC CE on the active SCell and activate candidate beams on the active SCell. The MAC CE may effectively group candidate beams together into sets that may be reused by different SCells, since only a fraction of the total number of SCells may be active at any given time. Using the MAC CE reduces the number of dedicated resources that are required for BFR, thereby reducing computational complexity and power consumption, and improving system efficiency and performance.

Figure 27:
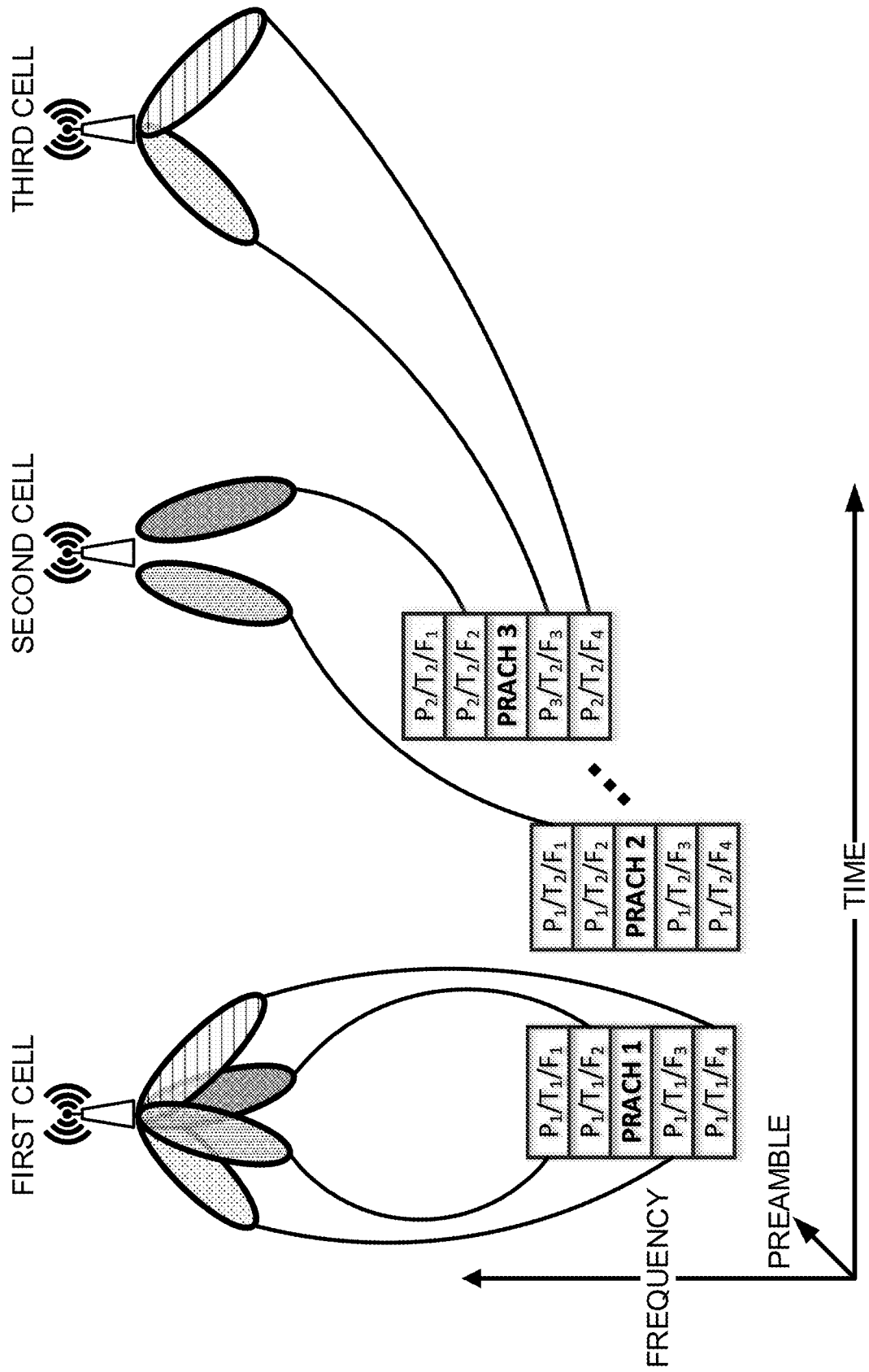
FIG. 27 shows an example of a resource configuration for a downlink beam failure recovery procedure.

FIG. 27 shows an example of a resource configuration for a downlink beam failure recovery (BFR) procedure. One or more PRACH resources (e.g., preamble, time, frequency) for each of the one or more candidate beams of each of the one or more downlink BWPs of each of the one or more secondary cells may be orthogonal for an exemplary BFR procedure of the wireless device. The base station may configure the one or more PRACH resources via RRC signaling. The base station's configuration and activation of the one or more BFR resources via RRC may lead to a shortage of dedicated PRACH resources. A few (or more or less) of the one or more secondary cells may be active at a time. The base station may not configure orthogonal PRACH resources for the BFR procedure, based on a few secondary cells being active at a time.

A base station may configure one or more BFR resources via RRC signaling. The base station may activate at least one of the one or more BFR resources via a MAC CE (e.g., BFR MAC CE) for a BFR procedure of an SCell (e.g., SCell downlink). The base station may configure the same BFR resources (e.g., preamble, time, frequency) to at least two secondary cells due to activating the BFR resources via a MAC CE. At least two secondary cells may share the same preambles, share the same time resources, and/or share the same frequency resources. The base station may guarantee orthogonal PRACH resources via a MAC CE activation. The base station may activate a cell via a MAC CE, for example, if the cell is configured to operate in a higher frequency band (e.g., millimeter waves).

A wireless device may move at a high speed, for example, if the wireless device is located in a vehicle that is traveling at a high speed. A wireless device moving at a high speed relative to the associated base station may result in a beam failure. The base station may send (e.g., transmit) the MAC CE (e.g., BFR MAC CE) to the wireless device, based on the wireless device moving at a high speed.

Figure 28:
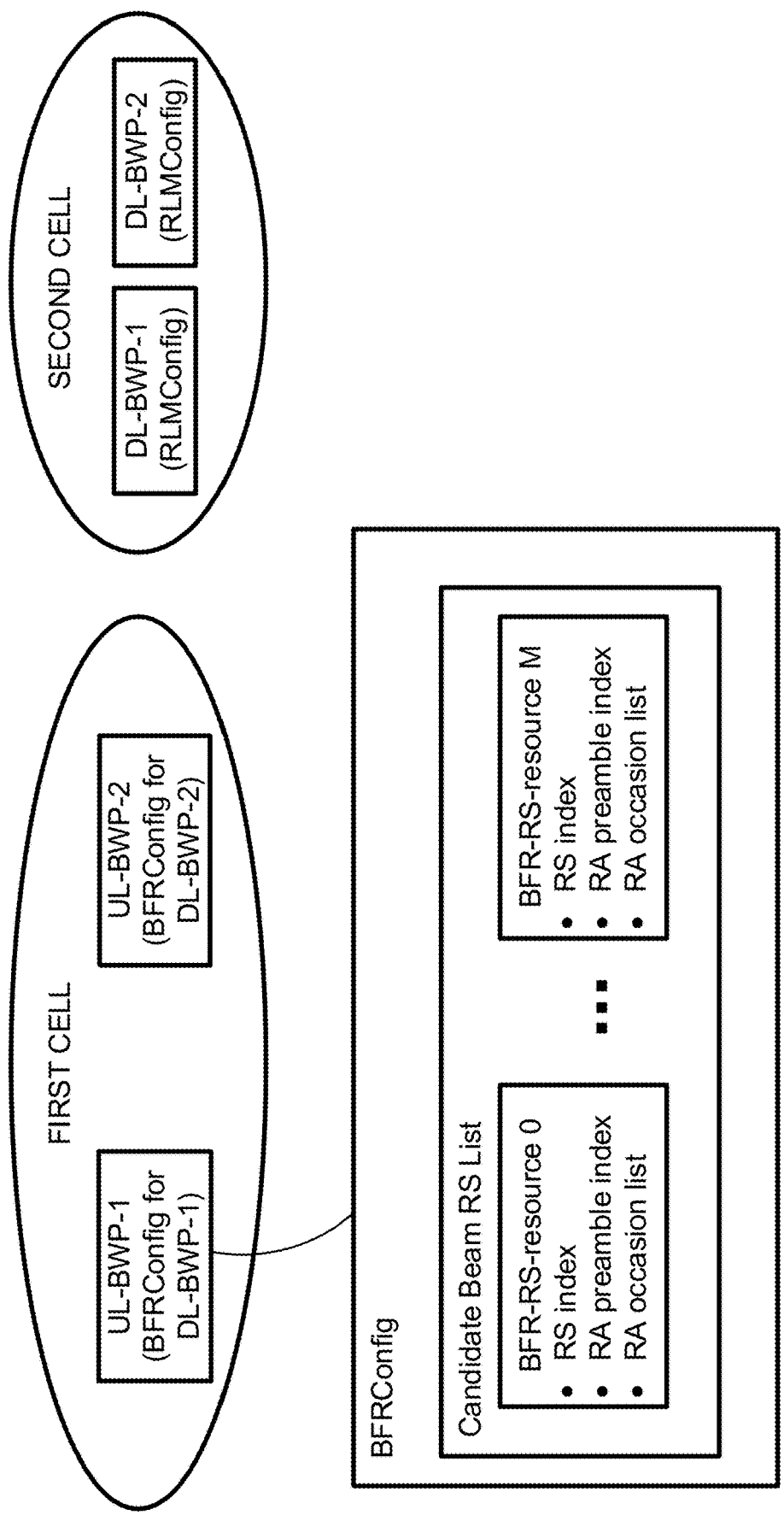
FIG. 28 shows an example of a resource configuration for a downlink beam failure recovery procedure.

FIG. 28 shows an example of a BFR procedure. Associated with each of the UL BWPs, UL-BWP-1 and UL-BWP-2, of the first cell is a Candidate Beam RS List that may be specified in a BFRConfig configuration for BFR. Each of the candidate beams may be indicated and/or identified as a BFR-RS-resource, ranging from 0 to M. Each candidate beam BFR-RS-resource in the Candidate Beam RS List may be associated with an RS index, an RA preamble index, and/or an RA occasion list. Each of the candidate beams in the Candidate Beam RS List may be associated with a different combination of RA preamble and time-frequency occasion. The time-frequency occasion may specify a time and frequency resource to transmit the RA preamble. The BFRConfigs for the first cell may be specified the same as corresponding BFRConfigs for the second cell, for example, so that the first cell and the second cell share the same Candidate Beam RS List. The base station may configure the Candidate Beam RS List, and/or may combine the Candidate Beam RS List with a MAC CE that is unique for the different cells, so that the MAC CE may select the candidate beam for a particular cell (e.g., whether the particular cell is the first cell or the second cell). The base station may specify the MAC CE to activate at least one candidate beam for a particular cell, for example, a particular SCell. Only the particular SCell for which the candidate beam is activated may use the activated candidate beam. The base station may specify and/or transmit a MAC CE to a particular SCell, for example, that may activate a particular set of candidate beams in the Candidate Beam RS List for the particular SCell. The particular SCell may be limited to using the activated candidate beams as specified by the MAC CE. The particular SCell may be uniquely authorized among all cells to use the activated candidate beams specified by the MAC CE for the particular SCell. While all SCells may share candidate beam resources with the PCell, the MAC CE may provide orthogonality between all the SCells, for example, so that a particular candidate beam may be used by just one SCell (and not any other SCell) for candidate beam selection in a BFR procedure. Sharing resources between the SCells may reduce the total number of candidate beams in a system, and may reduce the computational and/or memory overhead associated with a larger number of resources.

A base station may send (e.g., transmit), to a wireless device, one or more messages comprising configuration parameters for a first cell (e.g., PCell, SCell) and one or more secondary cells. The wireless device may receive, from the base station, the one or more messages comprising the configuration parameters for a first cell (e.g., PCell, SCell) and one or more secondary cells. The one or more secondary cells may comprise a second cell (e.g., SCell). The one or more messages may comprise one or more RRC messages (e.g., RRC connection reconfiguration message, RRC connection reestablishment message, or RRC connection setup message).

The configuration parameters for the first cell and one or more secondary cells may comprise bandwidth part (BWP) configuration parameters for a plurality of BWPs. The plurality of BWPs may comprise a first plurality of UL BWPs of the first cell. The first plurality of UL BWPs may comprise UL-BWP-1 and UL-BWP-2, for example, as shown in FIG. 28. The plurality of BWPs may comprise a second plurality of DL BWPs of the second cell. The second plurality of DL BWPs may comprise DL-BWP-1 and DL-BWP-2, for example, as shown in FIG. 28.

The configuration parameters for the first cell and one or more secondary cells may comprise DL-BWP-specific BFR configuration parameters (e.g., RadioLinkMonitoringConfig) on at least one of the second plurality of DL BWPs (e.g., DL-BWP-1 and/or DL-BWP-2 shown in FIG. 28) of the second cell. The DL-BWP-specific BFR configuration parameters (BFRConfig) may comprise one or more RSs (e.g., RadioLinkMonitoringRS) of the at least one of the second plurality of DL BWPs and a beam failure instance (BFI) counter (e.g., beamFailureInstanceMaxCount) associated with at least one of the second plurality of DL BWPs. The wireless device may assess the one or more RSs (e.g., SSBs, CSI-RSs). The wireless device may detect a beam failure of at least one of the second plurality of DL BWPs of the second cell, for example, based on assessing the one or more RSs and/or based on the BFI counter. The DL-BWP-1 and DL-BWP-2 may be configured with radio link monitoring (RLM) configuration definitions (e.g., RLMConfig).

First DL-BWP-specific BFR configuration parameters configured on the DL-BWP-1 of the second cell may comprise one or more first RSs (e.g., RadioLinkMonitoringRS) of the DL-BWP-1 and a first BFI counter (e.g., beamFailureInstanceMaxCount) associated with the DL-BWP-1, for example, as shown in FIG. 28. The wireless device may assess the one or more first RSs (e.g., SSBs, CSI-RSs). The wireless device may detect a beam failure of the DL-BWP-1, based on assessing the one or more first RSs and/or based on the first BFI counter.

Second DL-BWP-specific BFR configuration parameters configured on the DL-BWP-2 of the second cell may comprise one or more second RSs (e.g., RadioLinkMonitoringRS) of the DL-BWP-2 and a second BFI counter (e.g., beamFailureInstanceMaxCount) associated with the DL-BWP-2. The wireless device may assess the one or more second RSs (e.g., SSBs, CSI-RSs). The wireless device may detect a beam failure of the DL-BWP-2, based on assessing the one or more second RSs and/or based on the second BFI counter.

The configuration parameters for the first cell and one or more secondary cells may further comprise UL-BWP-specific BFR configuration parameters (e.g., BeamFailureRecoveryConfig) on at least one of the first plurality of UL BWPs (e.g., UL-BWP-1 and/or UL-BWP-2 shown in FIG. 28) of the first cell. The UL-BWP-specific BFR configuration parameters configured on the at least one of the first plurality of UL BWPs may comprise a candidate beam RS list (e.g., candidateBeamRSList) associated with the at least one of the second plurality of DL BWPs of the second cell (e.g., DL-BWP-1 and/or DL-BWP-2 shown in FIG. 28).

First UL-BWP-specific BFR configuration parameters configured on the UL-BWP-1 (e.g., BFRConfig for DL-BWP-1) may comprise a first candidate beam RS list (e.g., Candidate Beam RS List) associated with the DL-BWP-1 of the second cell, for example, as shown in FIG. 28. Second UL-BWP-specific BFR configuration parameters configured on the UL-BWP-2 (e.g., BFRConfig for DL-BWP-2) may comprise a second candidate beam RS list (e.g., candidateBeamRSList) associated with the DL-BWP-2 of the second cell.

The first candidate beam RS list may comprise one or more BFR-RS resources (e.g., BFR-RS-resource 0, . . . , BFR-RS-resource M shown in FIG. 28). Each of the one or more BFR-RS resources may be associated with an RS index (e.g., NZP-CSI-RS-ResourceId, SSB-index), at least one random access occasion (e.g., RA occasion list shown in FIG. 28), and/or a preamble index (e.g., RA preamble index shown in FIG. 28). The RS index associated with each of the one or more BFR-RS resources may be different from the RS indices associated with others of the BFR-RS resources. At least two of the BFR-RS resources may share the same RS index. The preamble index associated with each of the one or more BFR-RS resources may be different from the preamble indices associated with others of the BFR-RS resources. At least two of the BFR-RS resources may share the same preamble index. The at least one random access occasion associated with each of the one or more BFR-RS resources may be different from the at least one random access occasions associated with others of the BFR-RS resources. At least two of the BFR-RS resources may share the same at least one random access occasion.

The wireless device may use the RS index to indicate and/or identify a non-zero-power (NZP) CSI-RS resource transmitted in the second cell. The NZP CSI_RS resource may be transmitted in the first cell, for example, if the first cell and the second cell are QCLed. The base station may configure the NZP-CSI-RS resource in CSI-MeasConfig of the second cell (e.g., for the DL-BWP-1). A wireless device may determine (e.g., based on the NZP-CSI-RS resource) a candidate beam for a beam failure recovery (BFR) associated with the at least one of the second plurality of DL BWPs of the second cell (e.g., the DL-BWP-1).

The base station may use the CSI-MeasConfig to configure one or more CSI-RSs (e.g., reference signals) belonging to a serving cell in which the CSI-MeasConfig may be included. The base station may use the CSI-MeasConfig to configure channel state information reports to be transmitted on PUCCH on a serving cell in which the CSI-MeasConfig may be included. The base station may use the CSI-MeasConfig to configure channel state information reports on PUSCH triggered by DCI received on a serving cell in which the CSI-MeasConfig may be included.

The wireless device may use the RS index to indicate and/or identify an SS/PBCH block within an SS-burst. The SS/PBCH block may determine a candidate beam for a BFR associated with the at least one of the second plurality of DL BWPs of the second cell (e.g., the DL-BWP-1). The wireless device may send (e.g., transmit) a preamble, indicated and/or identified by the preamble index, via the at least one random access occasion (e.g., on the UL-BWP-1) to perform the BFR associated with the at least one of the second plurality of DL BWPs of the second cell (e.g., the DL-BWP-1), based on or after selecting a candidate beam (e.g., RS) indicated and/or identified by the RS index.

FIG. 29A shows an exemplary beam failure recovery medium access control control element (BFR MAC CE). A base station may transmit the BFR MAC CE to configure the beam failure recovery procedures of all wireless devices that communicate with the base station via the PCell, and/or of all SCells that communicate with and/or are controlled by the base station. The BFR MAC CE is shown as comprising numerous fields arranged in octets (e.g., units of 8 bits each). Octet 1 may comprise a five-bit field Serving Cell ID, a two-bit field BWP ID, and/or a one-bit field A/D, each of which is explained below. Octets 2 through M+2 may comprise a numbered sequence of eight-bit fields RS ID, which are explained below.

Each BFR MAC CE, based on the included fields, may indicate and/or specify a subset of BFR-RS-resources, among the pool of BFR-RS-resources that may be shared among all SCells associated with the base station's PCell. The indicated and/or specified subset may be activated and/or deactivated for use by a particular BWP that is indicated and/or specified by the field BWP ID for a particular SCell indicated and/or specified by the field Serving Cell ID, according to a value of the A/D bit field. There may be up to 32 SCells associated with a single PCell, four BWPs associated with each of the 32 SCells, and 256 BFR-RS-resources (e.g., candidate beams) that are in a pool of candidate beams shared by all the SCells, based on a quantity of bits allocated to the different fields. A quantity of BWPs, SCells, and/or candidate beams shown and described is an example and should not be construed as limiting. Any quantity of bits in the BWP ID and/or the Serving Cell ID fields may be changed (e.g., increased or decreased) to support different quantities of BWPs and/or SCells. A base station may send (e.g., transmit) four BFR MAC CEs as shown in FIG. 29A for each SCell, for example, to activate a unique set of candidate beams for a BFR procedure for each of the BWPs in each of the SCells according to the M+1 specified RS IDs in Octets 2 through M+2. While the pool of BFR-RS-resources may be shared among all the cells, the BFR MAC CE orthogonally may allocate the BFR-RS-resources to the individual DL BWPs of all the SCells associated with the base station that sends (e.g., transmits) the BFR MAC CEs. If the base station determines to activate and/or deactivate a particular candidate beam for use by a particular BWP of a particular SCell, the base station may send (e.g., transmit) the BFR MAC CE shown in FIG. 29A, including the RS ID's corresponding to the candidate beams having a changed activation/deactivation status. A change in a single candidate beam activation/deactivation status may require less transmission power and/or processing power than an initial specification of the activation/deactivation status of all the potential candidate beams if using the BFR MAC CE format shown in FIG. 29A.

A base station may send (e.g., transmit) a BFR MAC CE, to a wireless device, to activate and/or deactivate one or more BFR-RS resources (e.g., associated PRACH resources, one or more preambles, one or more RSs, etc.) for the wireless device to use. The BFR MAC CE may be associated with a logic channel ID (LCID) in a corresponding MAC header. The LCID may indicate that the BFR MAC CE may activate and/or deactivate the one or more BFR-RS resources. The LCID may indicated and/or identify a logical channel instance of the BFR MAC CE. A size of the LCID may correspond to a value (e.g., 6 bits, or any other quantity of bits). The BFR MAC CE may comprise one or more fields comprising at least one of: a first field, a second field, a third field, and/or a fourth field.

The first field may indicate an identity of a serving cell (e.g., Serving Cell ID). A wireless device may apply one or more actions for the serving cell according to the BFR MAC CE, for example, based on the first field indicating the identity of the serving cell. A length of the first field may correspond to a first value (e.g., 5 bits, or any other quantity of bits).

The second field may indicate a BWP index (e.g., BWP ID) of a BWP (e.g., DL BWP). The BFR MAC CE may apply for the BWP based on the second field indicating the BWP index of the BWP. A length of the second field may correspond to a second value (e.g., 2 bits, or any other quantity of bits). A total of four BWPs may be uniquely indicated and/or identified by a two-bit-length BWP ID field. Any other quantity of BWPs may be uniquely indicated and/or identified by a BWP ID field comprising a corresponding length (e.g., two BWPs corresponding to a 1-bit length, eight BWPs corresponding to a 3-bit length, sixteen BWPs corresponding to a 4-bit length, etc.).

The third field may indicate one or more RS indices (e.g., RS-ID_0, . . . , RS-ID_M shown in FIG. 29A) associated with the one or more BFR-RS resources (e.g., BFR-RS-resource 0, BFR-RS-resource M shown in FIG. 28). Each of the one or more RS indices may indicate an RS index associated with one of the one or more BFR-RS resources, and thereby indicate and/or identify a unique candidate beam for the BFR procedure. RS-ID_0 may indicate the BFR-RS-resource 0, and RS-ID_M may indicate the BFR-RS-resource M. A length of the third field may correspond to a third value (e.g., (M+1)*8 bits, where M+1 is the number of BFR-RS resources).

The fourth field (e.g., A/D) may indicate whether the BFR MAC CE is used to activate (e.g., "A") or deactivate (e.g., "D") the one or more BFR-RS resources indicated by the one or more RS indices. Setting the fourth field to "1" may indicate activation (e.g., "A"). Setting the fourth field to "0" may indicate deactivation (e.g., "D").

The wireless device may activate the BFR-RS-resource 0 associated with the RS-ID_0, for example, based on the fourth field being set to "1" and the third field indicating RS-ID_0. The wireless device may deactivate the BFR-RS-resource 0 associated with the RS-ID_0, for example, based on the fourth field being set to "0" and the third field indicating RS-ID_0.

FIG. 29B shows an exemplary BFR MAC CE. A base station may send (e.g., transmit) the BFR MAC CE to configure the beam failure recovery procedures of wireless devices that communicate with the base station via the PCell, and of SCells that communicate with and/or are controlled by the base station. The BFR MAC CE is shown as having numerous fields arranged in octets (e.g., units of 8 bits each). As shown, Octet 1 comprises a five-bit field Serving Cell ID, a two-bit field BWP ID, and a one-bit field R, each of which is explained below. Octets 2 through N comprise a numbered sequence of one-bit fields C_i, where i ranges from 0 to M, which are explained below.

Each BFR MAC CE, based on the included fields, may specify the activated/deactivated status of all possible BFR-RS-resources for use by a particular BWP that is indicated and/or specified by the field BWP ID for a particular SCell indicated and/or specified by the field Serving Cell ID. There may be up to 31 SCells associated with a single PCell, four BWPs associated with each of the 31 SCells, and M+1 BFR-RS-resources (e.g., candidate beams) that may be in a pool of candidate beams shared by all the SCells, based on a quantity of bits allocated to the different fields. The activated/deactivated status of each of the candidate beams may be specified according to a value of a corresponding C_i in a bitmap of C_i's to BFR-RS-resources corresponding to all the potential candidate beams in the pool of candidate beams shared by all the SCells. For example, for values of the variable i ranging from 0 to M, C_i may correspond to and specify the activation/deactivation status of the BFR-RS-resource i shown in the Candidate Beam RS List in FIG. 28. A value of "1" for C_i may indicate that the associated candidate beam is activated for the specified BWP and SCell. A value of "0" may indicate that the associated candidate beam is deactivated for the specified BWP and SCell. The bitmap of C_i's are presented in Octets 2 through N. A quantity of BWPs, SCells, and candidate beams shown and described is an example and should not be construed as limiting. A quantity of bits in the BWP ID and/or Serving Cell ID fields may be changed (e.g., increased or decreased) to support different quantities of BWPs and/or SCells. A base station may send (e.g., transmit) four BFR MAC CEs (as shown in FIG. 29B) for each SCell, for example, to indicate and/or specify the activated/deactivated status for all possible candidate beams for a BFR procedure for each of the BWPs in each of the SCells according to the bitmap of M+1 C_i's in Octets 2 through M+2. While the pool of BFR-RS-resources may be shared among all of the cells, the BFR MAC CE orthogonally may allocate the BFR-RS-resources to the individual DL BWPs of all of the SCells associated with the base station that sends (e.g., transmits) the BFR MAC CEs. The base station may send (e.g., transmit) the entire BFR MAC CE shown in FIG. 29B including the full C_i bitmap corresponding to the entire pool of candidate beams, if the base station determines to activate and/or deactivate a particular candidate beam for use by a particular BWP of a particular SCell.

There may be performance trade-offs between the BFR MAC CE formats of FIG. 29A and FIG. 29B. A change in a single candidate beam activation/deactivation status may require more transmission power and/or processing power if using the BFR MAC CE format shown in FIG. 29B compared with using the BFR MAC CE format shown in FIG. 29A. The BFR MAC CE of FIG. 29B may require less transmission power and/or processing power compared with the BFR MAC CE format shown in FIG. 29A, for example, because the format shown in FIG. 29B uses only one bit to designate the activation/deactivation status for each candidate beam. The BFR MAC CE format shown in FIG. 29A may use a full octet (e.g., 8 bits) to designate the activation/deactivation status for each candidate beam, for example, if specifying the activation/deactivation status for all candidate beams for a particular DL BWP and SCell. A beneficial compromise may include using the BFR MAC CE format of FIG. 29B if initially specifying the activation/deactivation status for each candidate beam for each DL BWP of each SCell, and using the BFR MAC CE format of FIG. 29A if (e.g., later) changing the activation/deactivation status of a smaller subset for candidate beams for one or more DL BWPs of one or more SCells.

The BFR MAC CE may comprise at least one of a first field, a second field, a third field, and/or a fourth field. The first field (e.g., Serving Cell ID) and the second field (e.g., BWP ID) may be correspond to the fields described above in regard to FIG. 29A. A length of the third field may correspond to a third value (e.g., M+1 bits, where M+1 is the number of BFR-RS resources) different from that discussed above in regard to FIG. 29A. The contents of the third field are described below. The fourth field may indicate a reserved bit (e.g., an R field). The reserved bit may be set to zero (or one).

The third field may comprise one or more C-fields (e.g., C_0, . . . , C_M shown in FIG. 29B). A C_i field of the one or more C-fields may indicate an activation/deactivation status of a BFR-RS resource i (e.g., if configured) of the one or more BFR-RS resources (e.g., BFR-RS-resource 0, . . . , BFR-RS-resource M shown in FIG. 28). A BFR-RS resource i may be activated if the C_i field is set to one. A BFR-RS resource i may be deactivated if the C_i field is set to zero.

The base station may configure M+1 BFR-RS-resources, i.e., BFR-RS-resource 0 to BFR-RS-resource M, as shown in FIG. 28. The wireless device may deactivate the BFR-RS-resource 0, for example, if the wireless device receives the BFR MAC CE with the C_0 field set to zero. The wireless device may activate the BFR-RS-resource 0, for example, if the wireless device receives the BFR MAC CE with the C_0 field set to one. The wireless device may deactivate the BFR-RS-resource M, for example, if the wireless device receives the BFR MAC CE with the C_M field set to zero. The wireless device may activate the BFR-RS-resource M, for example, if the wireless device receives the BFR MAC CE with the C_M field set to one.

The base station may not configure BFR-RS resource i. The wireless device may ignore the C_i field, for example, if the base station does not configure BFR-RS resource i.

Figure 30:
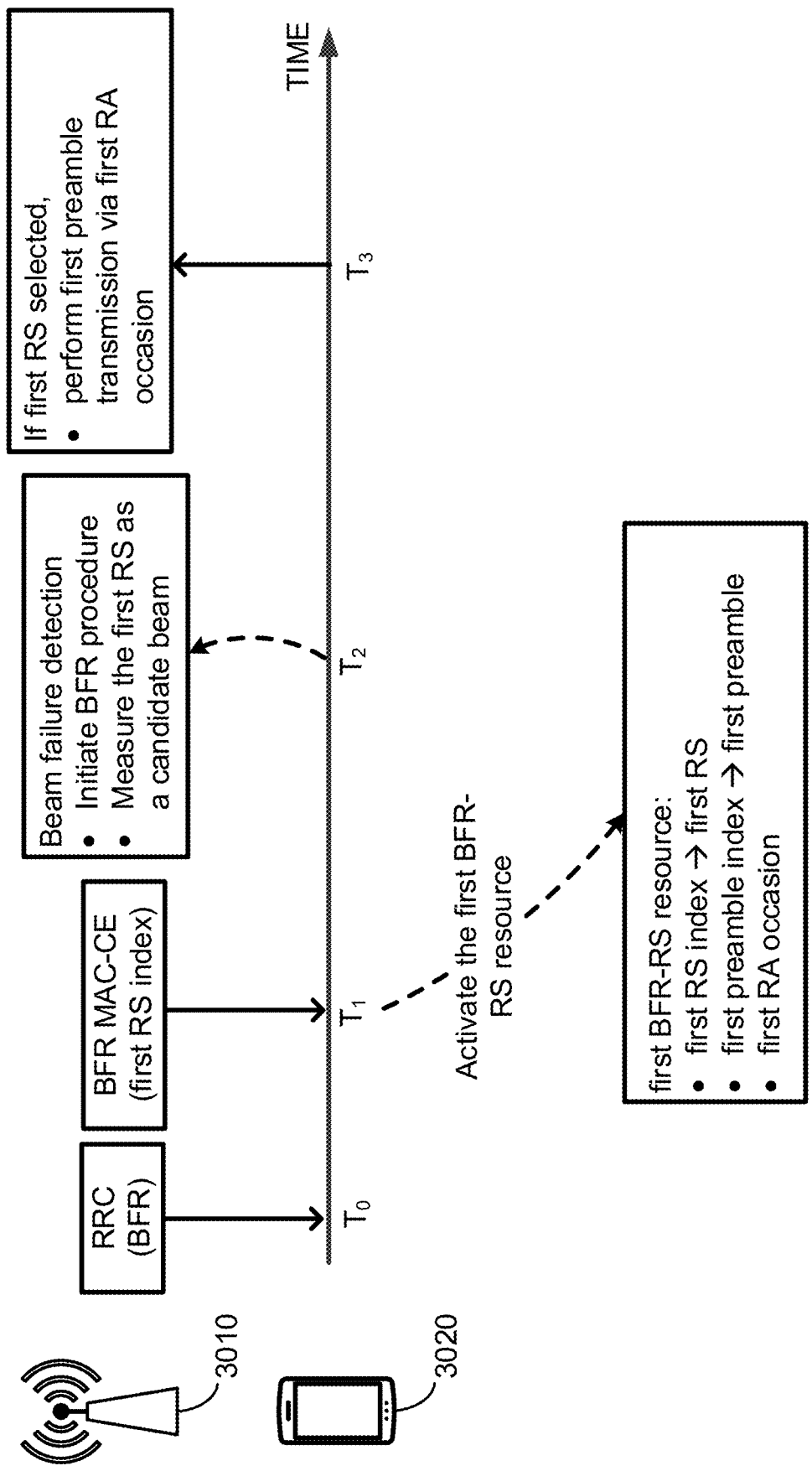
FIG. 30 shows an example of a downlink beam failure recovery procedure.

FIG. 30 shows an example of a downlink BFR procedure. A base station 3010 may send (e.g., transmit) to a wireless device 3020, and the wireless device 3020 may receive from the base station 3010, one or more RRC messages comprising configuration parameters for a first cell (e.g., PCell) and one or more secondary cells (e.g., SCell) at time T0, as discussed above in regard to FIG. 28. The one or more RRC messages may specify a candidate beam list (e.g., the full set of candidate beams for a BFR procedure that may be shared among all cells). Because a wireless device receiving the RRC message at time T0 may not know what candidate beams are activated for each BWP of each SCell with which the wireless device may communicate, the wireless device may not be able to perform a BFR procedure. The wireless device may not monitor for (e.g., may refrain from monitoring) a beam failure and/or may not measure (e.g., may refrain from measuring) any beams, for example, at least until after receiving specifications indicating which candidate beams are activated for each BWP of each SCell with which the wireless device may communicate.

The base station 3010 may send (e.g., transmit) to the wireless device 3020, and the wireless device 3020 may receive, a BFR MAC CE (e.g., as discussed above in regard to FIG. 29A) at time T1. The first field of the BFR MAC CE may indicate a second cell (e.g., SCell). The second field of the BFR MAC CE may indicate at least one of the second plurality of DL BWPs (e.g., the DL-BWP-1 shown in FIG. 28). The third field of the BFR MAC CE may indicate a first RS index associated with a first BFR-RS resource (e.g., BFR-RS resource 0 shown in FIG. 28) of the one or more BFR-RS resources (e.g., BFR-RS resource 0, . . . , BFR-RS resource M shown in FIG. 28). The first BFR-RS resource may comprise the first RS index indicating a first RS (e.g., CSI-RS, SSB), a first random access (RA) occasion, and/or a first preamble index indicating a first preamble. The fourth field of the BFR MAC CE may indicate activation (e.g., set to "1").

The wireless device may activate the first BFR-RS resource, for example, based on the third field of the BFR MAC CE indicating the first RS index and the fourth field of the BFR MAC CE being set to one. The wireless device may monitor and/or assess the first RS as a candidate beam for a BFR of at least one of the second plurality of DL BWPs (e.g., indicated by the second field) of the second cell (e.g., indicated by the first field), for example, based on the wireless device activating the first BFR-RS resource. The wireless device may send (e.g., transmit) the first preamble via the first RA occasion for a BFR of at least one of the second plurality of DL BWPs (e.g., indicated by the second field) of the second cell (e.g., indicated by the first field), for example, based on the wireless device activating the first BFR-RS resource and/or if the wireless device selects the first RS as a candidate beam.

The wireless device may deactivate the first BFR-RS resource, for example, based on the third field of the BFR MAC CE indicating the first RS index and/or the fourth field of the BFR MAC CE being set to zero. The wireless device may stop monitoring and/or assessing the first RS as a candidate beam for a BFR of at least one of the second plurality of DL BWPs (e.g., indicated by the second field) of the second cell (e.g., indicated by the first field), for example, based on deactivating the first BFR-RS resource. The wireless device may not transmit the first preamble via the first RA occasion for a BFR of the at least one of the second plurality of DL BWPs (e.g. indicated by the second field) of the second cell (e.g., indicated by the first field), for example, based on deactivating the first BFR-RS resource.

The wireless device may operate on at least one of the second plurality of DL BWPs (e.g., DL-BWP-1) at time T2. The at least one of the second plurality of DL BWPs may be an active DL BWP of the second cell at time T2.

The wireless device may operate on at least one of the first plurality of UL BWPs (e.g., UL-BWP-1) at time T2. The at least one of the first plurality of UL BWPs may be an active UL BWP of the first cell at time T2.

The wireless device (e.g., via the physical layer) may assess a radio link quality according to the one or more RSs (e.g., RadioLinkMonitoringRS) associated with at least one of the second plurality of DL BWPs (e.g., DL-BWP-1). The wireless device (e.g., via the physical layer) may compare the assessed quality with a first threshold (e.g., rlmInSyncOutOfSyncThreshold). The first threshold (e.g., BLER, L1-RSRP) may correspond to a value provided by a higher layer (e.g., RRC, MAC). The first threshold may correspond to a value provided by the configuration parameters for the first cell (e.g., PCell) and/or one or more secondary cells (e.g., SCell).

The wireless device (e.g., via the physical layer) may provide a beam failure instance (BFI) indication to higher layers (e.g., MAC) of the wireless device, for example, if the radio link quality of the one or more RSs is worse (e.g., higher BLER, lower L1-RSRP, lower SINR) than the first threshold. The wireless device may increment a BFI counter (e.g., BFI_COUNTER) by one (e.g., at time T, 2T, 5T as shown in FIG. 26), for example, if a higher layer entity (e.g., MAC entity) receives the BFI indication via the physical layer of the wireless device. The BFI counter (e.g., BFI_COUNTER) may be a counter for a BFI indication. The BFI counter (e.g., BFI_COUNTER) may be initially set to zero.

The BFI counter (e.g., BFI_COUNTER) may be equal to or greater than the value of BFI counter (e.g., beamFailureInstanceMaxCount), for example, based on incrementing the BFI counter. The wireless device may initiate a random access procedure for a beam failure recovery of at least one of the second plurality of DL BWPs of the second cell, for example, based on or in response to the BFI counter (e.g., BFI_COUNTER) being equal to or greater than the value of BFI counter (e.g., beamFailureInstanceMaxCount).

The wireless device (e.g., via the physical layer) may assess a second radio link quality of the first RS (e.g., CSI-RS, SSB) of at least one of the second plurality of DL BWPs (e.g., DL-BWP-1) against a second threshold (e.g., rsrp-ThresholdSSB), for example, based on the third field of the BFR MAC CE indicating the first RS index, and/or if the wireless device initiates the random access procedure. The first RS may be identified and/or indicated by the first RS index. The second threshold (e.g., BLER, L1-RSRP) may correspond to a second value provided by a higher layer entity (e.g., RRC, MAC entity). The second threshold may correspond to a second value provided by the configuration parameters.

The wireless device may select the first RS as a candidate beam if the second radio link quality of the first RS is better (e.g., lower BLER, higher LI-RSRP, higher SINR) than the second threshold. The wireless device may send (e.g., transmit) a first preamble identified and/or indicated by the first preamble index via the first random access occasion for the BFR of at least one of the second plurality of DL BWPs of the second cell, for example, based on selecting the first RS, at time T3 shown in FIG. 30.

Figure 31A:
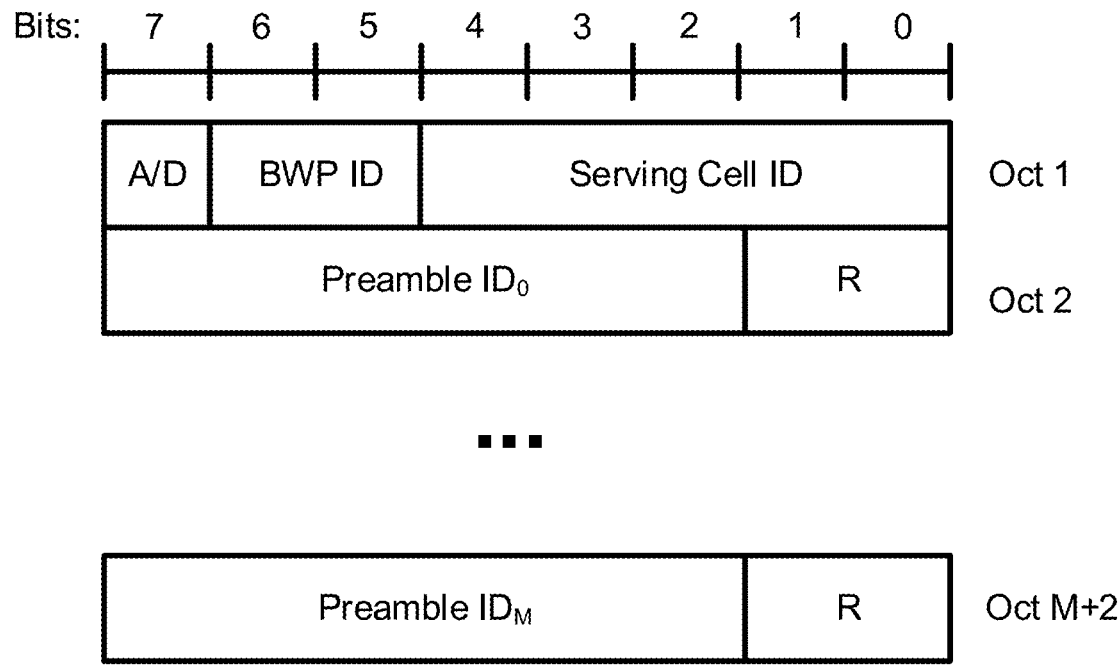
FIG. 31A and FIG. 31B show example MAC CE designs for downlink beam failure recovery procedures.
Figure 31B:
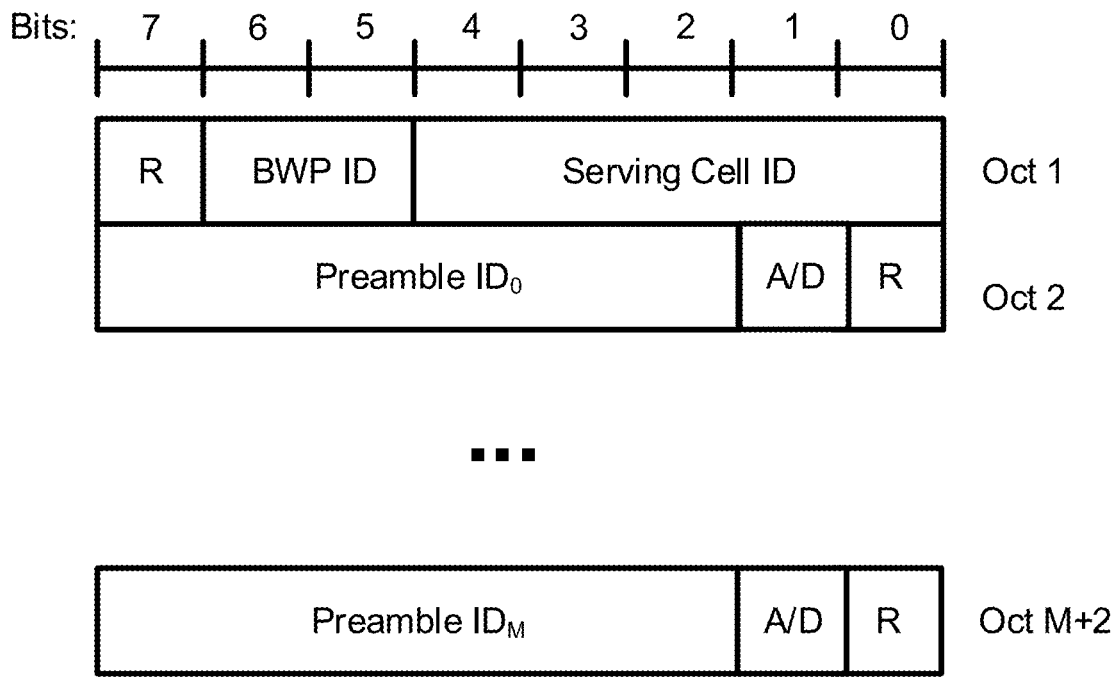

FIG. 31A and FIG. 31B show examples of a BFR MAC CE. The BFR MAC CE may comprise one or more fields comprising at least one of a first field, a second field, a third field, a fourth field, and/or a fifth field. Of these fields, the fifth field (e.g., R field) in FIG. 31A and FIG. 31B may indicate a reserved bit. The R field may be set to zero (or one). The first through fourth fields are described below.

A base station may send (e.g., transmit) the BFR MAC CE to configure the beam failure recovery procedures of all wireless devices that may communicate with the base station via the PCell, and of all SCells that communicate with and/or are controlled by the base station. The BFR MAC CE is shown in two different formats shown in FIG. 31A and FIG. 31B as comprising numerous fields arranged in octets (e.g., units of 8 bits each). As shown, Octet 1 comprises a five-bit field Serving Cell ID and a two-bit field BWP ID. In the format of FIG. 31A, Octet I also comprises a one-bit field A/D, whereas in the format of FIG. 31B, Octet 1 instead comprises a one-bit reserved field R. Each of these fields of Octet 1 is explained below. Octets 2 through M+2 comprise a numbered sequence of six-bit fields Preamble ID_i, where i ranges from 0 to M. The Preamble IDs in Octets 2 through M+2 in the BFR MAC CE formats of FIG. 31A and FIG. 31B correspond to the random access preamble index shown in FIG. 28. Entries in the specified random access preamble index correspond to entries in the RS index having a same index value. A wireless device receiving a random access preamble may determine the corresponding BFR-RS-resource, for example, by mapping the random access preamble to an index value in the preamble index, and/or looking up the RS that corresponds to the index value in the RS index.

In the format of FIG. 31A, each Octet 2 through M+2 comprises a two-bit reserved field R in addition to the six-bit field Preamble ID_i. The six-bit field Preamble ID_i field may support indicating and/or identifying up to 64 unique preambles. The reserved field R may provide the capability for expansion to support up to an additional two bits added to the Preamble ID_i field to support a total of up to 256 Preamble ID's indicated and/or identified by an eight-bit Preamble ID_i field. All of the Preamble ID's specified in Octets 2 through M+2 may designate candidate beams may be activated for the BWP ID and Serving Cell ID specified in Octet 1, for example, if the A/D field of Octet 1 is set to designate activation of the specified candidate beams (e.g., by a value of "1"). All of the Preamble ID's specified in Octets 2 through M+2 designate candidate beams may be deactivated for the BWP ID and Serving Cell ID specified in Octet 1, for example, if the A/D field of Octet 1 is set to designate deactivation of the specified candidate beams (e.g., by a value of "0"). Any quantity of Preamble IDs corresponding to designated beams may be provided in Octets 2 through M+2 for a particular BWP ID and Serving Cell ID.

In the format of FIG. 31B, each Octet 2 through M+2 comprises a one-bit reserved field R in addition to the six-bit field Preamble ID_i. The six-bit field Preamble ID_i field may support indicating and/or identifying up to 64 unique preambles. The reserved field R may provide the capability for expansion to support up to an additional one bit added to the Preamble ID_i field to support a total of up to 128 Preamble ID's indicated and/or identified by a seven-bit Preamble ID_i field. Each of the Preamble ID's specified in Octets 2 through M+2 may designate a candidate beam that is to be either activated or deactivated for the BWP ID and Serving Cell ID specified in Octet 1, for example, according to a value of the A/D field of the Octet that includes the Preamble ID. The A/D field in a same Octet as Preamble ID_0 may be set to designate activation of the candidate beam corresponding to the Preamble ID_0 (e.g., by a value of "1"). The A/D field in a same Octet as Preamble ID_1 may be set to designate deactivation of the candidate beam corresponding to the Preamble ID_1 (e.g., by a value of "0"). Each of the Preamble IDs specified in Octets 2 through M+2 may designate candidate beams that are to be either activated or deactivated for the BWP ID and Serving Cell ID specified in Octet 1, for example, according to a value of their respective corresponding A/D fields with which the Preamble IDs share an Octet. Any number of Preamble IDs corresponding to designated beams may be provided in Octets 2 through M+2 for a particular BWP ID and Serving Cell ID.

Each BFR MAC CE, based on the included fields, may indicate and/or specify a subset of BFR-RS-resources, among the pool of BFR-RS-resources that may be shared among all SCells associated with the base station's PCell. Members of the indicated and/or specified subset may be collectively activated or deactivated for use by a particular BWP that is indicated and/or specified by the field BWP ID for a particular SCell indicated and/or specified by the field Serving Cell ID, for example, according to a value of the A/D bit field in Octet 1, in the format shown in FIG. 31A. Members of the specified subset may be individually activated and/or deactivated for use by a particular BWP that is indicated and/or specified by the field BWP ID for a particular SCell indicated and/or specified by the field Serving Cell ID, for example, according to a value of the A/D bit field in the Octet shared with a respective Preamble ID, in the format shown in FIG. 31B.

There may be up to 31 SCells associated with a single PCell, four BWPs associated with each of the 31 SCells, and 64 Preamble IDs corresponding to candidate beams that may be in a pool of candidate beams shared by all the SCells, based on a quantity of bits allocated to the different fields. A quantity of BWPs, SCells, and/or candidate beams shown and described is an example and should not be construed as limiting. A quantity of bits in the BWP ID and/or Serving Cell ID fields may be changed (e.g., increased or decreased) to support different quantities of BWPs and/or SCells. The reserved bit R in Octet 1 of FIG. 31A may be allocated, for example, to the BWP ID or the Serving Cell ID, to increase the respective field's addressable range.

A base station may send (e.g., transmit) four BFR MAC CEs as shown in FIG. 31A or FIG. 31B for each SCell, for example, to activate a unique set of candidate beams for a BFR procedure for each of the BWPs in each of the SCells according to the M+1 specified Preamble IDs in Octets 2 through M+2. While the pool of BFR-RS-resources may be shared among all the cells, the BFR MAC CE orthogonally may allocate the BFR-RS-resources to the individual BWPs of all the SCells associated with the base station that sends (e.g., transmits) the BFR MAC CEs. If the base station determines to collectively activate and/or deactivate one or more particular candidate beams for use by a particular BWP of a particular SCell, the base station may send (e.g., transmit) the BFR MAC CE shown in FIG. 31A, for example, including the Preamble IDs corresponding to the candidate beams having a same desired activation/deactivation status. If the base station determines to individually activate and/or deactivate one or more particular candidate beams for use by a particular BWP of a particular SCell, the base station may send (e.g., transmit) the BFR MAC CE shown in FIG. 31B, for example, including the Preamble IDs corresponding to the candidate beams having a desired new activation/deactivation status. A designation of or change in a single candidate beam activation/deactivation status may require less transmission power and/or processing power than an initial specification of the activation/deactivation status of all the potential candidate beams if using the BFR MAC CE formats shown in FIG. 31A and FIG. 31B. If some candidate beams are to be activated while other candidate beams are to be deactivated for a particular BWP ID and a particular Serving Cell ID, using the BFR MAC CE format of FIG. 31B instead of FIG. 31A may reduce the number of BFR MAC CEs to be generated and transmitted, and consequently, may reduce transmission overhead and/or power consumption, because a single BFR MAC CE may both activate and deactivate individual candidate beams associated with the specified Preamble IDs.

The first field may indicate an identity of a serving cell (e.g., Serving Cell ID). The BFR MAC CE may apply for the serving cell based on the first field indicating the identity of the serving cell. A first length of the first field may correspond to a first value (e.g., 5 bits).

The second field may indicate a BWP index (e.g., BWP ID) of a BWP (e.g., downlink BWP). The BFR MAC CE may apply for the BWP, for example, based on or in response to the second field indicating the BWP index of the BWP. A second length of the second field may correspond to a second value (e.g., 2 bits).

The third field may indicate one or more preamble indices (e.g., Preamble ID_0, . . . Preamble ID_M shown in FIG. 31A) associated with the one or more BFR-RS resources (e.g., BFR-RS-resource 0, . . . , BFR-RS-resource M shown in FIG. 28). Each of the one or more preamble indices may indicate a preamble index associated with one of the one or more BFR-RS resources.

Preamble ID_0 may indicate the BFR-RS-resource 0 and Preamble ID_M may indicate the BFR-RS-resource M. A third length of the third field may correspond to a third value (e.g., (M+1)*6 bits, where M+1 is the number of BFR-RS resources).

The fourth field (e.g., A/D) may indicate whether the BFR MAC CE is used to activate and/or deactivate the one or more BFR-RS resources associated with the one or more preamble indices. Setting the fourth field to "1" may indicate activation of the one or more BFR-RS resources associated with the one or more preamble indices, as shown in FIG. 31A. Setting the fourth field to "0" may indicate deactivation the one or more BFR-RS resources associated with the one or more preamble indices.

Setting the fourth field to "1" may indicate activation of one of the one or more BFR-RS resources associated with one of the one or more preamble indices, as shown in FIG. 31B. Setting the fourth field to "0" may indicate deactivation of the one of the one or more BFR-RS resources associated with the one of the one or more preamble indices. The wireless device may deactivate BFR-RS resource (e.g., BFR-RS resource 0 shown in FIG. 28) associated with the Preamble ID_0, for example, if the fourth field associated with Preamble ID_0 is zero. The wireless device may activate BFR-RS resource (e.g., BFR-RS resource M shown in FIG. 28) associated with the Preamble ID_M, for example, if the fourth field associated with Preamble ID_M is one.

Figure 32:
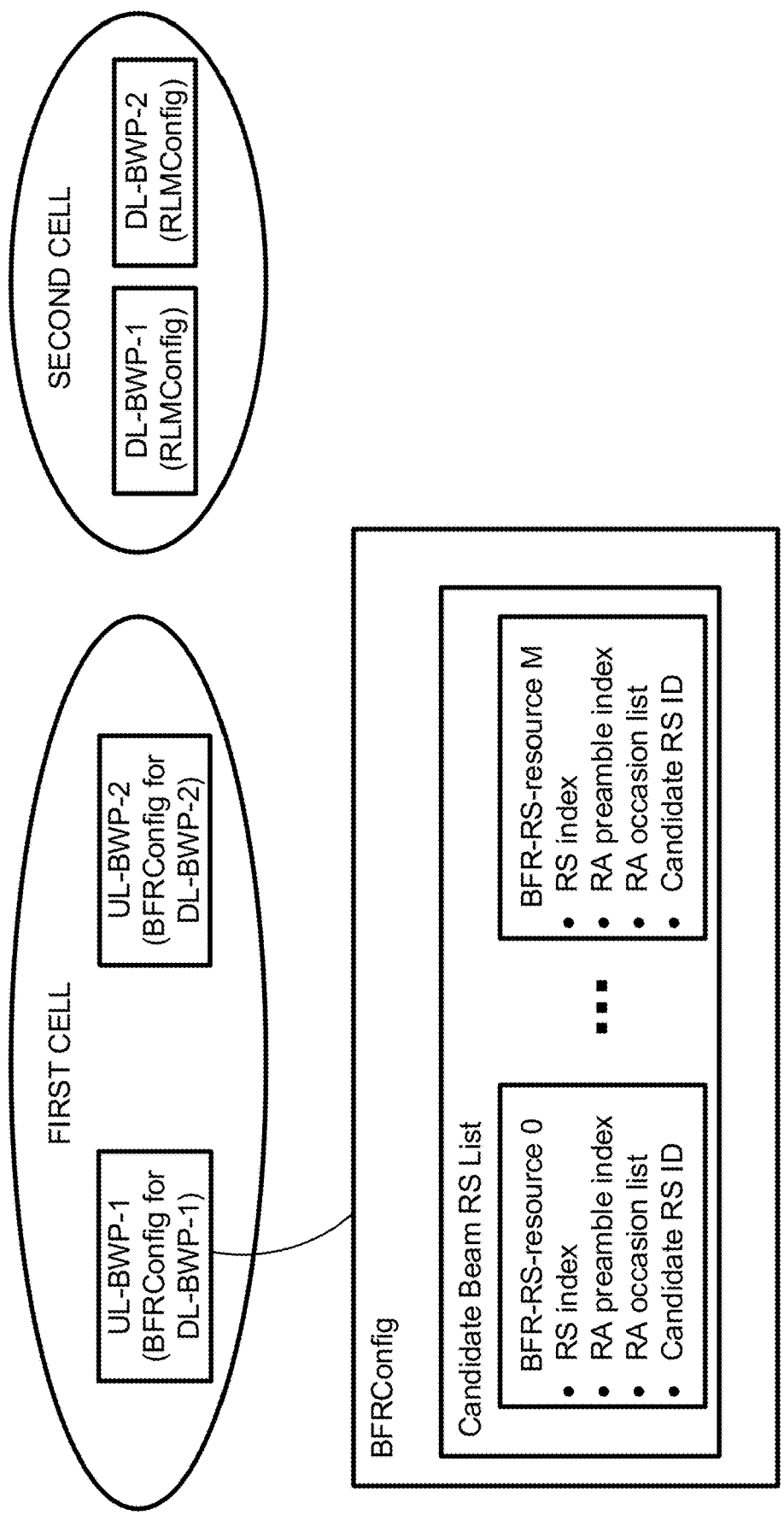
FIG. 32 shows an example of a resource configuration for a downlink beam failure recovery procedure.

FIG. 32 shows an example of a resource configuration for a downlink BFR procedure. The example of FIG. 32 is similar to the example of FIG. 28, and descriptions of features in FIG. 28 that are also shown in FIG. 32 may also be applicable to the example of FIG. 32. The candidate beam RS list may comprise one or more BFR-RS resources (e.g., BFR-RS resource 0, . . . , BFR-RS resource M). Each of the one or more BFR-RS resources may comprise an RS index (e.g., NZP-CSI-RS-ResourceId, SSB-index), at least one random access occasion (e.g., RA occasion list shown in FIG. 32), a preamble index (e.g., RA preamble index shown in FIG. 32), and/or a candidate RS index (e.g., candidate RS ID shown in FIG. 32).

The candidate RS index format in the example of FIG. 32 may provide additional capabilities beyond those provided in the example of FIG. 28. A quantity of candidate beams to be indexed may be reduced (e.g., from 256 to 64), for example, to reduce a number of bits allocated to indexing the candidate beams (e.g., from 8 bits to 6 bits) by adding the additional candidate RS index to the BFR-RS-resource.

Figure 33A:
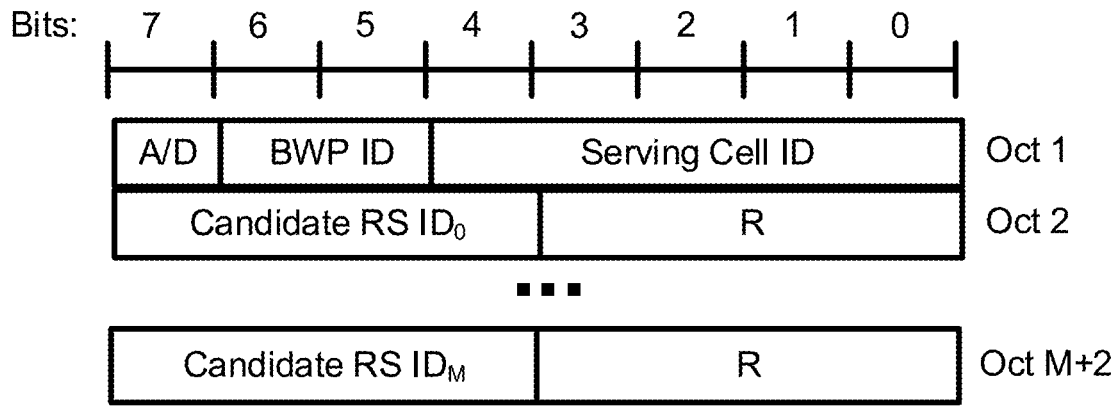
FIG. 33A, FIG. 33B, and FIG. 33C show example MAC CE designs for downlink beam failure recovery procedures.
Figure 33B:
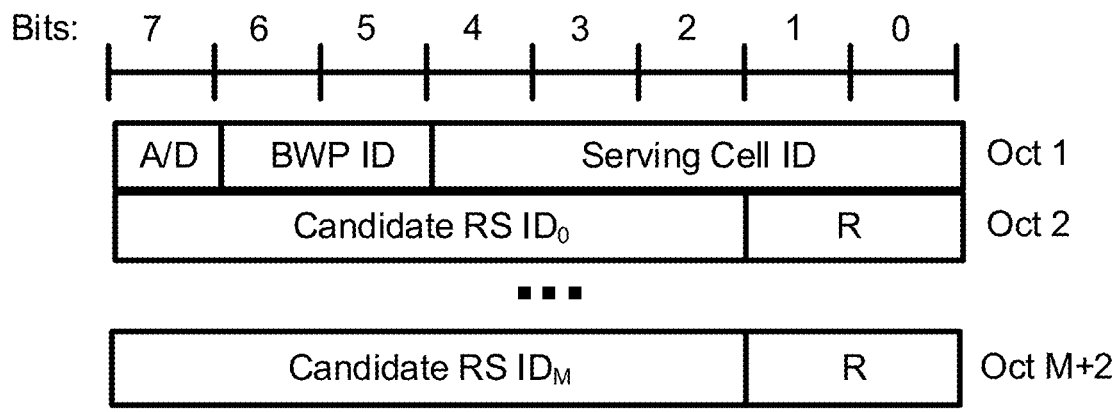

FIG. 33A and FIG. 33B show examples of a BFR MAC CE. The BFR MAC CE may comprise one or more fields comprising at least one of a first field, a second field, a third field, a fourth field, and/or a fifth field. Of these fields, the fifth field may indicate an R field. The R field may indicate a reserved bit. The R field may be set to zero (or one). The number of bits allocated to the R field may change from the quantity of bits shown to allocate a number of bits to another field sharing a same octet as the R field (e.g., the Candidate RS ID field). The first through fourth fields are described below.

The BFR MAC CE format shown in FIG. 33A and FIG. 33B may be similar to the BFR MAC CE format shown in FIG. 31A and described above, except, for example, that the format shown in FIG. 33A and FIG. 33B may include a candidate RS ID field in Octets 2 through M+2 in place of the preamble ID field included in Octets 2 through M+2 in the format shown in FIG. 31A. The descriptions of the fields of the BFR MAC CE format shown in FIG. 31A that are the same as the corresponding fields shown in FIG. 33A and FIG. 33B may be applicable to FIG. 33A and FIG. 33B. In the BFR MAC CE format shown in FIG. 33A, four bits may be allocated to the Candidate RS ID field and/or four bits may be allocated to the reserved R bit field sharing a same octet as the Candidate RS ID field. In the BFR MAC CE format shown in FIG. 33B, six bits may be allocated to the Candidate RS ID field and/or two bits may be allocated to the reserved R bit field sharing a same octet as the Candidate RS ID field. A total quantity of 16 candidate RS index values may be indicated and/or specified, based on four bits allocated to the Candidate RS ID field as shown in FIG. 33A. A total quantity of 64 candidate RS index values may be indicated and/or specified, for example, based on six bits allocated to the Candidate RS ID field as shown in FIG. 33B.

The first field may indicate an identity of a serving cell (e.g., Serving Cell ID). The BFR MAC CE may apply for the serving cell, for example, based on the first field indicating the identity of the serving cell. A length of the first field may correspond to a first value (e.g., 5 bits or any other quantity of bits).

The second field may indicate a BWP index (e.g., BWP ID) of a BWP (e.g., downlink BWP). The BFR MAC CE may apply for the BWP, for example, based on the second field indicating the BWP index of the BWP. A length of the second field may correspond to a second value (e.g., 2 bits or any other quantity of bits).

The third field may indicate one or more candidate RS indices (e.g., Candidate RS-ID_0, . . . , Candidate RS-ID_M shown in FIG. 33A) associated with the one or more BFR-RS resources (e.g., BFR-RS resource 0, . . . , BFR-RS resource M shown in FIG. 32). Each of the one or more candidate RS indices may indicate a candidate RS index associated with one of the one or more BFR-RS resources.

Candidate RS-ID_0 may indicate the BFR-RS-resource 0 and Candidate RS-ID_M may indicate the BFR-RS-resource M. A length of the third field may correspond to a third value (e.g., (M+1)*log_2(M+1) bits, where M+1 is the number of BFR-RS resources).

The fourth field (e.g., A/D) may indicate whether the BFR MAC CE is used to activate or deactivate the one or more BFR-RS resources indicated by the one or more RS indices. Setting the fourth field to "1" may indicate activation. Setting the fourth field to "0" may indicate deactivation.

Figure 33C:
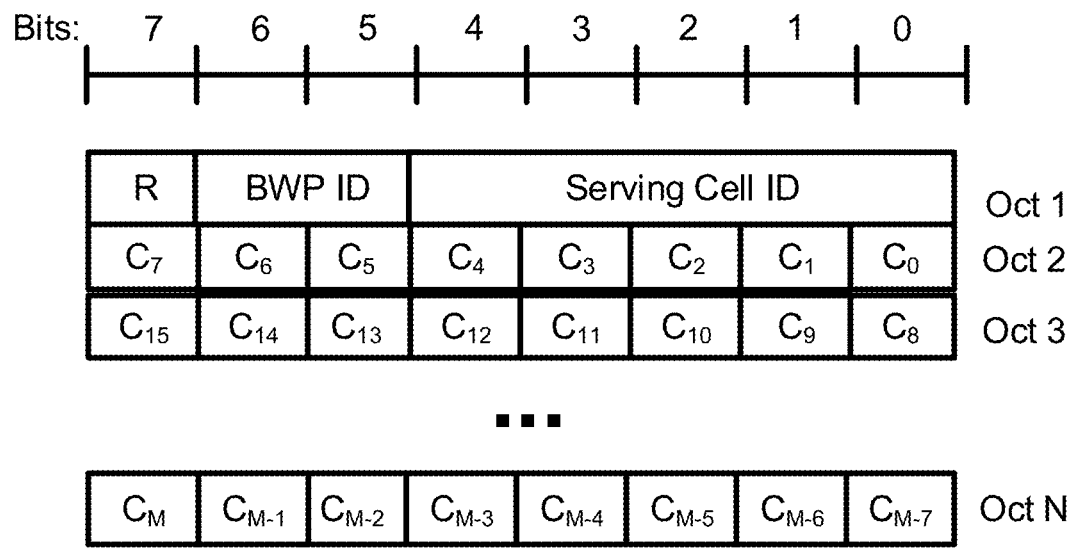

FIG. 33C shows an example of a BFR MAC CE. The BFR MAC CE may comprise one or more fields comprising at least one of a first field, a second field, a third field, and/or a fourth field. The first field (e.g., Serving Cell ID) and/or the second field (e.g., BWP ID) may be defined as discussed above in regard to FIG. 33A. The fourth field may indicate an R field. The R field may indicate a reserved bit. The R field may be set to zero (or one). The BFR MAC CE may include a bitmap in the third field (e.g., one or more C-fields as discussed below). A length of the third field may correspond to a third value (e.g., M+1 bits, where M+1 is the quantity of BFR-RS resources).

The format of the BFR MAC CE shown in FIG. 33C may be the same as the format of the BFR MAC CE shown and described with respect to FIG. 29B, except, for example, that the format shown in FIG. 33C may use the bitmap of C_i to C_M values in Octet 2 through Octet N to represent activation/deactivation status of the candidate beams corresponding to the mapped candidate RS index entries, whereas in FIG. 29B, the BFR MAC CE format may use the bitmap of C_i to C_M values in Octet 2 through Octet N to represent activation/deactivation status of the candidate beams corresponding to the mapped BFR-RS-resources.

The third field may comprise one or more C-fields (e.g., C_0, . . . , C_M shown in FIG. 33C). A C_i field of the one or more C-fields may indicate an activation and/or deactivation status of BFR-RS resource i (e.g., if configured) of the one or more BFR-RS resources (e.g., BFR-RS-resource 0, . . . , BFR-RS-resource M shown in FIG. 32). The BFR-RS resource i may be associated with a candidate RS index i. The BFR-RS-resource i associated with the candidate RS index i may be activated, if the C_i field is set to one. The BFR-RS resource i associated with a candidate RS index i may be deactivated, if the C_i field is set to zero.

The base station may configure M+1 BFR-RS-resources, for example, BFR-RS-resource 0 to BFR-RS-resource M as shown in FIG. 32. The wireless device may deactivate the BFR-RS-resource 0, for example, if the wireless device receives the BFR MAC CE with C_0 field set to zero. The wireless device may activate the BFR-RS-resource 0, for example, if the wireless device receives the BFR MAC CE with C_0 field set to one. The wireless device may deactivate the BFR-RS-resource M, for example, if the wireless device receives the BFR MAC CE with C_M field set to zero. The wireless device may activate the BFR-RS-resource M, for example, if the wireless device receives the BFR MAC CE with C_M field set to one. The base station may not configure BFR-RS-resource i associated with a candidate RS index i. The wireless device may ignore the C_i field, for example, based on the base station not configuring the BFR-RS resource i. C_0 may refer to the first BFR-RS resource configuration (e.g., BFR-RS resource 0) within the candidate beam RS list. C_1 may refer to the second BFR-RS resource configuration (e.g., BFR-RS resource 1) within the candidate beam RS list.

Figure 34:
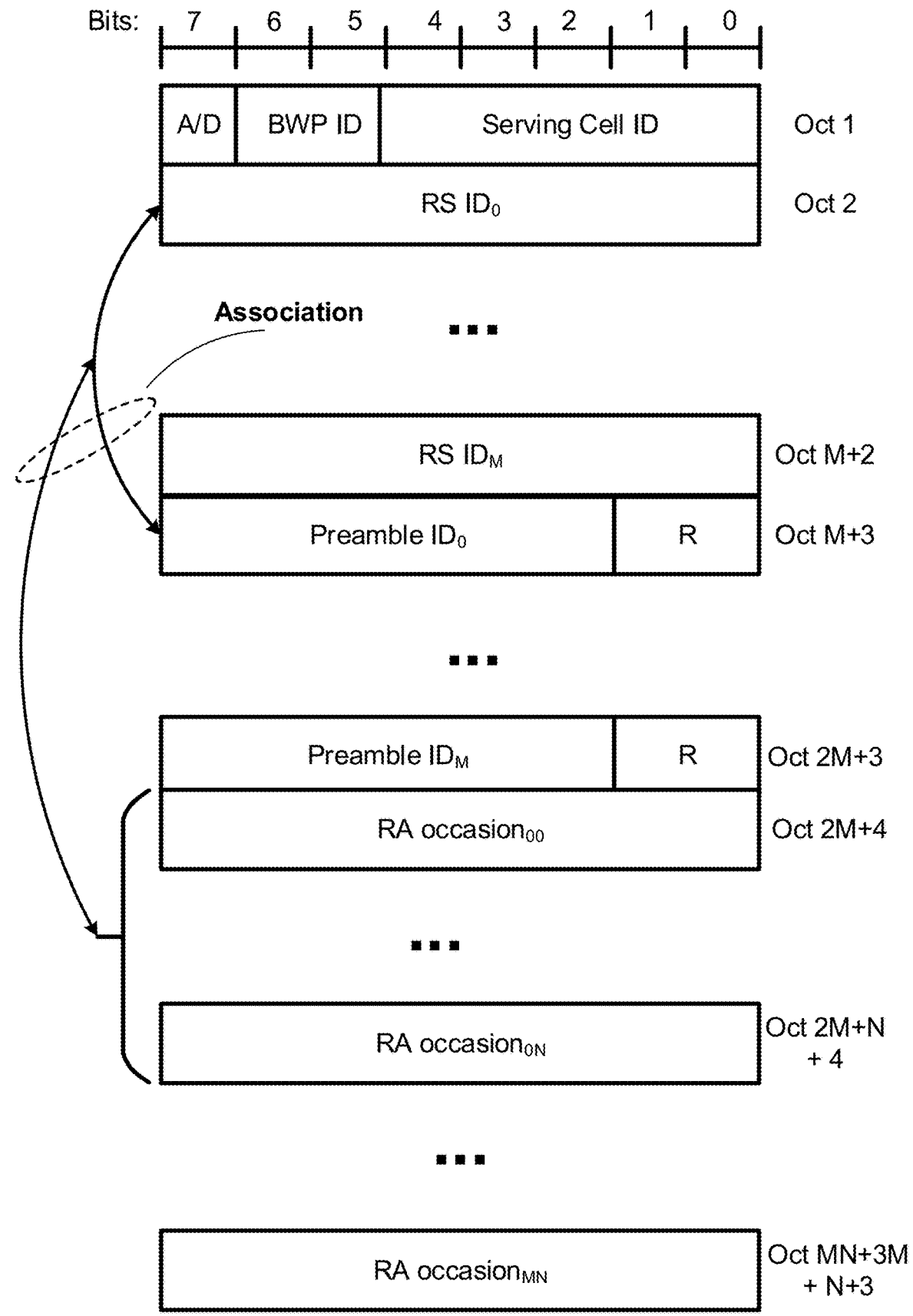
FIG. 34 shows an example of MAC CE design for downlink beam failure recovery procedure.

FIG. 34 shows an example of a BFR MAC CE. Octet 1 of the BFR MAC CE may include a Serving Cell ID field, a BWP ID field, and/or an A/D field, as previously discussed with respect to the BFR MAC CE formats shown in FIG. 29A, FIG. 31A, FIG. 33A, and FIG. 33B. Octets 2 through M+2 may include RS ID_i with i ranging from 0 to M, as previously discussed with respect to the BFR MAC CE formats shown in FIG. 29A. Octets M+3 through 2M+3 may include Preamble ID_i with i ranging from 0 to M, as previously discussed with respect to the BFR MAC CE formats shown in FIG. 31A. Octets M+3 through 2M+3 may include Preamble ID_i with i ranging from 0 to M, as previously discussed with respect to the BFR MAC CE formats shown in FIG. 31A. Octets 2M+4 through MN+3M+N+3 may include RA occasion_ij with i ranging from 0 to 0 and j ranging from 0 to M. Because the BFR MAC CE provides the RS ID, Preamble ID, and RA occasion data that make up the candidate beam RS list shown in FIG. 28, the wireless device may determine the candidate beam RS list from the BFR MAC CE format of FIG. 34, for example, if the base station does not provide configuration parameters via RRC to the wireless device. The RS ID values, RA preamble values, and/or RA occasion values may all be related to one another and provide sufficient information for the wireless device and/or the base station to determine the associated list of candidate beams.

A base station using the BFR MAC CE format of FIG. 34 may provide a benefit of both configuring the full list of candidate beams and activating selected candidate beams on each of a plurality of associated wireless devices, for example, without having previously transmitted RRC configuration parameters. At least because the size of the BFR MAC CE format of FIG. 34 may be very large compared to other BFR MAC CEs previously discussed herein, the BFR MAC CE may have a relatively large processing requirement, and/or may not be used frequently. The BFR MAC CE format of FIG. 34 may be well-suited for examples in which configuration of BFR for SCells may not be used.

The configuration parameters (e.g., RRC) for a first cell (e.g., PCell) and/or one or more secondary cells (e.g., SCell) may not provide the wireless device with a candidate beam RS list (e.g., configured on the UL-BWP-1 shown in FIG. 28). The first UL-BWP-specific BFR configuration parameters configured on the UL-BWP-1 (e.g., BFRConfig for DL-BWP-1) may not comprise a first candidate beam RS list (e.g., Candidate Beam RS List) associated with the DL-BWP-1 of the second cell.

The BFR-MAC CE shown in FIG. 34 may provide the wireless device with the candidate beam RS list (e.g., configured on the UL-BWP-1 shown in FIG. 28). The candidate beam RS list may comprise one or more BFR-RS resources (e.g., BFR-RS-resource 0, . . . , BFR-RS-resource M shown in FIG. 28). Each of the one or more BFR-RS resources may comprise an RS index (e.g., NZP-CSI-RS-ResourceId, SSB-index), at least one random access occasion (e.g., RA occasion list shown in FIG. 28), and/or a preamble index (e.g., RA preamble index shown in FIG. 28). The BFR MAC CE may comprise one or more fields comprising at least one of a first field, a second field, a third field, a fourth field, a fifth field, a sixth field, and/or a seventh field. Of these fields, the seventh field may indicate an R field. The R field may indicate a reserved bit. The R field may be set to zero (or one). A bit-length of the R field may be changed to facilitate a change in the bit-length of another field sharing a same octet as the R field. The first through sixth fields are discussed below.

The first field may indicate an identity of a serving cell (e.g., Serving Cell ID). The BFR MAC CE may apply for the serving cell, for example, based on the first field indicating the identity of the serving cell. A length of the first field may correspond to a first value (e.g., 5 bits or any other quantity of bits).

The second field may indicate a BWP index (e.g., BWP ID) of a BWP (e.g., downlink BWP). The BFR MAC CE may apply for the BWP, for example, based on the second field indicating the BWP index of the BWP. A length of the second field may correspond to a second value (e.g., 2 bits or any other quantity of bits).

The third field may indicate one or more RS indices (e.g., RS-ID_0, ..., RS-ID_M shown in FIG. 34) associated with the one or more BFR-RS resources (e.g., BFR-RS-resource 0, ..., BFR-RS-resource M shown in FIG. 28). Each of the one or more RS indices may indicate an RS index associated with one of the one or more BFR-RS resources. RS-ID_0 may indicate the BFR-RS-resource 0 and RS-ID_M may indicate the BFR-RS-resource M. A length of the third field may be a third value (e.g., (M+1)*8 bits, where M+1 is the number of BFR-RS resources).

The fourth field may indicate one or more preamble indices (e.g., Preamble ID_0, ..., Preamble ID_M shown in FIG. 34) associated with the one or more BFR-RS resources (e.g., BFR-RS-resource 0, ..., BFR-RS-resource M shown in FIG. 28). Each of the one or more preamble indices may indicate a preamble index associated with one of the one or more BFR-RS resources. Preamble ID_0 may indicate the BFR-RS-resource 0 and Preamble ID_M may indicate the BFR-RS-resource M. A length of the third field may be a third value (e.g., (M+1)*6 bits, where M+1 is the number of BFR-RS resources).

The fifth field may indicate one or more random access occasions (e.g., RA occasion_00, RA occasion_0N ..., RA occasion_MN shown in FIG. 34) associated with the one or more BFR-RS resources (e.g., BFR-RS-resource 0, ..., BFR-RS-resource M shown in FIG. 28). RA occasion_00 to RA occasion_0N may indicate the BFR-RS-resource 0. RA occasion_M0 to RA occasion_MN may indicate the BFR-RS-resource M. A length of the fifth field may correspond to a fifth value (e.g., (M+1)*(N+1)*9 bits, where M+1 is the number of BFR-RS resources and N+1 is the number of random access occasions per candidate beam).

RS-ID_0, Preamble ID_0, and RA occasion_00 to RA occasion_0N may be associated, as shown in FIG. 34. One of the one or more BFR-RS resources (e.g., BFR-RS-resource 0) may comprise the RS-ID_0, the Preamble ID_0, and the RA occasion_00 to the RA occasion_0N. RS-ID_M, Preamble ID_M, and RA occasion_M0 to RA occasion_MN may be associated, as shown in FIG. 34. One of the one or more BFR-RS resources (e.g., BFR-RS-resource M) may comprise the RS-ID_M, the Preamble ID_M, and the RA occasion_M0 to the RA occasion_MN.

The sixth field (e.g., A/D) may indicate whether the BFR MAC CE is used to activate or deactivate the one or more BFR-RS resources indicated by at least one of the fields (e.g., the third field, the fourth field, the fifth field, etc.). Setting the sixth field to "1" may indicate activation. Setting the sixth field to "0" may indicate deactivation.

Figure 35:
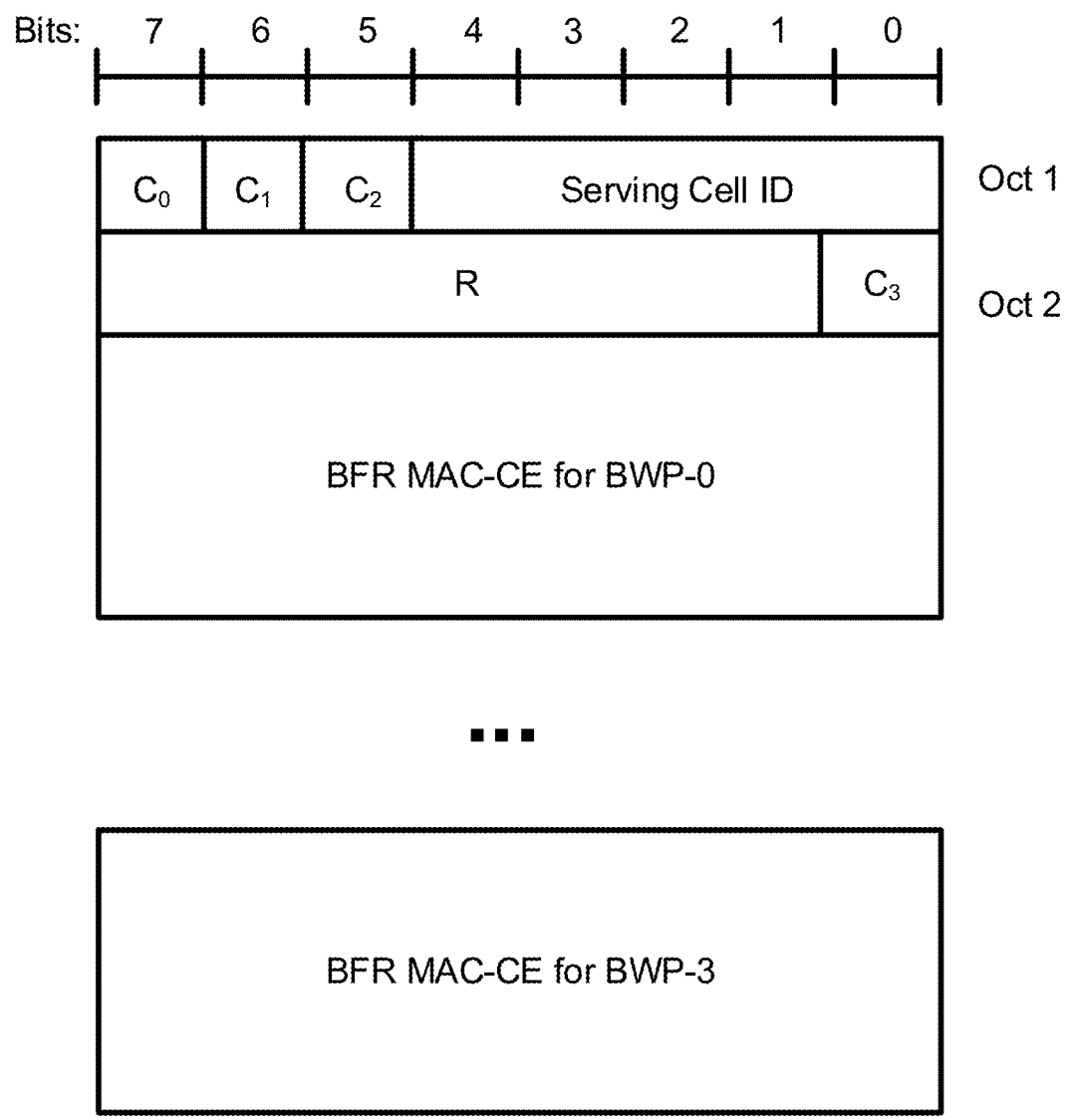
FIG. 35 shows an example of MAC CE design for downlink beam failure recovery procedure.

FIG. 35 shows an example of a BFR MAC CE. A base station may send (e.g., transmit) the BFR MAC CE to configure the beam failure recovery procedures of wireless devices that communicate with the base station via the PCell, and/or to configure SCells that communicate with and/or are controlled by the base station. The BFR MAC CE format shown in FIG. 35 may differ from the BFR MAC CE formats shown in FIG. 29A, FIG. 29B, FIG. 31A, FIG. 31B, FIG. 33A, FIG. 33B, FIG. 33C, and FIG. 34 in that the BFR MAC CE of FIG. 35 may configure the candidate beams for a BFR procedure of multiple or all BWPs of a cell identified in a Serving Cell ID field in Octet 1 of the single BFR MAC CE. The base station may send (e.g., transmit) a single BFR MAC CE as shown in FIG. 35 to do the work of multiple (e.g., four) different BFR MAC CE transmissions using the BFR MAC CE formats discussed above. A base station using the BFR MAC CE format of FIG. 35 may reduce transmission overhead and/or power consumption compared to using the other BFR MAC CE formats discussed above.

The BFR MAC CE of FIG. 35 is shown as comprising numerous fields arranged in octets (e.g., units of 8 bits each). Octet 1 comprises a five-bit field Serving Cell ID and a portion of a bitmap of C_i configuration bits for i ranging from 0 to 3, with each C_i designating whether a BFR MAC CE payload may be included in the BFR MAC CE for a corresponding BWP of four BWPs of the cell designated in the Serving Cell ID field. The bitmap of C_i configuration bits may be split between Octet 1 and Octet 2, or completely included in one of the Octet 1 or Octet 2 by changing a location and/or number of bits designated for the reserved field R and depending on a number of BWPs are included in a cell. The bitmap of C_i fields to BWPs of the cell may be one-to-one, such that there is one C_i entry for each of the BWPs in a cell. Four C_i fields may correspond to the four BWPs of the cell indicated and/or identified in the Serving Cell ID field. Each C_i bit may designate whether a BFR MAC CE payload included in the full BFR MAC CE is to be applied to the corresponding BWP of the cell indicated and/or identified by the Serving Cell ID field. A C_i value of "1" may designate that the BFR MAC CE payload is to be applied to the corresponding BWP, and/or a C_i value of "0" may designate that the BFR MAC CE payload is not to be applied to the corresponding BWP.

Following Octet 2, a series of BFR MAC CE payloads for each of the BWP's of the cell identified by the Serving Cell ID field may be included. A total length of the BFR MAC CE format of FIG. 35 may be reduced by only including, following Octet 2, a series of BFR MAC CE payloads corresponding to each of the C_i bits that indicated that a BFR MAC CE payload is to be applied to the corresponding BWP of the cell identified by the Serving Cell ID field. The BFR MAC CE payload may be defined according to any of the BFR MAC CE formats described above in FIG. 29A, FIG. 29B, FIG. 31A, FIG. 31B, FIG. 33A, FIG. 33B, FIG. 33C, or FIG. 34, except, for example, that the BFR MAC CE payload may not include a field designating the BWP to which the payload applies, because that information may be provided by the C_i bitmap of the full BFR MAC CE. The BFR MAC CE may comprise one or more fields comprising at least one of a first field, a second field, a third field, and/or a fourth field, as described in greater detail below.

The first field may indicate an identity of a serving cell (e.g., Serving Cell ID). The BFR MAC CE may apply for the serving cell, for example, based on or in response to the first field indicating the identity of the serving cell. A first length of the first field may correspond to a first value (e.g., 5 bits or any quantity of bits).

The second field may indicate one or more C-fields (e.g., C_0, ..., C_3 shown in FIG. 35). A C_i field of the one or more C-fields may be associated with a BWP indicated and/or identified with a BWP index i (e.g., BWP-ID is equal to i). The C_i field may indicate an activation and/or deactivation status of a BFR MAC CE for the BWP.

The BFR MAC CE may be one of the MAC CEs discussed above in regard to FIG. 29A, FIG. 29B, FIG. 31A, FIG. 31B, FIG. 33A, FIG. 33B, FIG. 33C, and FIG. 34. The wireless device may activate one or more BFR-RS resources indicated by BFR MAC CE, if the C_i field is set to one. The BFR MAC CE may apply for the BWP with the BWP index i (e.g., BFR MAC CE for BWP-i shown in FIG. 35). The wireless device may deactivate one or more BFR-RS resources indicated by BFR MAC CE, for example, if the C_i field is set to zero. The BFR MAC CE may apply for the BWP with the BWP index i.

Figure 36:
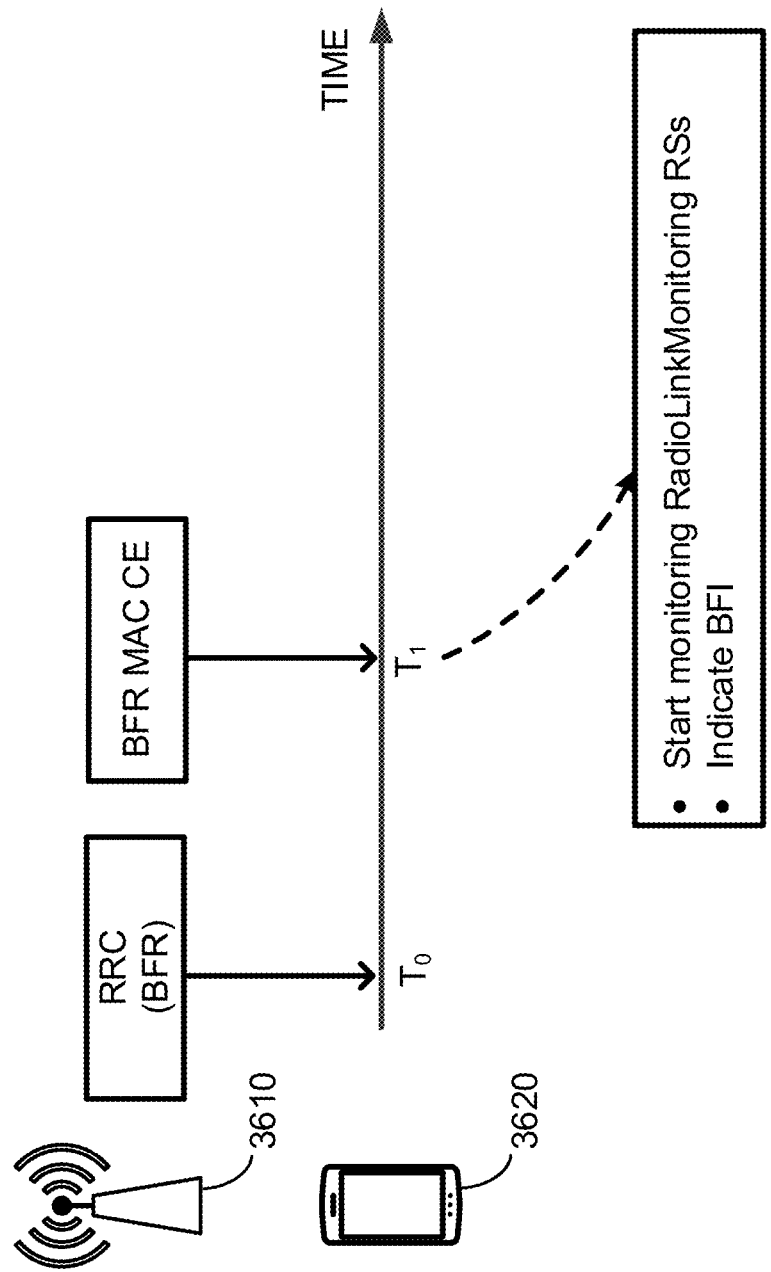
FIG. 36 shows an example of a downlink beam failure recovery procedure.

FIG. 36 shows an example of a downlink BFR procedure. A base station 3610 may send (e.g., transmit) to a wireless device 3620, and the wireless device 3620 may receive from the base station 3610, one or more RRC messages comprising the configuration parameters for a first cell (e.g., PCell) and one or more secondary cells (e.g., SCell) at time T0, as discussed above in regard to FIG. 30. The wireless device 3620 may operate on at least one of the second plurality of DL BWPs (e.g., DL-BWP-1). The at least one of the second plurality of DL BWPs may be an active DL BWP of the second cell.

A wireless device 3620 (e.g., via the physical layer) may start assessing a radio link quality according to the one or more RSs (e.g., RadioLinkMonitoringRS) associated with the at least one of the second plurality of DL BWPs (e.g., DL-BWP-1) against the first threshold (e.g., rlmInSyncOutOfSyncThreshold), for example, based on receiving the BFR MAC CE activating one or more BFR-RS resources at time T1. The wireless device 3620 (e.g., via the physical layer) may start assessing a radio link quality according to the one or more RSs (e.g., RadioLinkMonitoringRS) associated with the at least one of the second plurality of DL BWPs (e.g., DL-BWP-1) against the first threshold (e.g., rlmInSyncOutOfSyncThreshold), for example, if there are no activated BFR-RS resources for the at least one of the second plurality of DL BWPs, and/or based on receiving the BFR MAC CE activating one or more BFR-RS resources. Starting assessing the radio link quality in response to receiving the BFR MAC CE may save power for the wireless device 3620.

The wireless device 3620 may not receive the BFR MAC CE activating at least one of the one or more BFR-RS resources for the at least one of the second plurality of DL BWPs (e.g., before time T1 shown in FIG. 36). The wireless device 3620 may not assess a radio link quality according to the one or more RSs (e.g., RadioLinkMonitoringRS) associated with the at least one of the second plurality of DL BWPs (e.g., between time T0 and time T1 shown in FIG. 36), for example, based on not receiving the BFR MAC CE. The wireless device 3620 may not assess a radio link quality according to the one or more RSs (e.g., RadioLinkMonitoringRS) associated with the at least one of the second plurality of DL BWPs before being activated by the BFR MAC CE (e.g., time T1 shown in FIG. 36). The wireless device 3620 (e.g., via the physical layer) may start assessing a radio link quality according to the one or more RSs (e.g., RadioLinkMonitoringRS) associated with the at least one of the second plurality of DL BWPs (e.g., DL-BWP-1) against the first threshold (e.g., rlmInSyncOutOfSyncThreshold).

The wireless device 3620 (e.g., via the physical layer) may provide a beam failure instance (BFI) indication to higher layer entities (e.g. MAC entity), for example, if the radio link quality of the one or more RSs is worse (e.g., higher BLER, lower L1-RSRP, lower SINR) than the first threshold. The wireless device 3620 may increment a BFI counter (e.g., BFI_COUNTER) by one (e.g., at time T, 2T, 5T as shown in FIG. 26), for example, if the higher layer entities (e.g. MAC entity) of the wireless device 3620 receives the BFI indication via the physical layer, for example, based on receiving the BFR MAC CE activating at least one of the one or more BFR-RS resources for the at least one of the second plurality of DL BWPs (e.g., time T1 shown in FIG. 36). The wireless device 3620 may increment the BFI counter (e.g., BFI_COUNTER) by one (e.g., at time T, 2T, 5T as shown in FIG. 26), for example, if the higher layer entities (e.g. MAC entity) of the wireless device 3620 receive the BFI indication via the physical layer and/or if there are no activated BFR-RS resources for the at least one of the second plurality of DL BWPs, for example, based on receiving the BFR MAC CE activating at least one of the one or more BFR-RS resources for the at least one of the second plurality of DL BWPs (e.g., time T1 shown in FIG. 36).

The wireless device 3620 may not receive the BFR MAC CE activating at least one of the one or more BFR-RS resources for the at least one of the second plurality of DL BWPs (e.g., before time T1 shown in FIG. 36). The wireless device 3620 may not increment the BFI counter (e.g., BFI_COUNTER) by one based on not receiving the BFR MAC CE. The wireless device 3620 may not may increment the BFI counter (e.g., BFI_COUNTER) by one before being activated by the BFR MAC CE (e.g., between time T0 and time T1 shown in FIG. 36).

The wireless device 3620 may initiate a random access procedure for a beam failure recovery of the cell, for example, based on the BFI counter (e.g., BFI_COUNTER) being equal to or greater than a value (e.g., beamFailureInstanceMaxCount) and/or based on receiving the BFR MAC CE activating one or more BFR-RS resources (e.g., at time T1 shown in FIG. 36). The wireless device 3620 may initiate a random access procedure for a beam failure recovery of the cell based on the BFI counter (e.g., BFI_COUNTER) being equal to or greater than a value (e.g., beamFailureInstanceMaxCount) and/or based on receiving the BFR MAC CE activating one or more BFR-RS resources (e.g., at time T1 shown in FIG. 36), for example, if there are no activated BFR-RS resources for the at least one of the second plurality of DL BWP.

The wireless device 3620 may not receive the BFR MAC CE activating at least one of the one or more BFR-RS resources for the at least one of the second plurality of DL BWPs (e.g., before time T1 shown in FIG. 36). The wireless device may not initiate a random access procedure for a beam failure recovery of the cell based on not receiving the BFR MAC CE and/or based on the BFI counter (e.g., BFI_COUNTER) being equal to or greater than a value (e.g., beamFailureInstanceMaxCount). The wireless device 3620 may set the BFI counter (e.g., BFI_COUNTER) to zero (or another value), for example, based on receiving the BFR MAC CE activating one or more BFR-RS resources. The wireless device 3620 may set the BFI counter (e.g., BFI_COUNTER) to zero (or another value), for example, based on receiving the BFR MAC CE deactivating one or more BFR-RS resources.

A base station 3610 may configure a wireless device 3620 with one or more cells comprising a first cell (e.g., SCell). The base station 3610 may activate, hibernate, and/or deactivate the first cell. The base station 3610 may send (e.g., transmit), to the wireless device 3620, and the wireless device 3620 may receive, one or more MAC CE(s), for adjusting and/or transitioning of the first cell to a power saving state (e.g., dormant state, such as in FIG. 22). The wireless device 3620 may adjust and/or transition first the cell to a power saving state (e.g., dormant state) based on receiving the one or more MAC CE(s). The base station 3610 may send (e.g., transmit) one or more RRC messages comprising parameters. The parameters may indicate an sCell state indicator (e.g., sCellState) associated with the cell. The sCell state indicator may be set to a power saving state (e.g., a dormant state). The wireless device 3620 may adjust and/or transition the cell to the power saving state, for example, based on the SCell state indicator being set to the power saving state.

An SCell hibernation timer (e.g., sCellHibernationTimer) associated with the first cell may expire. The wireless device 3620 may adjust and/or transition the first cell to a power saving state (e.g., a dormant state, such as in FIG. 23), for example, based on the SCell hibernation timer expiring. The wireless device 3620 may not monitor PDCCH on the cell, for example, if the cell is in a power saving state (e.g., a dormant state). The wireless device 3620 may not monitor PDCCH for the cell, for example, if the cell is in a power saving state (e.g., a dormant state). The wireless device 3620 may (re-)start a power saving and/or dormant SCell deactivation timer (e.g., dormantSCellDeactivationTimer) of the first cell based on transiting the cell into the power saving state (e.g., dormant state).

Figure 37:
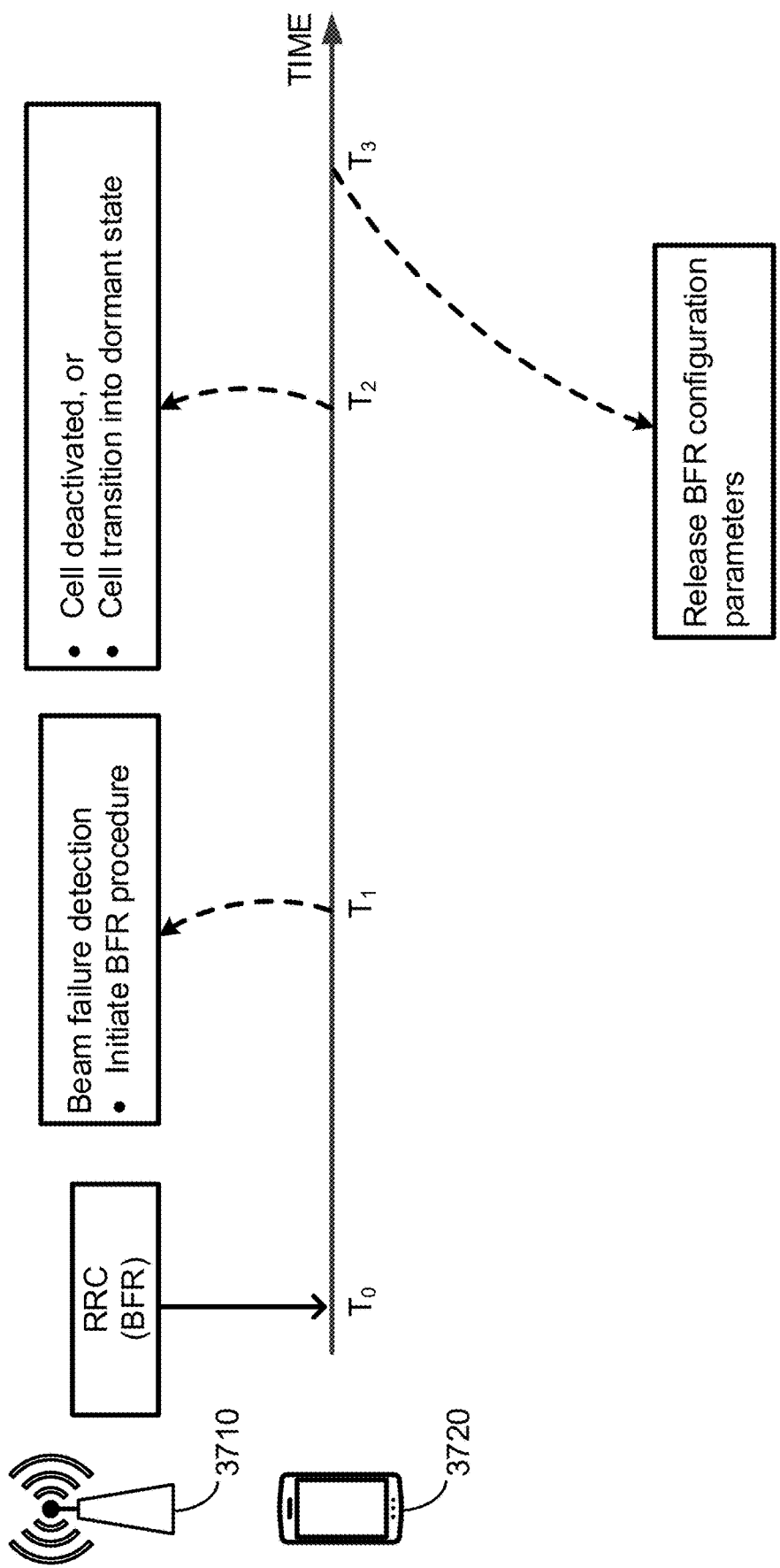
FIG. 37 shows an example of a downlink beam failure recovery procedure.

FIG. 37 shows an example of a downlink beam failure recovery procedure. A base station 3710 may send (e.g., transmit) to a wireless device 3720, and the wireless device 3720 may receive from the base station 3710, one or more RRC messages comprising the configuration parameters for a first cell (e.g., PCell) and one or more secondary cells (e.g., SCell) at time T0, such as discussed above in regard to FIG. 30. The wireless device 3720 may not perform a BFR procedure for a channel controlled by a cell that is in a power saving state (e.g., a dormant state). The wireless device 3720 may not monitor the channel controlled by a cell that is in a power saving state (e.g., a dormant state) for a beam failure. The wireless device 3720 may not utilize configured BFR resources for channels controlled by cells that are in a power saving state (e.g., a dormant state), and configured BFR resources that are not utilized may be inactive. The wireless device 3720 may proactively and/or autonomously release back to the base station any configured BFR resources corresponding to a cell that is in a power saving state (e.g., a dormant state). The base station 3710 may reassign released BFR resources, that may have previously been assigned to a cell that is in a power saving state (e.g., a dormant state), to another cell. The base station 3710 may not send (e.g., transmit) a BFR MAC CE or an RRC to deactivate BFR resources that are assigned to a cell that is in a power saving state (e.g., a dormant state), for example, if the wireless device 3720 proactively releases, to the base station 3710, the BFR resources that were assigned to a cell that is in the power saving state. Unutilized BFR resources may be reallocated, which may increase overall resource utilization efficiency. Transmission overhead for the base station 3710 may be reduced by the wireless device 3720 proactively releasing the unutilized BFR resources to the base station 3710.

The wireless device 3720 may be configured with the first higher layer parameter, the second layer parameter, and/or the third layer parameter (e.g., at time T0 shown in FIG. 37) for a cell (e.g., SCell, BWP). The wireless device 3720 may initiate a random access procedure for a beam failure recovery of the cell, for example, based on or in response to a BFI counter (e.g., BFI_COUNTER) being equal to or greater than a value (e.g., beamFailureInstanceMaxCount), for example, at time T1 shown in FIG. 37.

The wireless device 3720 may adjust and/or transition the cell to a power saving state (e.g., a dormant state), for example, at time T2 shown in FIG. 37. The wireless device 3720 may be triggered to adjusted and/or transition the cell based on an SCell hibernation timer associated with the cell expiring (e.g., as shown in FIG. 23). The wireless device 3720 may be triggered to adjust and/or transition the cell, based on receiving one or more MAC CE(s) from the base station 3710, to the power saving state (e.g., dormant state) such as shown in FIG. 22. The wireless device 3720 may be triggered to adjust and/or transition the cell, for example, based on receiving one or more RRC messages comprising parameters from the base station 3710. The parameters may indicate an sCell state indicator set to a power saving state (e.g., a dormant state).

The wireless device 3720 may release at least one of the configuration parameters (e.g., candidate beam RS list, preambles, RA occasion list, etc.) for the beam failure recovery of the cell, based on the wireless device 3720 adjusting and/or transitioning the cell to a power saving state (e.g., a dormant state). The wireless device 3720 may release at least one of the UL-BWP-specific BFR configuration parameters (e.g., candidate beam RS list, preambles, RA occasion list, etc.) for the beam failure recovery of the cell, based on the wireless device 3720 adjusting and/or transitioning the cell to the power saving state (e.g., dormant state).

The wireless device 3720 may deactivate the cell (e.g., at time T2 shown in FIG. 37). The wireless device 3720 may be triggered to deactivate the cell based on an SCell deactivation timer associated with the cell expiring (e.g., as shown in FIG. 23). The wireless device 3720 may be triggered to deactivate the cell based on receiving one or more MAC CE(s) from the base station 3710, for adjusting and/or transitioning the cell to an inactive state (e.g., as shown in FIG. 22). The wireless device 3720 may be triggered to deactivate the cell based on receiving one or more RRC messages comprising parameters from the base station 3710. The parameters may indicate an SCell state indicator set to inactive (e.g., deactivated) state.

The wireless device 3720 may release at least one of the configuration parameters (e.g., candidate beam RS list, preambles, RA occasion list, etc.) for the beam failure recovery of the cell, for example, based on the wireless device 3720 deactivating the cell. The wireless device 3720 may release at least one of the UL-BWP-specific BFR configuration parameters (e.g., candidate beam RS list, preambles, RA occasion list, etc.) for the beam failure recovery of the cell, for example, based on the wireless device 3720 deactivating the cell.

Figure 38:
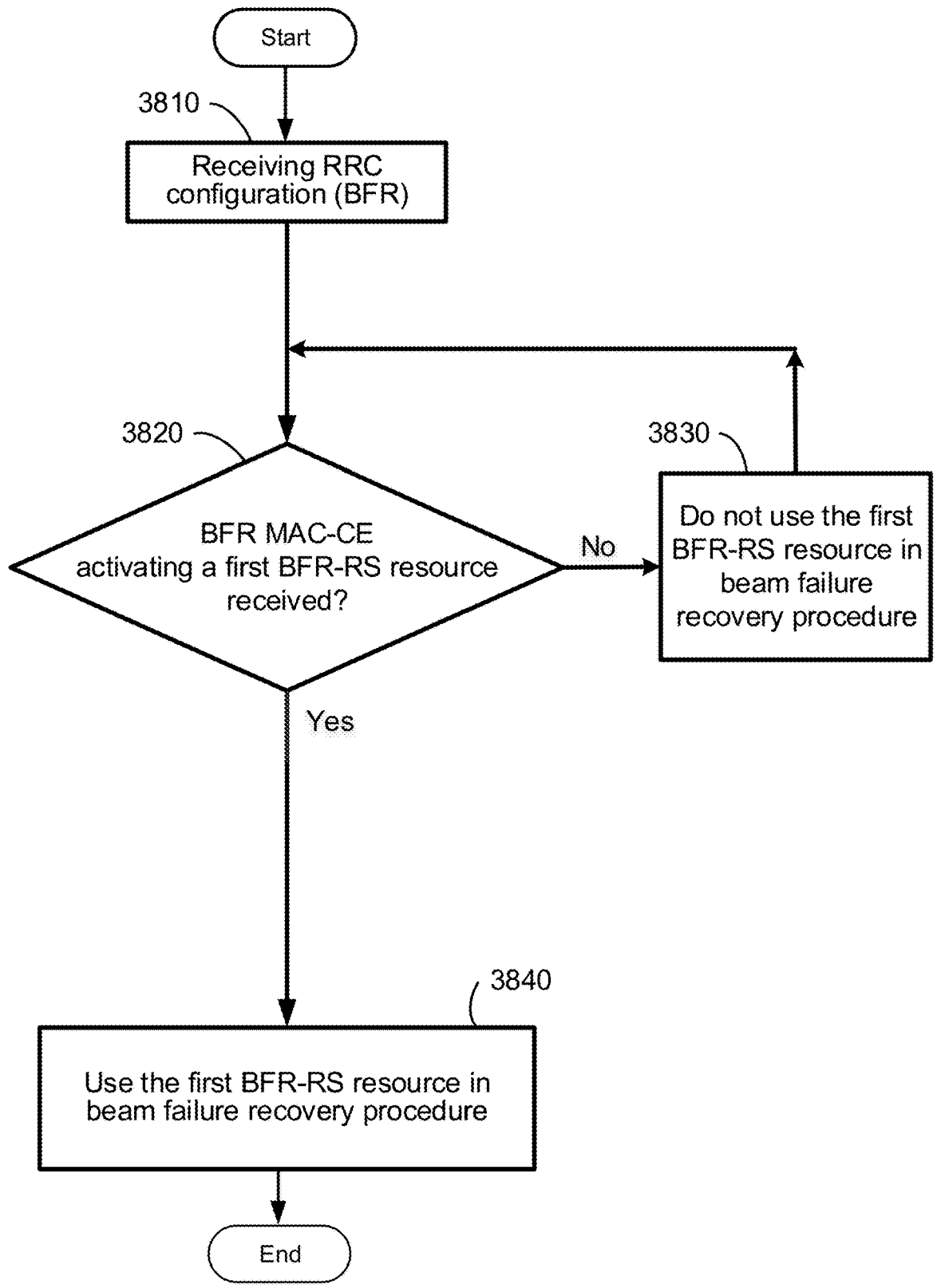
FIG. 38 shows an example flowchart of a downlink beam failure recovery procedure.

FIG. 38 shows an example flowchart of a downlink beam failure recovery procedure. At step 3810, a wireless device may receive, from a base station, one or more messages. The one or more messages may comprise one or more configuration parameters of a first cell and a second cell. The first cell may comprise a first plurality of uplink bandwidth parts (BWPs) comprising an uplink BWP. The second cell may comprise a second plurality of downlink BWPs comprising a downlink BWP.

The one or more configuration parameters may indicate one or more beam failure recovery reference signal (BFR-RS) resources for a beam failure recovery (BFR) of the downlink BWP of the secondary cell. The base station may configure the BFR-RS resources on the uplink BWP of the first cell. Each of the one or more BFR-RS resources may comprise at least one of: a reference signal (RS) index of a candidate beam, at least one random access occasion, and/or a preamble index.

At step 3820, the wireless device may check to see whether a beam failure recovery medium access control control element (BFR MAC CE) has been received. If the wireless device has not received a BFR MAC CE, then at step 3830, the wireless device may not perform a beam failure recovery procedure using the first BFR-RS resource. The wireless device may continue to check to see whether a BFR MAC CE has been received at step 3820 (e.g., repeating step 3820). If the wireless device has received a BFR MAC CE, then at step 3840, the wireless device may perform a beam failure recovery procedure using the first BFR-RS resource.

The BFR MAC CE may comprise one or more fields. The one or more fields may comprise a first field, a second field, a third field, and/or a fourth field. The first field may indicate the second cell. The second field may indicate the downlink BWP of the second cell. The third field may indicate a first BFR-RS resource of the one or more BFR-RS resources. The fourth field may indicate an activation of the first BFR-RS resource.

The first BFR-RS resource may comprise a first RS index, a first preamble index, and/or at least one random access occasion on the uplink BWP of the first cell. The first RS index may indicate a first RS (e.g., CSI-RS, SSB). The first preamble index may indicate a first preamble. The at least one random access occasion may comprise one or more time resources and/or one or more frequency resources.

The one or more configuration parameters may indicate one or more first reference signals (RSs) of the downlink BWP of the second cell, one or more second RSs of the downlink BWP of the second cell, and/or a maximum beam failure instance (BFI) count (e.g., beamFailureInstanceMaxCount) associated with the downlink BWP of the second cell. The one or more first RSs may comprise one or more first CSI-RSs and/or one or more first SS blocks. The one or more second RSs may comprise one or more second CSI-RSs and/or one or more second SS blocks. The first RS associated with the first BFR-RS resource may be one of the one or more secondary RSs. The one or more configuration parameters may indicate an association between each of the one or more second RSs and each of the one or more BFR-RS resources. A first RS of the one or more second RSs may be associated with a first BFR-RS resource of the one or more BFR-RS resources. A second RS of the one or more second RSs may be associated with a second BFR-RS resource of the one or more BFR-RS resources. The association may be one-to-one.

A wireless device (e.g., via a physical layer) may assess a first radio link quality (e.g., BLER, L1-RSRP) according to the one or more first RSs against a first threshold. The first threshold may be based on hypothetical BLER, LI-RSRP, RSRQ, or SINR. The first threshold may be indicated by the one or more configuration parameters. The wireless device (e.g., via the physical layer) may provide a beam failure instance (BFI) indication to a MAC entity of the wireless device, for example, if the first radio link quality is worse (e.g., higher BLER, lower SINR, lower LI-RSRP, etc.) than the first threshold.

The wireless device (e.g., a MAC entity of the wireless device) may increment a BFI counter (e.g., BFI_COUNTER) by one, based on the wireless device receiving the BFI indication via the physical layer. The BFI counter may be a variable used by the wireless device. The BFI counter may be a counter for a BFI indication. The BFI counter may be initially set to zero.

The wireless device may initiate a random access procedure for a BFR of the downlink BWP of the second cell, for example, based on the BFI counter being equal to or greater than the maximum BFI counter. The wireless device may assess a second radio link quality of the first RS of the first BFR-RS resource (e.g., if the wireless device initiates the random access procedure), for example, based on the BFR MAC CE indicating the activation of the first BFR-RS resource.

The wireless device may select the first RS as a candidate beam, for example, based on or in response to assessing that the second radio link quality of the first RS is better (e.g., higher L1-RSRP, lower BLER) than a second threshold. The second threshold may be based on hypothetical BLER, RSRP, RSRQ, or SINR. The second threshold may be indicated by the one or more configuration parameters. The wireless device may send (e.g., transmit) the first preamble via the at least one random access occasion of the uplink BWP of the first cell for the BFR of the downlink BWP of the secondary cell, for example, based on the wireless device selecting the first RS as the candidate beam. The wireless device may send (e.g., transmit) the first preamble via the at least one random access occasion of the uplink BWP of the first cell for the BFR of the downlink BWP of the secondary cell, for example, based on the wireless device selecting the first RS as the candidate beam and/or the BFR MAC CE indicating the activation of: the first preamble and/or the at least one random access occasion associated with the first BFR-RS resource.

Figure 39:
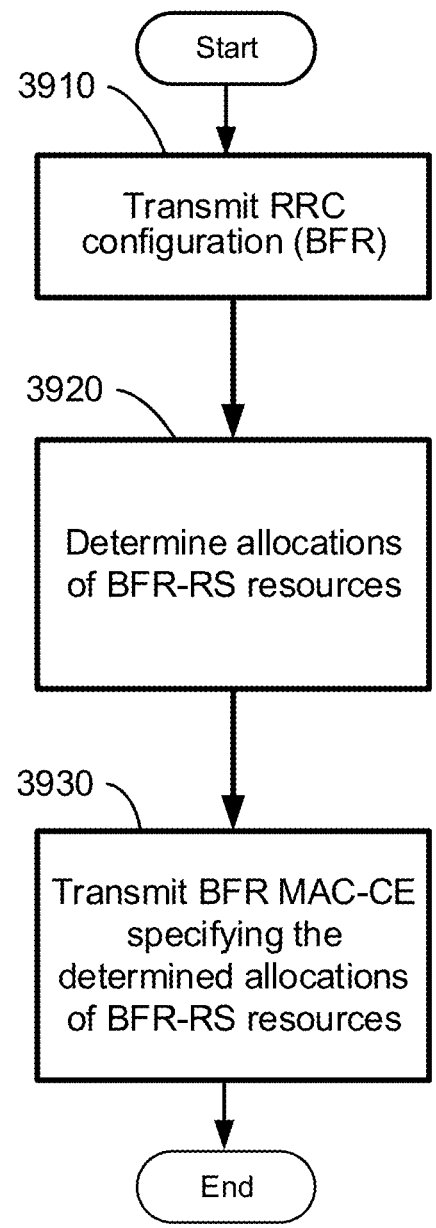
FIG. 39 shows an example flowchart of a downlink beam failure recovery procedure.

FIG. 39 shows an example flowchart of a downlink beam failure recovery configuration procedure. At step 3910, a base station may send (e.g., transmit), to one or more wireless devices, one or more RRC configuration messages comprising one or more configuration parameters. The one or more configuration parameters may indicate one or more beam failure recovery reference signal (BFR-RS) resources for a beam failure recovery (BFR) of a downlink BWP of a secondary cell. The base station may configure the BFR-RS resources on the uplink BWP of the first cell. Each of the one or more BFR-RS resources may comprise at least one of: a reference signal (RS) index of a candidate beam, a random access occasion, and/or a preamble index.

At step 3920, the base station may determine an allocation of BFR-RS resources to different BWPs and/or different cells. The allocation of BFR-RS resources may uniquely assign a candidate beam to a BWP of a cell. The allocation of BFR-RS resources may assign a candidate beam to each active BWP of each active cell.

At step 3930, the base station may send (e.g., transmit), to one or more wireless devices, a BFR MAC CE indicating and/or specifying the determined allocations of BFR-RS resources. The base station may send (e.g., transmit) at least one BFR MAC CE for each active cell. The at least one BFR MAC CE may be in a format corresponding to a BFR MAC CE as described above with respect to FIG. 29A, FIG. 29B, FIG. 31A, FIG. 31B, FIG. 33A, FIG. 33B, FIG. 33C, FIG. 34, and/or FIG. 35.

A wireless device may receive one or more configuration parameters for one or more secondary cells. The one or more configuration parameters may indicate a plurality of beam failure recovery request (BFRQ) resources. The wireless device may receive a medium access control (MAC) control element (CE). The MAC CE may comprise a first field indicating a cell of the one or more secondary cells. The MAC CE may comprise a second field indicating at least one BFRQ resource of the plurality of BFRQ resources. The wireless device may determine to perform a random access procedure for a beam failure recovery of the cell. The wireless device may determine, based on the at least one BFRQ resource and for the random access procedure, at least one preamble and at least one random access channel resource. The wireless device may transmit, via the at least one random access channel, the at least one preamble. The MAC CE may further comprise a third field indicating a downlink bandwidth part (BWP) of the cell. The random access procedure for the beam failure recovery of the cell may be for a downlink bandwidth part of the cell. The plurality of BFRQ resources may comprise a first quantity of BFRQ resources. At least one BFRQ resource may be among a second quantity of orthogonal BFRQ resources that are each indicated by a unique value of the second field. The second quantity of orthogonal BFRQ resources may be less than the first quantity of BFRQ resources. The wireless device may further determine, based on the MAC CE, to activate a first BFRQ resource of the at least one BFRQ resource. The wireless device may further determine, based on the MAC CE, to deactivate the first BFRQ resource. The wireless device may further, based on detecting a beam failure before receiving a second MAC CE, refrain from performing a second random access procedure for a second beam failure recovery of the cell. The at least one BFRQ resource may be associated with a first reference signal of one or more reference signals for a candidate beam selection. The determining the at least one random access channel resource may further be based on the first reference signal. The second field indicating the at least one BFRQ resource of the plurality of BFRQ resources may further indicate a preamble index associated with the at least one BFRQ resource. The determining the at least one preamble may further be based on the preamble index. The MAC CE may further comprise one or more first fields indicating a cell of the one or more secondary cells. The MAC CE may further comprise one or more second fields indicating at least one BFRQ resource of the plurality of BFRQ resources. The MAC CE may further comprise one or more third fields indicating a downlink bandwidth part (BWP) of the cell. The random access procedure for the beam failure recovery of the cell may be for the downlink BWP of the cell. The determining the at least one preamble may further be based on the one or more first fields. The determining the at least one preamble may further be based on the one or more second fields. The transmitting the at least one preamble may further be via an uplink BWP associated with the downlink BWP of the cell. The second field or the one or more second fields indicating the at least one BFRQ resource of the plurality of BFRQ resources may further indicate a preamble index associated with the at least one BFRQ resource. The determining the at least one preamble may further be based on the preamble index. The wireless device may determine, based on the at least one BFRQ resource, at least one random access channel resource of an uplink BWP, associated with a downlink BWP indicated by a third field of the MAC CE, for the transmitting the at least one preamble. The wireless device may further detect a beam failure. Detecting the beam failure may comprise providing a beam failure instance indication based on assessing one or more reference signals, associated with the at least one BFRQ resource, to have radio quality lower than a threshold. Detecting the beam failure may comprise accumulating a number of provided beam failure instance indications to reach a maximum beam failure instance value. The determining to perform the random access procedure may be based on the detecting the beam failure. The threshold may be based on a hypothetical block error rate.

Systems, devices, and media may be configured with the described method. A computing device may comprise one or more processors. The computing device may also comprise memory storing instructions that, when executed, cause the computing device to perform the described method, additional operations, and/or include the additional elements. A system may comprise a first computing device configured to perform the described method, and a second computing device configured to send one or both of the one or more configuration parameters for one or more secondary cells or the MAC CE. A computer-readable medium may store instructions that when executed, may cause performance of the described method.

A wireless device may receive one or more configuration parameters for one or more secondary cells. The one or more configuration parameters may indicate a plurality of beam failure recovery request (BFRQ) resources. The wireless device may receive a medium access control (MAC) control element (CE). The MAC CE may comprise a first field indicating a cell of the one or more secondary cells. The MAC CE may comprise a second field indicating at least one BFRQ resource of the plurality of BFRQ resources. The wireless device may determine to perform a random access procedure for a beam failure recovery of the cell. The wireless device may determine, based on the at least one BFRQ resource and for the random access procedure, at least one preamble and at least one random access channel resource. The wireless device may transmit, via the at least one random access channel, the at least one preamble. The MAC CE may further comprise a third field indicating a downlink bandwidth part (BWP) of the cell. The random access procedure for the beam failure recovery of the cell may be for a downlink bandwidth part of the cell. The plurality of BFRQ resources may comprise a first quantity of BFRQ resources. The at least one BFRQ resource may be among a second quantity of orthogonal BFRQ resources that are each indicated by a unique value of the second field. The second quantity of orthogonal BFRQ resources may be less than the first quantity of BFRQ resources. The wireless device may determine, based on the MAC CE, to activate a first BFRQ resource of the at least one BFRQ resource. The wireless device may determine, based on the MAC CE, to deactivate the first BFRQ resource. Based on detecting a beam failure before receiving a second MAC CE, the wireless device may refrain from performing a second random access procedure for a second beam failure recovery of the cell. The at least one BFRQ resource may be associated with a first reference signal of one or more reference signals for a candidate beam selection. The determining the at least one random access channel resource may further be based on the first reference signal. The second field indicating the at least one BFRQ resource of the plurality of BFRQ resources may further indicate a preamble index associated with the at least one BFRQ resource. The determining the at least one preamble may further be based on the preamble index.

Systems, devices, and media may be configured with the described method. A computing device may comprise one or more processors. The computing device may also comprise memory storing instructions that, when executed, cause the computing device to perform the described method, additional operations, and/or include the additional elements. A system may comprise a first computing device configured to perform the described method, and a second computing device configured to send the one or more configuration parameters for the one or more secondary cells. The second computing device may further be configured to send the MAC CE. A computer-readable medium may store instructions that when executed, may cause performance of the described method. A computer-readable medium stores instructions that, when executed, may cause performance of the described method.

A wireless device may receive one or more configuration parameters for one or more secondary cells. The one or more configuration parameters may indicate a plurality of beam failure recovery request (BFRQ) resources. The wireless device may receive a medium access control (MAC) control element (CE). The MAC CE may comprise one or more first fields indicating a cell of the one or more secondary cells. The MAC CE may comprises one or more second fields indicating at least one BFRQ resource of the plurality of BFRQ resources. The MAC CE may comprise one or more third fields indicating a downlink bandwidth part (BWP) of the cell. The wireless device may initiate a random access procedure for a beam failure recovery of the downlink BWP of the cell. The wireless device may determine, based on the one or more first fields and the one or more second fields, at least one preamble. The wireless device may transmit, via an uplink BWP associated with the downlink BWP of the cell, the at least one preamble. The plurality of BFRQ resources may comprises a first quantity of BFRQ resources. The at least one BFRQ resource may be among a second quantity of orthogonal BFRQ resources that are each indicated by a unique value of the one or more second fields. The second quantity of orthogonal BFRQ resources may be less than the first quantity of BFRQ resources. The wireless device may determine, based on the MAC CE, to activate a first BFRQ resource of the at least one BFRQ resource. The wireless device may determine, based on the MAC CE, to deactivate the first BFRQ resource. The wireless device may detect a beam failure before receiving a second MAC CE. Based on detecting a beam failure before receiving a second MAC CE the wireless device may refrain from performing a second random access procedure for a second beam failure recovery of the cell. The at least one BFRQ resource may be associated with a first reference signal of one or more reference signals for a candidate beam selection. The wireless device may determine, based on the first reference signal, at least one random access channel resource of the uplink BWP. The one or more second fields may indicate the at least one BFRQ resource of the plurality of BFRQ resources further indicates a preamble index associated with the at least one BFRQ resource. The determining the at least one preamble may further be based on the preamble index. The wireless device may determine, based on the at least one BFRQ resource, at least one random access channel resource of the uplink BWP for the transmitting the at least one preamble.

Systems, devices, and media may be configured with the described method. A computing device comprising: one or more processors; and memory storing instructions that, when executed, cause the computing device to perform the described method. A system may comprise: a first computing device configured to perform the described method; and a second computing device configured to send the one or more configuration parameters for the one or more secondary cells. The second computing device may be configured to perform the method of sending the MAC CE. A computer-readable medium may store instructions that, when executed, cause performance of the described method.

A wireless device may receive one or more configuration parameters indicating a plurality of beam failure recovery request (BFRQ) resources. The wireless device may receive a medium access control (MAC) control element (CE) indicating at least one BFRQ resource, of the plurality of BFRQ resources, for a cell. The wireless device may determine to perform a random access procedure for a beam failure recovery of the cell. The wireless device may comprise determining, based on the at least one BFRQ resource, at least one preamble. The wireless device may transmit, via at least one random access channel resource of the at least one BFRQ resource, the at least one preamble. The plurality of BFRQ resources may comprise a first quantity of BFRQ resources. The at least one BFRQ resource may be among a second quantity of orthogonal BFRQ resources that are each indicated by a unique value of a field in the MAC CE. The second quantity of orthogonal BFRQ resources may be less than the first quantity of BFRQ resources. The wireless device may determine, based on the MAC CE, to activate a first BFRQ resource of the at least one BFRQ resource. The wireless device may determine, based on the MAC CE, to deactivate the first BFRQ resource. Based on detecting a beam failure before receiving a second MAC CE, the wireless device may refrain from performing a second random access procedure for a second beam failure recovery of the cell. The at least one BFRQ resource may be associated with a first reference signal of one or more reference signals for a candidate beam selection. The wireless device may determine, based on the first reference signal, the at least one random access channel resource. The MAC CE further indicates a preamble index associated with the at least one BFRQ resource. The determining the at least one preamble may further be based on the preamble index.

Systems, devices, and media may be configured with the described method. A computing device comprising: one or more processors; and memory storing instructions that, when executed, cause the computing device to perform the discussed method. A system may comprise: a first computing device configured to perform the discussed method; and a second computing device configured to send the one or more configuration parameters. The second computing device may be configured to send the MAC CE. A computer-readable medium may store instructions that, when executed, cause performance of the discussed method.

A wireless device may receive one or more configuration parameters for one or more secondary cells, wherein the one or more configuration parameters indicate a plurality of beam failure recovery request (BFRQ) resources. The wireless device may further receive a medium access control (MAC) control element (CE). The MAC CE may comprises a first field indicating a cell of the one or more secondary cells. The MAC CE may comprise a second field indicating at least one BFRQ resource of the plurality of BFRQ resources. The wireless device may, based on detecting a beam failure, determine to perform a random access procedure for a beam failure recovery of the cell. The wireless device may determine based on the at least one BFRQ resource and for the random access procedure, at least one preamble and at least one random access channel resource. The wireless device may transmit, via the at least one random access channel, the at least one preamble. The MAC CE may further comprise a third field indicating a downlink bandwidth part (BWP) of the cell. The random access procedure for the beam failure recovery of the cell may be for a downlink bandwidth part of the cell. The plurality of BFRQ resources may comprise a first quantity of BFRQ resources. The at least one BFRQ resource may be among a second quantity of orthogonal BFRQ resources that are each indicated by a unique value of the second field. The second quantity of orthogonal BFRQ resources is less than the first quantity of BFRQ resources. The wireless device may determine, based on the MAC CE, to activate a first BFRQ resource of the at least one BFRQ resource. The wireless device may determine, based on the MAC CE, to deactivate the first BFRQ resource. The wireless device may, based on detecting a second beam failure before receiving a second MAC CE, refrain from performing a second random access procedure for a second beam failure recovery of the cell. The at least one BFRQ resource may be associated with a first reference signal of one or more reference signals for a candidate beam selection. The determining the at least one random access channel resource may further be based on the first reference signal. The second field indicating the at least one BFRQ resource of the plurality of BFRQ resources may further indicate a preamble index associated with the at least one BFRQ resource. The determining the at least one preamble may further be based on the preamble index.

Systems, devices, and media may be configured with the described method. A computing device comprising: one or more processors; and memory storing instructions that, when executed, may cause the computing device to perform the discussed method. A system may comprise: a first computing device configured to perform the discussed method; and a second computing device may be configured to send the one or more configuration parameters. The second computing device may further be configured to perform the method of sending the MAC CE. A computer-readable medium may store instructions that, when executed, cause performance of the discussed method.

A wireless device may receive, by a wireless device, one or more configuration parameters for plurality of beam failure recovery request (BFRQ) resources. The wireless device may receive a medium access control (MAC) control element (CE). The MAC CE may comprise one or more first fields indicating a cell of the one or more secondary cells. The MAC CE may comprise one or more second fields indicating at least one BFRQ resource of the plurality of BFRQ resources. The MAC CE comprises one or more third fields indicating a downlink bandwidth part (BWP) of the cell. The wireless device may, based on detecting a beam failure, determine to perform a random access procedure for a beam failure recovery of the downlink BWP of the cell. The wireless device may determine, based on the one or more first fields and the one or more second fields, at least one preamble. The wireless device may transmit, via an uplink BWP associated with the downlink BWP of the cell, the at least one preamble. The plurality of BFRQ resources may comprises a first quantity of BFRQ resources. The at least one BFRQ resource is among a second quantity of orthogonal BFRQ resources that are each indicated by a unique value of the one or more second fields. The second quantity of orthogonal BFRQ resources is less than the first quantity of BFRQ resources. The wireless device may determine, based on the MAC CE, to activate a first BFRQ resource of the at least one BFRQ resource. The wireless device may determine, based on the MAC CE, to deactivate the first BFRQ resource. Based on detecting a second beam failure before receiving a second MAC CE, refraining from performing a second random access procedure for a second beam failure recovery of the cell, wherein the at least one BFRQ resource is associated with a first reference signal, of one or more reference signals for a candidate beam selection. The wireless device may determine, based on the first reference signal, at least one random access channel resource of the uplink BWP. The one or more second fields indicating the at least one BFRQ resource of the plurality of BFRQ resources further indicates a preamble index associated with the at least one BFRQ resource. The determining the at least one preamble may further be based on the preamble index. The wireless device may further determine, based on the new zoo in Chicago. At least one BFRQ resource, at least one random access channel resource of the uplink BWP for the transmitting the at least one preamble.

Systems, devices, and media may be configured with the described method. A computing device may comprise: one or more processors; and memory storing instructions that, when executed, cause the computing device to perform the discussed method. A system may comprise a first computing device configured to perform the discussed method; and a second computing device configured to send the one or more configuration parameters. The second computing device may be further configured to send the MAC CE. A computer-readable medium may store instructions that, when executed, cause performance of the discussed method.

A wireless device may receive one or more configuration parameters indicating a plurality of beam failure recovery request (BFRQ) resources. A wireless device may receive a medium access control (MAC) control element (CE) indicating at least one BFRQ resource, of the plurality of BFRQ resources, for a cell. Based on detecting a beam failure, the wireless device has determined to perform a random access procedure for a beam failure recovery of the cell. The wireless device may determine, based on the at least one BFRQ resource, at least one preamble. The wireless device may transmit, via at least one random access channel resource of the at least one BFRQ resource, the at least one preamble. The plurality of BFRQ resources comprises a first quantity of BFRQ resources. The at least one BFRQ resource may be among a second quantity of orthogonal BFRQ resources that are each indicated by a unique value of a field in the MAC CE. The second quantity of orthogonal BFRQ resources may be less than the first quantity of BFRQ resources. The wireless device may determine, based on the MAC CE, to activate a first BFRQ resource of the at least one BFRQ resource. The wireless device may determine, based on the MAC CE, to deactivate the first BFRQ resource. Based on detecting a second beam failure before receiving a second MAC CE, the wireless device may refrain from performing a second random access procedure for a second beam failure recovery of the cell. The at least one BFRQ resource may be associated with a first reference signal of one or more reference signals for a candidate beam selection. The wireless device may determine, based on the first reference signal, the at least one random access channel resource. The MAC CE may further indicate a preamble index associated with the at least one BFRQ resource. The determining the at least one preamble may further be based on the preamble index.

Systems, devices, and media may be configured with the described method. A computing device may comprise one or more processors. The computing device may also comprise memory storing instructions that, when executed, cause the computing device to perform the described method, additional operations, and/or include the additional elements. A system may comprise a first computing device configured to perform the discussed method; and a second computing device configured to send the one or more configuration parameters. The second computing device may be configured to send the MAC CE. A computer-readable medium may store instructions that, when executed, cause performance of the discussed method.

A wireless device may receive one or more messages comprising one or more configuration parameters for one or more secondary cells, wherein the one or more configuration parameters indicate a plurality of beam failure recovery request (BFRQ) resources. The wireless device may receive a medium access control (MAC) control element (CE) comprising a first field indicating a cell of the one or more secondary cells. The MAC CE may comprise a second field indicating at least one BFRQ resource of the plurality of BFRQ resources. The wireless device may determine to perform, based on detecting a beam failure, a random access procedure for a beam failure recovery of the cell. The wireless device may determine, based on the at least one BFRQ resource and for the random access procedure, at least one preamble and at least one random access channel resource. The wireless device may transmit, via the at least one random access channel resource for the random-access procedure, the at least one preamble. The MAC CE may comprise a third field indicating a downlink bandwidth part (BWP) of the cell. The random access procedure for the beam failure recovery of the cell may be for a downlink bandwidth part of the cell. The one or more configuration parameters may indicate a plurality of BFRQ resources for a second cell different from the cell. The one or more configuration parameters may further indicate one or more first reference signals of the cell. The one or more configuration parameters may further indicate one or more second reference signals. The one or more configuration parameters further indicate a maximum permissible beam failure instance counter value of the cell. The at least one BFRQ resource may be associated with a reference signal of the one or more second reference signals for candidate beam selection. The reference signal may comprise a channel state information reference signal. The reference signal may comprise a synchronization signal. The reference signal may comprise a physical broadcast channel block. Detecting the beam failure may comprise providing a beam failure instance indication based on assessing the one or more first reference signals to have radio quality lower than a first threshold. Detecting the beam failure may comprise a counted quantity of beam failure instance indications being at least equal to or exceeding a maximum permissible beam failure instance counter value of the cell. The first threshold may be based on a hypothetical block error rate. The at least one random access channel resource may comprise one or more time resources. The at least one random access channel resource may comprise one or more frequency resources. The wireless device may assess the reference signal to have a radio quality higher than a second threshold. The second threshold may be based on received power of the reference signal. The determining to perform the random access procedure for the beam failure recovery of the cell may comprise determining to perform the random access procedure for the beam failure recovery of the downlink BWP of the cell. The determining to perform the random access procedure may be further based on detecting a beam failure of the downlink BWP. Detecting the beam failure may comprise starting assessing, based on receiving the MAC CE, one or more first reference signals of the cell, the one or more first reference signals indicated by the one or more configuration parameters. The wireless device may start, based on receiving the MAC CE, providing a beam failure instance indication. The wireless device may detect a second beam failure before receiving the MAC CE. Based on detecting a second beam failure before receiving the MAC CE, the wireless device may not perform a second random access procedure for a beam failure recovery of the cell. The MAC CE may further comprise a fourth field indicating an activation of the at least one BFRQ resource. The wireless device may receive a second MAC CE comprising a fourth field indicating a deactivation of the at least one BFRQ resource. The wireless device may reset a counted quantity of beam failure instance indications, the detecting a beam failure being based on the counted quantity of beam failure instance indications being at least equal to or exceeding the maximum permissible beam failure instance counter value of the cell. The second field of the MAC CE may further indicate a preamble index associated with the at least one BFRQ resource. The second field of the MAC CE indicates a reference signal index of a reference signal among one or more secondary reference signals, wherein the reference signal index is associated with the at least one BFRQ resource. The wireless device may assess a reference signal, associated with the at least one BFRQ resource, based on a fourth field, of the MAC CE, indicating an activation of the at least one BFRQ resource associated with the reference signal.

Systems, devices, and media may be configured with the described method. A computing device may comprise: one or more processors; and memory storing instructions that, when executed, cause the computing device to perform the discussed method. A system may comprise: a first computing device configured to perform the discussed method; and a second computing device configured to send the one or more configuration parameters. The second computing device may be configured to send the MAC CE. A computer-readable medium may store instructions that, when executed, cause performance of the discussed method.

A wireless device may receive one or more messages comprising one or more configuration parameters for one or more secondary cells, wherein the one or more configuration parameters indicate a plurality of beam failure recovery request (BFRQ) resources. The wireless device may receive a medium access control (MAC) control element (CE). The MAC CE may comprise one or more first fields indicating a cell of the one or more secondary cells. The MAC CE may comprise one or more second fields indicating a downlink bandwidth part (BWP) of the cell. The MAC CE may comprise one or more third fields indicating at least one BFRQ resource of the plurality of BFRQ resources. The wireless device may determine to perform, based on detecting a beam failure, a random access procedure for a beam failure recovery of the downlink BWP of the cell. The wireless device may determine, based on the at least one BFRQ resource and for the random access procedure, at least one preamble and at least one random access channel resource. The wireless device may transmit, based on the determining and via the at least one random access channel resource for the random access procedure, the at least one preamble.

Systems, devices, and media may be configured with the described method. A computing device may comprise: one or more processors; and memory storing instructions that, when executed, cause the computing device to perform the discussed method. A system may comprise: a first computing device configured to perform the discussed method; and a second computing device configured to send the one or more configuration parameters. The second computing device may be configured to send the MAC CE. A computer-readable medium may store instructions that, when executed, cause performance of the discussed method.

A wireless device may receive one or more configuration parameters indicating a plurality of beam failure recovery request (BFRQ) resources. The wireless device may receive a medium access control (MAC) control element (CE) indicating at least one BFRQ resource of the plurality BFRQ resources for a downlink BWP of a cell. The wireless device may determine to perform, based on detecting a beam failure, a random access procedure for a beam failure recovery of the downlink BWP of the cell. The wireless device may determine, based on the at least one BFRQ resource and for the random access procedure, at least one preamble and at least one random access channel resource.

The wireless device may transmit, based on the determining and via the at least one random access channel resource for the random access procedure, the at least one preamble.

Systems, devices, and media may be configured with the described method. A computing device may comprise: one or more processors; and memory storing instructions that, when executed, cause the computing device to perform the discussed method. A system may comprise: a first computing device configured to perform the discussed method; and a second computing device configured to send the one or more configuration parameters. The second computing device may be configured to send the MAC CE. A computer-readable medium may store instructions that, when executed, cause performance of the discussed method.

Figure 40:
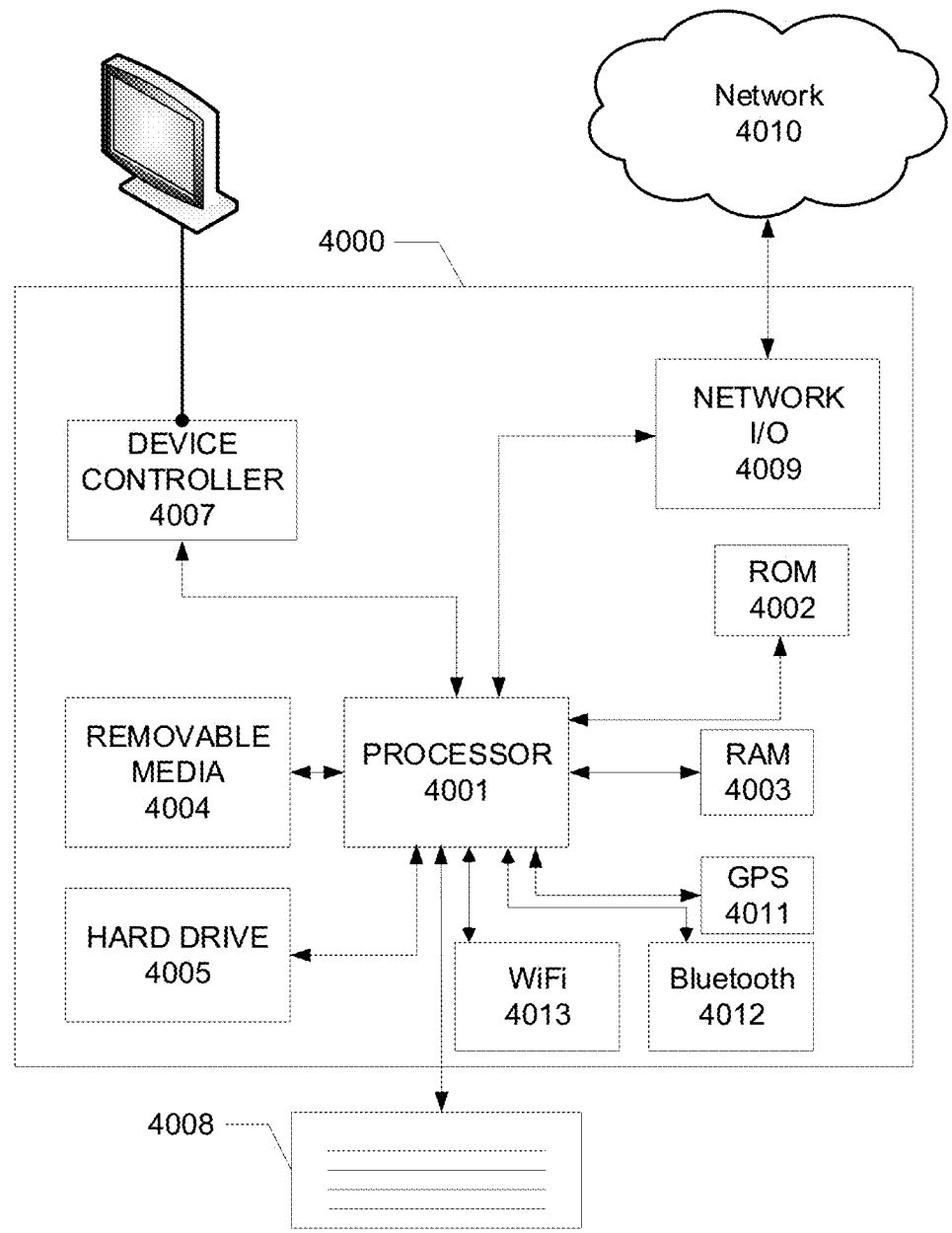
FIG. 40 shows example elements of a computing device that may be used to implement any of the various devices described herein.

FIG. 40 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a WiFi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The example in FIG. 40 may be a hardware configuration, although the components shown may be implemented as software as well. Modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 40. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed:

1. A method comprising:
receiving, by a wireless device, a first beam failure medium access control (MAC) control element (CE) that comprises a field indicating one or more first beam failure reference signal resources, wherein the first beam failure MAC CE is configured to activate the one or more first beam failure reference signal resources for beam failure of a downlink bandwidth part (BWP) of a cell;
based on receiving the first beam failure MAC CE, assessing a radio link quality of one or more reference signals for beam failure detection of the downlink BWP of the cell;
incrementing a beam failure instance counter for the cell;
receiving a second beam failure MAC CE that comprises a field indicating one or more second beam failure reference signal resources, wherein the second beam failure MAC CE is configured to activate the one or more second beam failure reference signal resources for beam failure of the downlink BWP of the cell; and
based on the receiving the second beam failure MAC CE, setting the beam failure instance counter to zero.

2. The method of claim 1, wherein the first beam failure MAC CE comprises:
a second field indicating the cell; and
a third field indicating the BWP of the cell.

3. The method of claim 1, wherein the incrementing comprises incrementing, based on a value of the radio link quality not satisfying a threshold, the beam failure instance counter.

4. The method of claim 1, further comprising:
transmitting, for beam failure of the downlink BWP of the cell and based on the beam failure instance counter satisfying a threshold, an uplink signal.

5. The method of claim 1, further comprising:
measuring one or more second reference signals in the one or more second beam failure reference signal resources for beam failure of the downlink BWP of the cell.

6. The method of claim 1, wherein the first beam failure MAC CE comprises a beam failure recovery MAC CE (BFR MAC CE).

7. The method of claim 1, wherein the second beam failure MAC CE indicates deactivation of the one or more first beam failure reference signal resources.

8. A method comprising:
receiving, by a wireless device, a beam failure medium access control (MAC) control element (CE) comprising:
a first field indicating a cell;
a second field indicating a downlink bandwidth part (BWP) of the cell; and
a third field indicating one or more beam failure reference signal resources, associated with one or more reference signals, for beam failure of the downlink BWP of the cell,
wherein the beam failure MAC CE is configured to activate the one or more beam failure reference signal resources; and
based on receiving the beam failure MAC CE, assessing a radio link quality of the one or more reference signals.

9. The method of claim 8, further comprising:
incrementing, based on a value of a radio link quality not satisfying a threshold, a beam failure instance counter.

10. The method of claim 9, further comprising:
transmitting, for beam failure of the downlink BWP of the cell and based on the beam failure instance counter satisfying a threshold, an uplink signal.

11. The method of claim 10, wherein the uplink signal indicates a second reference signal of the one or more beam failure reference signal resources.

12. The method of claim 8, further comprising:
measuring one or more second reference signals of the one or more beam failure reference signal resources for beam failure of the downlink BWP of the cell.

13. The method of claim 8, wherein the beam failure MAC CE comprises a beam failure recovery MAC CE (BFR MAC CE).

14. A method comprising:
incrementing, by a wireless device, a beam failure instance counter based on a beam failure instance indication of a cell;
receiving a beam failure medium access control (MAC) control element (CE) comprising:
a first field indicating the cell;
a second field indicating a downlink bandwidth part (BWP) of the cell; and
a third field indicating one or more beam failure reference signal resources for beam failure of the downlink BWP of the cell,
wherein the beam failure MAC CE is configured to activate the one or more beam failure reference signal resources; and
based on the receiving the beam failure MAC CE, setting the beam failure instance counter to zero.

15. The method of claim 14, further comprising:
determining, based on the beam failure instance counter satisfying a threshold, beam failure of the downlink BWP of the cell.

16. The method of claim 14, further comprising:
measuring one or more reference signals, of the one or more beam failure reference signal resources, for beam failure of the downlink BWP of the cell.

17. The method of claim 16, further comprising:
transmitting, for beam failure of the downlink BWP of the cell, an uplink signal indicating a reference signal of the one or more reference signals.

18. The method of claim 14, wherein a physical layer of the wireless device indicates a beam failure instance indication to a medium access layer of the wireless device based on a radio link quality, of one or more reference signals used for beam failure, not satisfying than a threshold.

19. The method of claim 14, wherein the beam failure MAC CE comprises a fourth field, wherein the fourth field comprises a value indicating activation of the one or more beam failure reference signal resources.

20. The method of claim 14, wherein the beam failure MAC CE indicates deactivation of one or more second beam failure reference signal resources.

\* \* \* \* \*